(12) United States Patent
Kawashima et al.

(10) Patent No.: US 10,166,951 B2
(45) Date of Patent: Jan. 1, 2019

(54) WINDSHIELD WIPER CONNECTOR

(71) Applicant: Pylon Manufacturing Corp., Deerfield Beach, FL (US)

(72) Inventors: Hiroshi Kawashima, Sunrise, FL (US); Robert Peter Peers, Boca Raton, FL (US)

(*) Notice: Subject to any disclaimer, the term of this patent is extended or adjusted under 35 U.S.C. 154(b) by 940 days.

(21) Appl. No.: 14/216,082

(22) Filed: Mar. 17, 2014

(65) Prior Publication Data
US 2014/0283325 A1   Sep. 25, 2014

Related U.S. Application Data

(60) Provisional application No. 61/794,687, filed on Mar. 15, 2013.

(51) Int. Cl.
*B60S 1/38* (2006.01)
*B60S 1/40* (2006.01)

(52) U.S. Cl.
CPC ........... *B60S 1/4006* (2013.01); *B60S 1/4003* (2013.01); *B60S 1/4038* (2013.01); *B60S 2001/4012* (2013.01); *B60S 2001/4025* (2013.01)

(58) Field of Classification Search
CPC ................. B60S 1/4003; B60S 1/4038; B60S 2001/4012
USPC ............................. 15/250.32, 250.44, 250.43
See application file for complete search history.

(56) References Cited

U.S. PATENT DOCUMENTS

| D56,762 S | 12/1920 | Minier |
|---|---|---|
| 2,310,751 A | 2/1943 | Scinta |
| 2,550,094 A | 4/1951 | Smulski |
| 2,589,339 A | 3/1952 | Carson |
| 2,616,112 A | 11/1952 | Smulski |
| 2,643,411 A | 6/1953 | Nesson |
| 2,658,223 A | 11/1953 | Enochian |
| 2,799,887 A | 7/1957 | Nemic |
| 2,801,436 A | 8/1957 | Scinta |
| 2,814,820 A | 12/1957 | Elliot et al. |

(Continued)

FOREIGN PATENT DOCUMENTS

| AR | 206463 | 7/1976 |
|---|---|---|
| AU | 409933 | 2/1971 |

(Continued)

OTHER PUBLICATIONS

International Search Report dated Oct. 19, 2012 for PCT/US2012/048843 filed Jul. 30, 2012.

(Continued)

*Primary Examiner* — Michael Jennings
(74) *Attorney, Agent, or Firm* — Cozen O'Connor

(57) ABSTRACT

Novel connectors for coupling wiper blades with arms are described, including those that. A wiper blade connector may include first and second side walls and a bridge defining an upper channel, as well as a passage for receiving a rivet or pin. The connector may also include a reinforcement portion which may be an extension of the side walls, include a portion overhanging into the upper channel, an outward extension projecting in a direction away from the upper channel, or resilient tabs on the inside of the channel. The connector may also include a support element, such as a truss member, which extends the upper channel. A lateral brace may also be provided between side walls.

20 Claims, 19 Drawing Sheets

(56) References Cited

U.S. PATENT DOCUMENTS

| | | |
|---|---|---|
| 2,890,472 A | 6/1959 | Olson |
| 2,932,843 A | 4/1960 | Zaiger et al. |
| 2,937,393 A | 5/1960 | Brueder |
| 2,946,078 A | 7/1960 | Deibel et al. |
| 3,029,460 A | 4/1962 | Hoyler |
| 3,037,233 A | 6/1962 | Peras et al. |
| 3,056,991 A | 10/1962 | Smithers |
| 3,082,464 A | 3/1963 | Smithers |
| 3,088,155 A | 5/1963 | Smithers |
| 3,089,174 A | 5/1963 | Bignon |
| 3,104,412 A | 9/1963 | Hinder |
| 3,116,510 A | 1/1964 | Oishei et al. |
| 3,132,367 A | 5/1964 | Wise |
| 3,139,644 A | 7/1964 | Smith |
| 3,147,506 A | 9/1964 | Williams |
| 3,147,507 A | 9/1964 | Glynm |
| 3,192,551 A | 7/1965 | Appel |
| 3,234,578 A | 2/1966 | Golub et al. |
| 3,296,647 A | 1/1967 | Gumbleton |
| 3,317,945 A | 5/1967 | Ludwig |
| 3,317,946 A | 5/1967 | Anderson |
| 3,350,738 A | 11/1967 | Anderson |
| D211,570 S | 7/1968 | Tomlin |
| 3,405,421 A | 10/1968 | Tomlin |
| 3,418,679 A | 12/1968 | Barth et al. |
| 3,480,986 A | 12/1969 | Forster |
| 3,588,941 A | 6/1971 | Schlesinger |
| 3,588,942 A | 6/1971 | Schlesinger |
| 3,618,155 A | 11/1971 | Mower |
| 3,665,544 A | 5/1972 | Sakamoto |
| 3,673,631 A | 7/1972 | Yamadai et al. |
| 3,685,086 A | 8/1972 | Frohlich |
| 3,751,754 A | 8/1973 | Quinlan et al. |
| 3,757,377 A | 9/1973 | Hayhurst |
| 3,780,395 A | 12/1973 | Quinlan et al. |
| 3,857,741 A | 12/1974 | Hultgren et al. |
| 3,862,465 A | 1/1975 | Ito |
| 3,872,535 A | 3/1975 | Arman |
| 3,872,537 A | 3/1975 | Bianchi |
| 3,879,793 A | 4/1975 | Schlegel |
| 3,879,794 A | 4/1975 | Roberts, Jr. |
| 3,881,213 A | 5/1975 | Tilli |
| 3,881,214 A | 5/1975 | Palu |
| D236,337 S | 8/1975 | Deibel |
| 3,929,222 A | 12/1975 | Smith et al. |
| 3,942,212 A | 3/1976 | Steger et al. |
| 3,969,784 A | 7/1976 | Journee |
| D240,809 S | 8/1976 | Deibel |
| 3,995,347 A | 12/1976 | Kohler |
| 4,007,511 A | 2/1977 | Deibel |
| 4,009,504 A | 3/1977 | Arman |
| 4,028,770 A | 6/1977 | Appel |
| 4,047,480 A | 9/1977 | Vassiliou |
| 4,063,328 A | 12/1977 | Arman |
| D248,375 S | 7/1978 | Bergstein |
| D248,388 S | 7/1978 | Hughes |
| 4,102,003 A | 7/1978 | Hancu |
| 4,127,912 A | 12/1978 | Deibel et al. |
| 4,127,916 A | 12/1978 | Van den Berg et al. |
| D253,040 S | 10/1979 | Fournier et al. |
| D253,167 S | 10/1979 | Fournier et al. |
| D257,339 S | 10/1980 | Ellinwood |
| 4,239,104 A | 12/1980 | Roccaforte et al. |
| 4,308,635 A | 1/1982 | Maiocco |
| 4,309,790 A | 1/1982 | Bauer et al. |
| 4,324,019 A | 4/1982 | Mohnach et al. |
| 4,327,458 A | 5/1982 | Maiocco |
| 4,334,001 A | 6/1982 | Horie et al. |
| 4,339,839 A | 7/1982 | Knights |
| 4,342,126 A | 8/1982 | Neefeldt |
| 4,343,063 A | 8/1982 | Batt |
| 4,343,064 A | 8/1982 | van den Berg et al. |
| 4,354,293 A | 10/1982 | Le Sausse et al. |
| D267,939 S | 2/1983 | Duvoux |
| D267,940 S | 2/1983 | Duvoux |
| D268,020 S | 2/1983 | Duvoux |
| 4,400,845 A | 8/1983 | Noguchi et al. |
| 4,416,032 A | 11/1983 | Mohnach et al. |
| 4,422,207 A | 12/1983 | Maiocco et al. |
| 4,438,543 A | 3/1984 | Noguchi et al. |
| 4,464,808 A | 8/1984 | Berry |
| 4,547,925 A | 10/1985 | Blackborow et al. |
| 4,561,143 A | 12/1985 | Beneteau |
| D282,243 S | 1/1986 | Mason |
| D282,718 S | 2/1986 | Fireman |
| 4,570,284 A | 2/1986 | Verton |
| 4,587,686 A | 5/1986 | Thompson |
| 4,590,638 A | 5/1986 | Beneteau |
| D286,499 S | 11/1986 | Moreno |
| D287,709 S | 1/1987 | Mower et al. |
| 4,649,591 A | 3/1987 | Guerard |
| 4,670,284 A | 6/1987 | Berkoff |
| 4,670,934 A | 6/1987 | Epple et al. |
| D295,020 S | 4/1988 | Franchi |
| 4,741,071 A | 5/1988 | Bauer et al. |
| D296,317 S | 6/1988 | Mower et al. |
| 4,760,934 A | 8/1988 | Epple et al. |
| 4,766,636 A | 8/1988 | Shinpo |
| D298,116 S | 10/1988 | Sussich |
| 4,782,547 A | 11/1988 | Mohnach |
| D298,926 S | 12/1988 | Rusnak |
| 4,795,288 A | 1/1989 | Sakai |
| 4,807,326 A | 2/1989 | Arai et al. |
| D301,329 S | 5/1989 | Cavicchioli |
| 4,852,206 A | 8/1989 | Fisher |
| D304,709 S | 11/1989 | Sussich |
| D307,408 S | 4/1990 | Mower et al. |
| D308,352 S | 6/1990 | Bradley |
| D308,660 S | 6/1990 | Fisher |
| D308,845 S | 6/1990 | Charet et al. |
| 4,930,180 A | 6/1990 | Longman |
| D310,193 S | 8/1990 | Charet |
| 4,971,472 A | 11/1990 | Pethers |
| 4,976,001 A | 12/1990 | Wright |
| 4,984,325 A | 1/1991 | Arai et al. |
| 4,989,290 A | 2/1991 | Hoshino |
| 5,027,947 A | 7/1991 | Reighart |
| 5,042,106 A | 8/1991 | Maubray |
| 5,056,183 A | 10/1991 | Haney, III |
| 5,062,176 A | 11/1991 | Unterborn et al. |
| D322,053 S | 12/1991 | Bradley |
| D322,772 S | 12/1991 | Leu et al. |
| D322,952 S | 1/1992 | Wu |
| 5,082,078 A | 1/1992 | Umeda et al. |
| D323,637 S | 2/1992 | Dipple |
| D324,014 S | 2/1992 | Ruminer |
| 5,084,933 A | 2/1992 | Buechele |
| 5,086,534 A | 2/1992 | Journee |
| D324,359 S | 3/1992 | Chen |
| D324,667 S | 3/1992 | Williams |
| 5,093,954 A | 3/1992 | Kuzuno |
| D327,013 S | 6/1992 | Reighart |
| D327,461 S | 6/1992 | Nelson |
| 5,123,140 A | 6/1992 | Raymond |
| D327,667 S | 7/1992 | Mar |
| D328,061 S | 7/1992 | Su |
| 5,138,739 A | 8/1992 | Maubray |
| D329,034 S | 9/1992 | Charet et al. |
| D329,997 S | 10/1992 | Leu |
| D330,181 S | 10/1992 | Charet et al. |
| D330,691 S | 11/1992 | Leu |
| D330,696 S | 11/1992 | Alain |
| D331,036 S | 11/1992 | Isley |
| D331,037 S | 11/1992 | Hsi |
| D331,212 S | 11/1992 | Poteet |
| D331,556 S | 12/1992 | Ismert |
| 5,168,596 A | 12/1992 | Maubray |
| 5,170,527 A | 12/1992 | Lyon, II |
| D332,593 S | 1/1993 | Gerardiello et al. |
| 5,179,761 A | 1/1993 | Buechele et al. |
| 5,182,831 A | 2/1993 | Knight |
| D334,161 S | 3/1993 | Wu et al. |
| D334,549 S | 4/1993 | Esquibel |
| 5,206,969 A | 5/1993 | Patterson et al. |

(56) References Cited

U.S. PATENT DOCUMENTS

| | | | |
|---|---|---|---|
| D336,739 S | 6/1993 | Wu et al. | |
| 5,218,735 A | 6/1993 | Maubray | |
| 5,228,167 A | 7/1993 | Yang | |
| 5,233,721 A | 8/1993 | Yang | |
| D341,561 S | 11/1993 | Heckman et al. | |
| 5,257,436 A | 11/1993 | Yang | |
| D342,225 S | 12/1993 | Heckman et al. | |
| 5,276,937 A | 1/1994 | Lan | |
| 5,283,925 A | 2/1994 | Maubray | |
| D345,329 S | 3/1994 | Kanellis et al. | |
| D345,330 S | 3/1994 | Yang | |
| D345,537 S | 3/1994 | Bianco et al. | |
| D345,538 S | 3/1994 | Bianco et al. | |
| 5,289,608 A * | 3/1994 | Kim | B60S 1/4003 15/250.32 |
| 5,307,536 A | 5/1994 | Lescher | |
| 5,311,636 A | 5/1994 | Lee | |
| 5,312,177 A | 5/1994 | Coulter | |
| D347,610 S | 6/1994 | Charet et al. | |
| 5,319,826 A | 6/1994 | Mower | |
| 5,325,564 A | 7/1994 | Swanepoel | |
| D349,877 S | 8/1994 | Oyama | |
| 5,333,351 A | 8/1994 | Sato | |
| D350,723 S | 9/1994 | Longazel | |
| 5,349,716 A | 9/1994 | Millar | |
| 5,361,896 A | 11/1994 | Yang | |
| D353,354 S | 12/1994 | Oyama | |
| 5,372,449 A | 12/1994 | Bauer et al. | |
| 5,383,248 A | 1/1995 | Hi | |
| 5,383,249 A | 1/1995 | Yang | |
| 5,392,489 A | 2/1995 | Mohnach | |
| D357,626 S | 4/1995 | Snow et al. | |
| 5,408,719 A | 4/1995 | DeRees et al. | |
| 5,412,177 A | 5/1995 | Clark | |
| 5,435,041 A | 7/1995 | Ho | |
| 5,454,135 A | 10/1995 | Okuya et al. | |
| 5,459,900 A | 10/1995 | Mege et al. | |
| 5,463,790 A | 11/1995 | Chiou et al. | |
| D365,079 S | 12/1995 | Abbott et al. | |
| 5,485,650 A | 1/1996 | Swanepoel | |
| 5,487,205 A | 1/1996 | Scherch et al. | |
| 5,497,528 A | 3/1996 | Wu | |
| 5,509,166 A | 4/1996 | Wagner et al. | |
| D370,199 S | 5/1996 | Kim | |
| 5,519,913 A | 5/1996 | Schedule | |
| D370,653 S | 6/1996 | Kim | |
| D370,654 S | 6/1996 | Kim | |
| D372,217 S | 7/1996 | Abbott et al. | |
| 5,564,157 A | 10/1996 | Kushida et al. | |
| 5,566,419 A | 10/1996 | Zhou | |
| 5,568,670 A | 10/1996 | Samples et al. | |
| D375,289 S | 11/1996 | Waselewski et al. | |
| 5,577,292 A | 11/1996 | Blachetta et al. | |
| D376,792 S | 12/1996 | Chodkiewicz | |
| 5,593,125 A | 1/1997 | Storz et al. | |
| D377,754 S | 2/1997 | Abbott et al. | |
| 5,606,765 A * | 3/1997 | Ding | B60S 1/4019 15/250.32 |
| 5,606,766 A | 3/1997 | Lee | |
| 5,628,085 A | 5/1997 | Edele et al. | |
| D379,613 S | 6/1997 | Chen | |
| 5,647,088 A | 7/1997 | Bommer et al. | |
| D382,848 S | 8/1997 | Chen | |
| 5,661,870 A | 9/1997 | Eustache et al. | |
| 5,661,871 A | 9/1997 | Scorsiroli | |
| D389,449 S | 1/1998 | Hussaini | |
| D390,823 S | 2/1998 | Baranowski et al. | |
| D392,612 S | 3/1998 | Jonasson et al. | |
| 5,732,437 A | 3/1998 | Jonasson et al. | |
| D393,619 S | 4/1998 | Jeffer et al. | |
| 5,742,973 A | 4/1998 | Kessler | |
| D395,271 S | 6/1998 | Kim | |
| D395,864 S | 7/1998 | Stahlhut et al. | |
| D395,865 S | 7/1998 | Powell et al. | |
| D396,840 S | 8/1998 | Vita | |
| 5,791,010 A | 8/1998 | Brady et al. | |
| 5,807,016 A * | 9/1998 | Herring | B60S 1/40 15/250.31 |
| 5,819,361 A | 10/1998 | Merkel et al. | |
| 5,836,110 A | 11/1998 | Buening | |
| D402,953 S | 12/1998 | Kim | |
| D404,354 S | 1/1999 | Witek et al. | |
| D406,094 S | 2/1999 | Lai | |
| D406,257 S | 3/1999 | Lee | |
| D406,755 S | 3/1999 | Garganese | |
| D406,756 S | 3/1999 | Garganese | |
| 5,875,672 A | 3/1999 | Fourie et al. | |
| 5,885,023 A | 3/1999 | Witek et al. | |
| 5,889,334 A | 3/1999 | Hongo | |
| 5,899,334 A | 5/1999 | Domerchie et al. | |
| D411,161 S | 6/1999 | Wooten | |
| D411,504 S | 6/1999 | Hsu | |
| 5,907,885 A | 6/1999 | Tilli et al. | |
| 5,911,358 A | 6/1999 | Kenner et al. | |
| 5,920,947 A | 7/1999 | Varner | |
| D413,261 S | 8/1999 | Yerich | |
| D414,456 S | 9/1999 | Hussaini et al. | |
| 5,970,569 A | 10/1999 | Merkel et al. | |
| 5,970,570 A | 10/1999 | Groninger | |
| D417,180 S | 11/1999 | Shih | |
| D418,103 S | 12/1999 | Don | |
| D418,474 S | 1/2000 | Witek et al. | |
| D419,950 S | 2/2000 | Spector | |
| 6,026,537 A | 2/2000 | Hojnacki | |
| 6,055,697 A | 5/2000 | Wollenschlaeger | |
| 6,063,216 A | 5/2000 | Damm et al. | |
| D427,134 S | 6/2000 | Lee | |
| 6,070,723 A | 6/2000 | Lewis | |
| 6,088,872 A | 7/2000 | Schmid et al. | |
| D430,097 S | 8/2000 | Breesch et al. | |
| 6,101,665 A | 8/2000 | Sahara et al. | |
| D431,223 S | 9/2000 | Breesch et al. | |
| 6,119,301 A | 9/2000 | Nakatsukasa et al. | |
| D431,520 S | 10/2000 | Breesch et al. | |
| D432,072 S | 10/2000 | Breesch et al. | |
| D434,715 S | 12/2000 | Wang | |
| 6,158,078 A | 12/2000 | Kotlarski | |
| 6,161,248 A | 12/2000 | Merkel et al. | |
| 6,192,546 B1 | 2/2001 | Kotlarski | |
| 6,202,251 B1 | 3/2001 | Kotlarski | |
| 6,216,311 B1 | 4/2001 | Van Damme et al. | |
| D442,537 S | 5/2001 | Kim | |
| 6,226,829 B1 | 5/2001 | Kotlarski | |
| D443,245 S | 6/2001 | Kim | |
| D443,582 S | 6/2001 | De Block | |
| D443,854 S | 6/2001 | De Block | |
| 6,247,590 B1 | 6/2001 | Baker | |
| D444,760 S * | 7/2001 | Houssat | D12/220 |
| D445,754 S | 7/2001 | Benoit | |
| 6,266,843 B1 | 7/2001 | Doman et al. | |
| 6,279,191 B1 | 8/2001 | Kotlarski et al. | |
| 6,279,746 B1 | 8/2001 | Hussaini et al. | |
| D448,295 S | 9/2001 | Mozes | |
| 6,286,176 B1 | 9/2001 | Westermann et al. | |
| 6,292,974 B1 | 9/2001 | Merket et al. | |
| 6,295,690 B1 | 10/2001 | Merkel et al. | |
| 6,301,742 B1 | 10/2001 | Kota | |
| 6,305,066 B1 | 10/2001 | De Paolo et al. | |
| 6,308,373 B1 | 10/2001 | Merkel et al. | |
| 6,327,738 B1 | 12/2001 | Lewis | |
| 6,332,236 B1 | 12/2001 | Ku | |
| 6,336,243 B1 | 1/2002 | Charng | |
| D453,316 S | 2/2002 | Watanabe | |
| 6,363,569 B1 | 4/2002 | Kotlarski | |
| 6,367,117 B1 | 4/2002 | Sahara et al. | |
| D457,479 S | 5/2002 | De Block et al. | |
| 6,393,654 B2 | 5/2002 | Nacamuli | |
| 6,397,428 B2 | 6/2002 | Kotlarski | |
| 6,415,473 B1 | 7/2002 | Rapp | |
| D462,044 S | 8/2002 | Gfatter et al. | |
| 6,427,282 B1 | 8/2002 | Kotlarski | |
| 6,434,780 B1 | 8/2002 | Kotlarski | |
| D462,262 S | 9/2002 | Leja | |
| 6,449,797 B1 | 9/2002 | De Block | |

(56) References Cited

U.S. PATENT DOCUMENTS

| | | |
|---|---|---|
| 6,453,505 B1 | 9/2002 | Terai |
| D464,012 S | 10/2002 | Hussaini et al. |
| D464,600 S | 10/2002 | Chen |
| 6,499,181 B1 | 12/2002 | Kotlarski |
| D469,731 S | 2/2003 | Geer |
| 6,513,186 B1 | 2/2003 | Zimmer |
| 6,516,491 B2 | 2/2003 | Merkel et al. |
| 6,523,218 B1 | 2/2003 | Kotlarski |
| D471,505 S | 3/2003 | Wang |
| 6,530,111 B1 | 3/2003 | Kotlarski |
| D472,510 S | 4/2003 | Lin |
| D473,180 S | 4/2003 | Sun |
| D473,507 S * | 4/2003 | Huang ............ D12/220 |
| 6,550,096 B1 | 4/2003 | Stewart et al. |
| 6,553,607 B1 | 4/2003 | De Block |
| D474,143 S | 5/2003 | Ho |
| 6,564,441 B2 | 5/2003 | Ibe et al. |
| 6,581,237 B1 | 6/2003 | Kotlarski |
| 6,606,759 B1 | 8/2003 | Hoshino |
| 6,609,267 B1 | 8/2003 | Journee et al. |
| 6,611,988 B1 | 9/2003 | De Block |
| 6,619,094 B2 | 9/2003 | Juhl |
| 6,622,540 B2 | 9/2003 | Jones et al. |
| 6,625,842 B1 | 9/2003 | De Block |
| 6,632,738 B2 | 10/2003 | Sone |
| 6,634,056 B1 | 10/2003 | De Block |
| 6,640,380 B2 * | 11/2003 | Rosenstein ........... B60S 1/4003 |
| | | 15/250.32 |
| 6,643,889 B1 | 11/2003 | Kotlarski |
| 6,651,292 B2 | 11/2003 | Komerska |
| 6,665,904 B1 | 12/2003 | Kerchaert |
| 6,668,419 B1 | 12/2003 | Kotlarski |
| 6,675,433 B1 | 1/2004 | Stewart et al. |
| 6,675,434 B1 | 1/2004 | Wilhelm et al. |
| 6,681,440 B2 | 1/2004 | Zimmer et al. |
| D487,047 S | 2/2004 | Kim |
| 6,687,948 B2 | 2/2004 | Kotlarski |
| 6,718,594 B1 | 4/2004 | Kotlarski |
| D490,763 S | 6/2004 | Kim |
| 6,766,906 B2 | 6/2004 | Charng |
| D494,125 S | 8/2004 | Leu |
| D494,527 S | 8/2004 | Hsu |
| D494,528 S | 8/2004 | Chiang |
| 6,785,931 B2 | 9/2004 | Lee et al. |
| 6,789,289 B2 | 9/2004 | Roodt |
| 6,792,644 B2 | 9/2004 | Roodt |
| 6,796,000 B2 | 9/2004 | Varner |
| 6,806,452 B2 | 10/2004 | Bos et al. |
| 6,810,555 B2 | 11/2004 | Ritt |
| 6,810,556 B1 | 11/2004 | Kotlarski |
| 6,813,803 B2 | 11/2004 | Leutsch |
| 6,813,923 B2 | 11/2004 | Jones et al. |
| 6,820,302 B2 | 11/2004 | Zimmer |
| 6,820,303 B2 | 11/2004 | Zimmer et al. |
| 6,820,304 B1 | 11/2004 | Gossez et al. |
| D499,962 S | 12/2004 | Lee et al. |
| D500,728 S | 1/2005 | Leu |
| 6,836,924 B2 | 1/2005 | Egan-Walter |
| 6,836,925 B1 | 1/2005 | Swanepoel |
| 6,836,926 B1 | 1/2005 | De Block |
| 6,836,927 B2 | 1/2005 | De Block et al. |
| D501,819 S | 2/2005 | Hsu |
| 6,857,160 B2 | 2/2005 | Weiler et al. |
| 6,859,971 B1 | 3/2005 | Siklosi |
| 6,874,195 B2 | 4/2005 | Kotlarski |
| 6,883,966 B2 | 4/2005 | Zimmer |
| 6,886,213 B2 | 5/2005 | Merkel et al. |
| 6,904,639 B2 | 6/2005 | Dietrich et al. |
| 6,910,243 B1 | 6/2005 | Zimmer |
| 6,910,244 B2 | 6/2005 | De Block et al. |
| D508,226 S | 8/2005 | Lin |
| D508,888 S | 8/2005 | Carroll |
| 6,944,905 B2 | 9/2005 | De Block et al. |
| 6,946,810 B2 | 9/2005 | Kohlrausch |
| 6,951,043 B1 | 10/2005 | Fehrsen |
| D511,735 S | 11/2005 | Aoyama et al. |
| 6,964,079 B2 | 11/2005 | Zimmer |
| 6,964,080 B2 | 11/2005 | Knauf |
| 6,966,096 B2 | 11/2005 | Baseotto et al. |
| D512,362 S | 12/2005 | Breesch et al. |
| 6,973,698 B1 | 12/2005 | Kotlarski |
| 6,978,511 B2 | 12/2005 | Poton |
| 6,978,512 B2 | 12/2005 | Dietrich et al. |
| 7,007,339 B2 | 3/2006 | Weilet et al. |
| 7,024,722 B2 | 4/2006 | Neubauer et al. |
| 7,036,181 B2 | 5/2006 | Zimmer |
| D522,380 S | 6/2006 | Dibnah et al. |
| 7,055,207 B2 * | 6/2006 | Coughlin ............ B60S 1/4003 |
| | | 15/250.32 |
| 7,055,208 B2 | 6/2006 | Merkel et al. |
| 7,076,829 B2 | 7/2006 | Ritt |
| D527,336 S | 8/2006 | Van Baelen |
| 7,093,317 B1 | 8/2006 | Zimmer |
| 7,134,163 B2 | 11/2006 | Varner |
| 7,137,167 B2 | 11/2006 | Torii et al. |
| 7,143,463 B2 | 12/2006 | Baseotto et al. |
| 7,150,065 B2 | 12/2006 | Zimmer |
| 7,150,066 B1 | 12/2006 | Huang |
| 7,150,795 B2 | 12/2006 | Javaruski et al. |
| 7,166,979 B2 | 1/2007 | Zimmer |
| 7,171,718 B2 | 2/2007 | Moein et al. |
| D538,218 S | 3/2007 | Elwell et al. |
| 7,196,440 B2 | 3/2007 | Lamprecht |
| 7,207,082 B2 * | 4/2007 | Lee ............ B60S 1/4003 |
| | | 15/250.32 |
| 7,228,588 B2 | 6/2007 | Kraemer et al. |
| D546,669 S | 7/2007 | Sheppard et al. |
| D547,713 S | 7/2007 | Goeller |
| D549,151 S | 8/2007 | Janssis et al. |
| D549,152 S | 8/2007 | Goeller |
| 7,256,565 B2 | 8/2007 | Merkel et al. |
| 7,257,856 B2 | 8/2007 | Zimmer |
| 7,258,233 B2 | 8/2007 | Lee |
| 7,272,890 B2 | 9/2007 | Zimmer et al. |
| D552,486 S | 10/2007 | Herring et al. |
| 7,281,294 B2 | 10/2007 | Wilms et al. |
| D556,118 S | 11/2007 | Claes |
| 7,293,321 B2 | 11/2007 | Breesch |
| 7,299,520 B2 | 11/2007 | Huang |
| 7,316,047 B2 | 1/2008 | Thienard |
| 7,316,048 B2 | 1/2008 | Yamane et al. |
| 7,316,087 B1 | 1/2008 | Smith |
| D564,434 S | 3/2008 | Claes |
| D564,955 S | 3/2008 | Claes |
| 7,337,900 B2 | 3/2008 | Reiber et al. |
| 7,341,396 B2 * | 3/2008 | Huang ................ B60S 1/4003 |
| | | 15/250.31 |
| 7,353,562 B2 | 4/2008 | Huang |
| D569,327 S | 5/2008 | Lin |
| D569,328 S | 5/2008 | Lin |
| 7,370,385 B2 | 5/2008 | Chiang |
| D573,457 S | 7/2008 | Park |
| 7,398,577 B2 | 7/2008 | Genet |
| D575,146 S | 8/2008 | Lee |
| D577,324 S | 9/2008 | McCray |
| 7,434,291 B2 | 10/2008 | Chiang |
| D579,849 S | 11/2008 | Garrastacho et al. |
| 7,451,520 B2 | 11/2008 | Weiler et al. |
| D582,765 S | 12/2008 | Gustafson et al. |
| 7,461,429 B2 | 12/2008 | Huang |
| 7,464,433 B2 | 12/2008 | Thomar et al. |
| D584,160 S | 1/2009 | Zimmermann |
| 7,472,451 B2 | 1/2009 | Hara et al. |
| D586,663 S | 2/2009 | Tidqvist |
| D586,716 S | 2/2009 | Radfar |
| D586,717 S | 2/2009 | Depondt |
| D587,186 S | 2/2009 | Herinckx et al. |
| 7,484,264 B2 | 2/2009 | Kraemer et al. |
| 7,493,672 B2 | 2/2009 | Op't Roodt |
| D588,933 S | 3/2009 | Bonzagni et al. |
| 7,503,095 B2 | 3/2009 | Lin et al. |
| 7,506,401 B2 | 3/2009 | Park |
| 7,509,704 B2 | 3/2009 | Bauer et al. |
| 7,523,519 B2 | 4/2009 | Egner-Walter et al. |

(56) References Cited

U.S. PATENT DOCUMENTS

| | | |
|---|---|---|
| 7,523,520 B2 | 4/2009 | Breesch |
| 7,523,522 B2 | 4/2009 | Herring et al. |
| D592,121 S | 5/2009 | Bratec et al. |
| 7,526,832 B2 | 5/2009 | Matsumoto et al. |
| 7,527,151 B2 | 5/2009 | Park |
| D593,480 S | 6/2009 | Kim |
| D593,923 S | 6/2009 | Bratec et al. |
| 7,543,353 B2 | 6/2009 | Ko |
| 7,552,502 B2 | 6/2009 | Kagawa et al. |
| D596,102 S | 7/2009 | Kim |
| 7,559,110 B1 | 7/2009 | Kotlarski et al. |
| D601,077 S | 9/2009 | Kim |
| 7,581,280 B2 | 9/2009 | Op't Roodt et al. |
| 7,581,887 B2 | 9/2009 | Zimmer |
| 7,584,520 B2 * | 9/2009 | Hussaini ............... B60S 1/4003 15/250.32 |
| 7,596,479 B2 | 9/2009 | Weiler et al. |
| 7,603,741 B2 | 10/2009 | Verelst et al. |
| 7,603,742 B2 | 10/2009 | Nakano et al. |
| 7,607,194 B2 | 10/2009 | Weber et al. |
| 7,614,499 B2 | 11/2009 | Mueller |
| 7,621,016 B2 | 11/2009 | Verelst et al. |
| 7,628,560 B2 | 12/2009 | Westermann et al. |
| 7,634,833 B2 | 12/2009 | Boland et al. |
| 7,636,980 B2 | 12/2009 | Nakano |
| D608,717 S | 1/2010 | Aglassinger |
| D610,518 S | 2/2010 | Aglassinger |
| D610,519 S | 2/2010 | Aglassinger |
| D610,520 S | 2/2010 | Aglassinger |
| D611,809 S | 3/2010 | Borgerson et al. |
| 7,669,276 B2 | 3/2010 | Verelst et al. |
| 7,687,565 B2 | 3/2010 | Geilenkirchen |
| 7,690,073 B2 | 4/2010 | Marmoy et al. |
| 7,690,509 B2 | 4/2010 | Herring et al. |
| 7,699,169 B2 | 4/2010 | Lewis |
| D615,918 S | 5/2010 | Kim |
| 7,707,680 B2 | 5/2010 | Hawighorst et al. |
| 7,716,780 B2 | 5/2010 | Scholl et al. |
| 7,718,509 B2 | 5/2010 | Endo et al. |
| 7,743,457 B2 | 6/2010 | Metz |
| 7,748,076 B2 | 7/2010 | Weiler et al. |
| D621,322 S | 8/2010 | Lee et al. |
| 7,780,214 B2 | 8/2010 | Kraus et al. |
| 7,788,761 B2 | 9/2010 | Weiler et al. |
| 7,793,382 B2 | 9/2010 | Van De Rovaart |
| 7,797,787 B2 | 9/2010 | Wilms et al. |
| 7,805,800 B2 | 10/2010 | Wilms et al. |
| 7,810,206 B2 | 10/2010 | Weiler et al. |
| 7,814,611 B2 | 10/2010 | Heinrich et al. |
| D627,288 S | 11/2010 | Lee |
| 7,823,953 B2 | 11/2010 | Haas |
| 7,832,045 B2 | 11/2010 | Weiler et al. |
| 7,832,047 B2 | 11/2010 | Herinckx et al. |
| 7,836,542 B2 | 11/2010 | Dietrich et al. |
| 7,849,553 B2 | 12/2010 | Weiler et al. |
| D632,557 S | 2/2011 | Clamagirand et al. |
| 7,886,401 B2 | 2/2011 | Weber et al. |
| 7,891,043 B2 | 2/2011 | Kraus et al. |
| 7,891,044 B2 | 2/2011 | Fink et al. |
| 7,895,702 B2 | 3/2011 | Tisch et al. |
| 7,895,703 B2 | 3/2011 | Ina et al. |
| 7,898,141 B2 | 3/2011 | Hurst et al. |
| 7,899,596 B2 | 3/2011 | Zimmer |
| 7,908,703 B2 | 3/2011 | Van Bealen |
| 7,908,704 B2 | 3/2011 | Kraemer |
| 7,921,503 B1 | 4/2011 | Chiang |
| 7,921,504 B1 | 4/2011 | Chiang |
| 7,921,506 B2 | 4/2011 | Chiang |
| 7,926,659 B2 | 4/2011 | Kim |
| 7,930,796 B2 | 4/2011 | Weiler et al. |
| D637,132 S | 5/2011 | Kim |
| 7,937,798 B2 | 5/2011 | Fink et al. |
| 7,941,891 B2 | 5/2011 | Breesch |
| 7,941,892 B2 | 5/2011 | Kraus et al. |
| 7,945,985 B2 | 5/2011 | Stubner |
| 7,945,987 B2 | 5/2011 | Verelst et al. |
| 7,950,717 B2 | 5/2011 | Metz |
| 7,962,787 B2 | 6/2011 | Camilleri et al. |
| 7,966,689 B2 | 6/2011 | Rovaart et al. |
| 7,971,312 B2 | 7/2011 | Crabee et al. |
| 7,975,849 B2 | 7/2011 | Kim |
| 7,979,950 B2 | 7/2011 | Boland |
| 7,989,955 B2 | 8/2011 | Yagi |
| 7,989,995 B2 | 8/2011 | Reith et al. |
| 7,992,248 B2 | 8/2011 | Koppen et al. |
| 7,996,953 B2 | 8/2011 | Braun et al. |
| D644,925 S | 9/2011 | Jaworski |
| 8,020,246 B2 | 9/2011 | Bauer et al. |
| 8,020,248 B2 | 9/2011 | Hasegawa |
| 8,020,249 B2 | 9/2011 | Masuda et al. |
| 8,024,836 B2 | 9/2011 | Moll et al. |
| 8,026,645 B2 | 9/2011 | Stubner et al. |
| D647,451 S | 10/2011 | Lin |
| 8,042,690 B2 | 10/2011 | Lewis |
| D647,795 S | 11/2011 | Eaton et al. |
| 8,051,526 B2 | 11/2011 | Summerville et al. |
| 8,060,976 B2 | 11/2011 | Mayer et al. |
| 8,069,528 B2 | 12/2011 | Verelst et al. |
| 8,076,807 B2 | 12/2011 | Bohn et al. |
| D651,509 S | 1/2012 | Methe et al. |
| 8,096,013 B2 | 1/2012 | Eschenbrenner et al. |
| 8,099,823 B2 | 1/2012 | Kraemer et al. |
| 8,104,134 B2 | 1/2012 | Ritt |
| 8,104,136 B2 | 1/2012 | Carangelo |
| 8,117,710 B2 | 2/2012 | Kraus et al. |
| 8,125,111 B2 | 2/2012 | Bohn et al. |
| 8,141,198 B2 | 3/2012 | Wilms et al. |
| 8,148,467 B2 | 4/2012 | Pieters et al. |
| 8,151,656 B2 | 4/2012 | Nicgorski, II |
| 8,156,604 B2 | 4/2012 | Kraus et al. |
| 8,156,605 B2 | 4/2012 | Dietrich et al. |
| 8,165,796 B2 | 4/2012 | Hoetzer |
| D658,494 S | 5/2012 | Raimer et al. |
| 8,166,605 B2 | 5/2012 | Lee |
| 8,169,791 B2 | 5/2012 | Wolf et al. |
| 8,180,518 B2 | 5/2012 | Petricoin, Jr. |
| 8,181,305 B2 | 5/2012 | Boos |
| 8,181,306 B2 | 5/2012 | Merkel |
| 8,181,307 B2 | 5/2012 | Wilms et al. |
| 8,181,308 B2 | 5/2012 | Kwon et al. |
| 8,186,002 B2 | 5/2012 | Kinnaert et al. |
| 8,191,200 B2 | 6/2012 | Kim |
| 8,191,201 B2 | 6/2012 | De Block et al. |
| 8,196,253 B2 | 6/2012 | Barlas |
| 8,196,254 B2 | 6/2012 | Mahfoudh et al. |
| 8,196,255 B2 | 6/2012 | De Block et al. |
| 8,205,290 B2 | 6/2012 | Weiler et al. |
| 8,205,291 B2 | 6/2012 | Eschenbrenner et al. |
| 8,214,965 B2 | 7/2012 | Volz et al. |
| 8,230,547 B2 | 7/2012 | Wilms et al. |
| 8,234,746 B2 | 8/2012 | Lutterodt et al. |
| 8,245,350 B2 | 8/2012 | Van De Rostyne et al. |
| 8,256,851 B2 | 9/2012 | Pelosse |
| 8,261,403 B2 | 9/2012 | Ehde |
| 8,261,405 B2 | 9/2012 | Kim et al. |
| 8,261,628 B2 | 9/2012 | Moecklin et al. |
| 8,266,759 B2 | 9/2012 | Braun et al. |
| 8,272,096 B2 | 9/2012 | Wilms et al. |
| 8,272,360 B2 | 9/2012 | Hartmann et al. |
| 8,286,533 B2 | 10/2012 | Hurst et al. |
| 8,294,327 B2 | 10/2012 | Chaumet et al. |
| D671,827 S | 12/2012 | Raimer et al. |
| 8,322,456 B2 | 12/2012 | Pozgay et al. |
| 8,327,500 B2 | 12/2012 | De Block et al. |
| 8,328,011 B2 | 12/2012 | Skurdalsvold et al. |
| 8,333,093 B2 | 12/2012 | Kleckner et al. |
| D674,733 S | 1/2013 | Lee |
| 8,341,799 B2 * | 1/2013 | Koppen ............... B60S 1/4003 15/250.201 |
| 8,356,520 B2 | 1/2013 | Hurst et al. |
| 8,359,701 B2 | 1/2013 | De Block et al. |
| 8,361,595 B2 | 1/2013 | Van De Rostyne et al. |
| 8,370,986 B2 | 2/2013 | Wilms et al. |
| 8,370,987 B2 | 2/2013 | Ritt |

(56) References Cited

U.S. PATENT DOCUMENTS

| | | |
|---|---|---|
| 8,370,988 B2 | 2/2013 | Kraus et al. |
| 8,373,322 B2 | 2/2013 | Wegner et al. |
| 8,375,503 B2 | 2/2013 | Aznag |
| 8,381,348 B2 | 2/2013 | Egner-Walter et al. |
| 8,381,349 B2 | 2/2013 | Ku |
| 8,381,350 B2 | 2/2013 | Op't Roodt et al. |
| 8,397,340 B2 | 3/2013 | Weiler et al. |
| 8,397,341 B2 | 3/2013 | Ehde |
| D679,234 S | 4/2013 | Depondt |
| D679,235 S | 4/2013 | Depondt |
| D680,051 S | 4/2013 | Tolentino et al. |
| 8,410,651 B2 | 4/2013 | Lauk |
| 8,413,202 B2 | 4/2013 | Yang et al. |
| 8,413,291 B2 | 4/2013 | Wu |
| 8,418,644 B2 | 4/2013 | Fiedor et al. |
| 8,424,149 B2 | 4/2013 | Coemans et al. |
| 8,429,786 B2 | 4/2013 | Van Baelen et al. |
| 8,434,621 B2 | 5/2013 | Hun et al. |
| 8,448,289 B2 | 5/2013 | Reith et al. |
| 8,448,290 B2 | 5/2013 | Op't Roodt et al. |
| D684,862 S | 6/2013 | DiFranza |
| 8,453,292 B2 | 6/2013 | Jeon |
| D685,260 S | 7/2013 | Thielemier |
| D686,912 S | 7/2013 | Ehde et al. |
| 8,474,088 B2 | 7/2013 | Wu |
| 8,484,794 B2 | 7/2013 | Westermann et al. |
| 8,490,239 B2 | 7/2013 | Ehde |
| 8,495,787 B2 | 7/2013 | Garrastacho et al. |
| 8,499,408 B2 | 8/2013 | Boland |
| 8,505,151 B2 | 8/2013 | Depondt et al. |
| 8,505,152 B2 | 8/2013 | Boland |
| 8,505,724 B2 | 8/2013 | Bult et al. |
| 8,510,895 B2 | 8/2013 | Beelen et al. |
| 8,510,897 B2 | 8/2013 | Ku |
| 8,510,898 B2 | 8/2013 | Ku |
| 8,522,393 B2 | 9/2013 | Boland |
| 8,539,634 B2 | 9/2013 | Wilms et al. |
| 8,544,136 B2 | 10/2013 | Kraemer et al. |
| 8,544,137 B2 | 10/2013 | Thienard |
| 8,549,695 B2 | 10/2013 | Reith et al. |
| 8,552,113 B2 | 10/2013 | Pieters et al. |
| 8,555,455 B2 | 10/2013 | Boland |
| 8,555,456 B2 | 10/2013 | Ehde |
| 8,561,717 B2 | 10/2013 | Pozgay et al. |
| D692,750 S | 11/2013 | Ehde et al. |
| D692,818 S | 11/2013 | Tolentino et al. |
| D692,819 S | 11/2013 | Tolentino et al. |
| D693,213 S | 11/2013 | Lee et al. |
| 8,574,791 B2 | 11/2013 | Maus et al. |
| 8,575,078 B2 | 11/2013 | Duval et al. |
| 8,581,530 B2 | 11/2013 | Tisch |
| 8,582,809 B2 | 11/2013 | Halimeh et al. |
| 8,584,303 B2 | 11/2013 | Wolfgarten et al. |
| 8,590,097 B2 | 11/2013 | Bohn et al. |
| D695,632 S | 12/2013 | Akana et al. |
| 8,595,888 B2 | 12/2013 | Op't Roodt et al. |
| 8,595,889 B2 | 12/2013 | Op't Roodt et al. |
| 8,613,357 B2 | 12/2013 | Putnam |
| D697,790 S | 1/2014 | Iwegbu |
| 8,646,181 B2 | 2/2014 | Baumann et al. |
| D700,524 S | 3/2014 | Ferriter |
| 8,661,602 B2 | 3/2014 | Op't Roodt et al. |
| D702,619 S | 4/2014 | Kim |
| 8,686,612 B2 | 4/2014 | Roos et al. |
| 8,707,506 B1 | 4/2014 | Wu |
| D704,127 S | 5/2014 | Depondt |
| D704,128 S | 5/2014 | Depondt |
| D704,129 S | 5/2014 | Depondt |
| D704,619 S | 5/2014 | Kim |
| D704,620 S | 5/2014 | Kim |
| 8,717,011 B2 | 5/2014 | Henning |
| 8,719,994 B2 | 5/2014 | Thienard et al. |
| 8,720,033 B2 | 5/2014 | Koppen et al. |
| 8,728,367 B2 | 5/2014 | Lay et al. |
| D706,200 S | 6/2014 | Tolentino et al. |
| D706,201 S | 6/2014 | Depondt |
| D706,202 S | 6/2014 | Depondt |
| 8,745,812 B2 | 6/2014 | Kruse et al. |
| 8,745,813 B2 | 6/2014 | Ishida et al. |
| 8,749,186 B2 | 6/2014 | Stubner et al. |
| 8,759,449 B2 | 6/2014 | Pieters et al. |
| D708,890 S | 7/2014 | Kim et al. |
| D709,362 S | 7/2014 | Kim |
| 8,769,762 B2 | 7/2014 | Op't Roodt et al. |
| 8,770,063 B2 | 7/2014 | Bhatti |
| 8,782,847 B2 | 7/2014 | Depondt |
| D711,217 S | 8/2014 | Jacobs et al. |
| 8,800,097 B2 | 8/2014 | Wegner et al. |
| 8,800,099 B2 | 8/2014 | Boland |
| 8,806,700 B2 | 8/2014 | Tolentino et al. |
| 8,813,608 B2 | 8/2014 | Hurst et al. |
| 8,823,228 B2 | 9/2014 | Mili et al. |
| 8,839,483 B2 | 9/2014 | Roodt et al. |
| D714,635 S | 10/2014 | Demar et al. |
| D715,142 S | 10/2014 | Allen et al. |
| 8,850,653 B2 | 10/2014 | Depondt |
| 8,854,455 B2 | 10/2014 | Haug |
| 8,857,595 B2 | 10/2014 | Mili et al. |
| 8,863,370 B2 | 10/2014 | Weiler et al. |
| 8,871,994 B2 | 10/2014 | Wei et al. |
| D717,225 S | 11/2014 | Kuo |
| 8,881,338 B2 | 11/2014 | Thielen et al. |
| 8,893,348 B2 | 11/2014 | Vankerkhove et al. |
| 8,909,421 B2 | 12/2014 | Zimmer |
| 8,913,132 B2 | 12/2014 | Seger et al. |
| 8,913,133 B2 | 12/2014 | Huelsen et al. |
| 8,917,323 B2 | 12/2014 | Seger et al. |
| 8,931,133 B2 | 1/2015 | Coart et al. |
| 8,935,056 B2 | 1/2015 | Zimmer |
| 8,938,847 B2 | 1/2015 | Avasiloaie et al. |
| 8,950,034 B2 | 2/2015 | Wilms |
| 8,950,035 B2 | 2/2015 | Benner et al. |
| 8,957,619 B2 | 2/2015 | Karcher |
| 8,963,464 B2 | 2/2015 | Braun et al. |
| D725,025 S | 3/2015 | Poton |
| 8,973,207 B2 | 3/2015 | Depondt |
| 8,973,209 B2 | 3/2015 | Depondt |
| 8,979,066 B2 | 3/2015 | Pfetzer et al. |
| 8,984,707 B2 | 3/2015 | Boland |
| 8,985,241 B2 | 3/2015 | Pozgay et al. |
| 8,997,304 B2 | 4/2015 | Oslizlo et al. |
| 9,003,594 B2 | 4/2015 | Guidez |
| 9,003,596 B2 | 4/2015 | Avasiloaie et al. |
| 9,008,905 B2 | 4/2015 | Prskawetz et al. |
| 9,015,896 B2 | 4/2015 | De Block |
| 9,018,877 B2 | 4/2015 | Braun et al. |
| 9,021,651 B2 | 5/2015 | Wolfgarten |
| 9,021,652 B2 | 5/2015 | Coemans et al. |
| 9,045,111 B2 | 6/2015 | Zimmer |
| 9,045,113 B2 | 6/2015 | Aznag et al. |
| 9,050,946 B2 | 6/2015 | Zimmer et al. |
| 9,056,595 B2 | 6/2015 | Wegner et al. |
| 9,071,089 B2 | 6/2015 | Kastinger et al. |
| 9,073,519 B2 * | 7/2015 | Depondt ............... B60S 1/387 |
| 9,079,567 B2 | 7/2015 | Wegner et al. |
| 9,096,196 B2 | 8/2015 | Wipfr |
| 9,108,595 B2 * | 8/2015 | Tolentino ............... B60S 1/387 |
| 9,114,754 B2 | 8/2015 | Ehlgen et al. |
| 9,114,783 B2 | 8/2015 | Depondt |
| 9,120,463 B2 | 9/2015 | Kim et al. |
| 9,120,464 B2 | 9/2015 | Pack et al. |
| 9,151,372 B2 | 10/2015 | Keller |
| 9,174,609 B2 | 11/2015 | Tolentino et al. |
| 9,174,611 B2 | 11/2015 | Tolentino et al. |
| 9,180,839 B2 | 11/2015 | Oslizlo et al. |
| D744,331 S | 12/2015 | Vos et al. |
| 9,211,867 B2 | 12/2015 | Beelen et al. |
| 9,211,868 B2 | 12/2015 | Bousset et al. |
| 9,225,274 B2 | 12/2015 | Lingenfelser et al. |
| D746,700 S | 1/2016 | Boehnen et al. |
| 9,227,596 B2 | 1/2016 | Van De Rovaart et al. |
| 9,227,598 B2 | 1/2016 | Smets et al. |
| 9,233,664 B2 | 1/2016 | Weidlich |
| 9,254,820 B2 | 2/2016 | Geubel et al. |

(56) References Cited

U.S. PATENT DOCUMENTS

| | | |
|---|---|---|
| 9,260,085 B2 | 2/2016 | Bex et al. |
| 9,266,504 B2 | 2/2016 | De Block |
| 9,272,676 B2 | 3/2016 | Heger et al. |
| 9,505,380 B2 | 11/2016 | Tolentino et al. |
| D777,079 S | 1/2017 | Tolentino et al. |
| D784,804 S | 4/2017 | Peers et al. |
| D787,308 S | 5/2017 | Kawashima et al. |
| D787,312 S | 5/2017 | Peers et al. |
| 2001/0013236 A1 | 8/2001 | Weyerstall et al. |
| 2002/0043092 A1 | 4/2002 | Jones et al. |
| 2002/0112306 A1 | 8/2002 | Komerska |
| 2002/0174505 A1* | 11/2002 | Kim ............ B60S 1/40 15/250.32 |
| 2003/0014828 A1 | 1/2003 | Edner-Walter et al. |
| 2003/0028990 A1 | 2/2003 | Zimmer |
| 2003/0033683 A1 | 2/2003 | Kotlarski |
| 2003/0074763 A1 | 4/2003 | Egner-Walter et al. |
| 2003/0159229 A1 | 8/2003 | Weiler et al. |
| 2003/0209049 A1 | 11/2003 | Jones et al. |
| 2003/0221276 A1 | 12/2003 | Siklosi |
| 2003/0229961 A1 | 12/2003 | Barnett |
| 2004/0010882 A1 | 1/2004 | Breesch |
| 2004/0025280 A1 | 2/2004 | Krickau et al. |
| 2004/0025281 A1 | 2/2004 | Baseotto et al. |
| 2004/0052577 A1 | 3/2004 | Lee et al. |
| 2004/0098821 A1 | 5/2004 | Kraemer et al. |
| 2004/0123414 A1* | 7/2004 | Lee ............ B60S 1/4003 15/250.32 |
| 2004/0159994 A1 | 8/2004 | Lenzen et al. |
| 2004/0211021 A1 | 10/2004 | Weber et al. |
| 2004/0244137 A1 | 12/2004 | Poton |
| 2004/0250369 A1 | 12/2004 | Matsumoto et al. |
| 2005/0005387 A1 | 1/2005 | Kinoshita et al. |
| 2005/0011033 A1 | 1/2005 | Thomar et al. |
| 2005/0039292 A1 | 2/2005 | Boland |
| 2005/0166349 A1 | 8/2005 | Nakano et al. |
| 2005/0177970 A1 | 8/2005 | Scholl et al. |
| 2005/0252812 A1 | 11/2005 | Lewis |
| 2006/0010636 A1 | 1/2006 | Vacher |
| 2006/0026786 A1 | 2/2006 | Ku |
| 2006/0112511 A1 | 6/2006 | Op't Roodt et al. |
| 2006/0117515 A1 | 6/2006 | Fink et al. |
| 2006/0130263 A1* | 6/2006 | Coughlin ............ B60S 1/40 15/250.32 |
| 2006/0156529 A1 | 7/2006 | Thomar et al. |
| 2006/0179597 A1 | 8/2006 | Hoshino et al. |
| 2006/0218740 A1 | 10/2006 | Coughlin |
| 2006/0230571 A1 | 10/2006 | Son |
| 2006/0248675 A1 | 11/2006 | Vacher et al. |
| 2006/0282972 A1 | 12/2006 | Huang |
| 2007/0017056 A1 | 1/2007 | Cooke et al. |
| 2007/0067939 A1 | 3/2007 | Huang |
| 2007/0067941 A1 | 3/2007 | Huang |
| 2007/0089257 A1 | 4/2007 | Harita et al. |
| 2007/0089527 A1 | 4/2007 | Shank et al. |
| 2007/0186366 A1 | 8/2007 | Alley |
| 2007/0220698 A1 | 9/2007 | Huang |
| 2007/0226940 A1 | 10/2007 | Thienard |
| 2007/0226941 A1 | 10/2007 | Kraemer et al. |
| 2007/0234501 A1 | 10/2007 | Ho et al. |
| 2007/0266517 A1 | 11/2007 | Kim et al. |
| 2008/0083082 A1 | 4/2008 | Rovaart et al. |
| 2008/0086830 A1* | 4/2008 | Kim ............ B60S 1/4003 15/250.32 |
| 2008/0092320 A1 | 4/2008 | Cempura et al. |
| 2008/0098554 A1 | 5/2008 | Cho |
| 2008/0115308 A1 | 5/2008 | Lee |
| 2008/0148509 A1 | 6/2008 | Bacarella et al. |
| 2008/0196192 A1 | 8/2008 | Yao |
| 2008/0222830 A1 | 9/2008 | Chiang |
| 2008/0222831 A1 | 9/2008 | Thienard |
| 2008/0222832 A1 | 9/2008 | Huang |
| 2008/0263805 A1 | 10/2008 | Sebring |
| 2008/0289133 A1 | 11/2008 | Kim |
| 2009/0007364 A1 | 1/2009 | Jarasson et al. |
| 2009/0013492 A1 | 1/2009 | Henin |
| 2009/0056049 A1 | 3/2009 | Jarasson et al. |
| 2009/0064440 A1 | 3/2009 | Boland |
| 2009/0126140 A1 | 5/2009 | Heinrich et al. |
| 2009/0151110 A1 | 6/2009 | Ku |
| 2009/0158545 A1 | 6/2009 | Grasso et al. |
| 2009/0158547 A1 | 6/2009 | Kim |
| 2009/0172910 A1 | 7/2009 | De Block et al. |
| 2009/0178226 A1 | 7/2009 | Lee et al. |
| 2009/0199357 A1 | 8/2009 | Thienard |
| 2010/0000041 A1 | 1/2010 | Boland |
| 2010/0005608 A1 | 1/2010 | Chien |
| 2010/0005609 A1 | 1/2010 | Kim |
| 2010/0024149 A1* | 2/2010 | Erdal ............ B60S 1/3868 15/250.32 |
| 2010/0024151 A1 | 2/2010 | Ku |
| 2010/0050360 A1 | 3/2010 | Chiang |
| 2010/0050361 A1 | 3/2010 | Chang et al. |
| 2010/0064468 A1 | 3/2010 | Kang |
| 2010/0083454 A1 | 4/2010 | Op't Roodt et al. |
| 2010/0186185 A1 | 7/2010 | Grasso et al. |
| 2010/0205763 A1 | 8/2010 | Ku |
| 2010/0212101 A1 | 8/2010 | Thienard et al. |
| 2010/0236008 A1 | 9/2010 | Yang et al. |
| 2010/0236675 A1 | 9/2010 | Schneider |
| 2010/0242204 A1 | 9/2010 | Chien |
| 2010/0281645 A1 | 11/2010 | Kim et al. |
| 2011/0005020 A1* | 1/2011 | Koppen ............ B60S 1/4003 15/250.32 |
| 2011/0041280 A1 | 2/2011 | Choi et al. |
| 2011/0047742 A1 | 3/2011 | Kim et al. |
| 2011/0072607 A1 | 3/2011 | Van Baelen et al. |
| 2011/0107542 A1 | 5/2011 | Op't Roodt |
| 2011/0113582 A1 | 5/2011 | Kruse et al. |
| 2011/0113583 A1 | 5/2011 | Shanmugham et al. |
| 2011/0162161 A1 | 7/2011 | Amado |
| 2011/0192511 A1 | 8/2011 | Marrone |
| 2011/0219563 A1 | 9/2011 | Guastella et al. |
| 2011/0277264 A1 | 11/2011 | Ehde |
| 2011/0277266 A1 | 11/2011 | Umeno |
| 2012/0027206 A1 | 2/2012 | Suzuki et al. |
| 2012/0047673 A1 | 3/2012 | Depondt |
| 2012/0054976 A1 | 3/2012 | Yang et al. |
| 2012/0060316 A1 | 3/2012 | Avasiloaie et al. |
| 2012/0090123 A1 | 4/2012 | Caillot et al. |
| 2012/0102669 A1 | 5/2012 | Lee et al. |
| 2012/0144615 A1 | 6/2012 | Song et al. |
| 2012/0159733 A1 | 6/2012 | Kwon |
| 2012/0180245 A1 | 7/2012 | Ku |
| 2012/0180246 A1 | 7/2012 | Ku |
| 2012/0186035 A1 | 7/2012 | Lee |
| 2012/0266405 A1 | 10/2012 | Tolentinto et al. |
| 2012/0279008 A1 | 11/2012 | Depondt |
| 2012/0311808 A1 | 12/2012 | Yang et al. |
| 2012/0317740 A1 | 12/2012 | Yang et al. |
| 2013/0025084 A1 | 1/2013 | Tolentino et al. |
| 2013/0067674 A1* | 3/2013 | Chiang ............ B60S 1/4003 15/250.32 |
| 2013/0067675 A1 | 3/2013 | Chien |
| 2013/0067678 A1 | 3/2013 | Ehde |
| 2013/0104334 A1 | 5/2013 | Depondt |
| 2013/0117957 A1 | 5/2013 | Ku |
| 2013/0125333 A1 | 5/2013 | Tolentino et al. |
| 2013/0152323 A1 | 6/2013 | Chien |
| 2013/0152326 A1 | 6/2013 | Oslizlo et al. |
| 2013/0152330 A1 | 6/2013 | Kim et al. |
| 2013/0167316 A1 | 7/2013 | Egner-Walter et al. |
| 2013/0185889 A1 | 7/2013 | Tolentino et al. |
| 2013/0192015 A1 | 8/2013 | Tolentino et al. |
| 2013/0192016 A1 | 8/2013 | Kim et al. |
| 2013/0198992 A1 | 8/2013 | Tolentino et al. |
| 2013/0205532 A1 | 8/2013 | Tolentino et al. |
| 2013/0219649 A1 | 8/2013 | Tolentinto et al. |
| 2013/0227809 A1 | 9/2013 | Tolentinto et al. |
| 2013/0227810 A1 | 9/2013 | Tolentinto et al. |
| 2013/0247323 A1 | 9/2013 | Geubel et al. |
| 2013/0255026 A1 | 10/2013 | Depondt |
| 2013/0263400 A1 | 10/2013 | Duesterhoeft et al. |
| 2013/0291329 A1 | 11/2013 | Izabel |

(56) References Cited

U.S. PATENT DOCUMENTS

| | | |
|---|---|---|
| 2013/0298348 A1 | 11/2013 | Caillot et al. |
| 2013/0305475 A1 | 11/2013 | Kim et al. |
| 2013/0305478 A1 | 11/2013 | Kim et al. |
| 2013/0333145 A1 | 12/2013 | Depondt |
| 2013/0333146 A1 | 12/2013 | Depondt |
| 2014/0026348 A1 | 1/2014 | Schaeuble |
| 2014/0026349 A1 | 1/2014 | Schaeuble |
| 2014/0026350 A1 | 1/2014 | Boland |
| 2014/0068886 A1 | 3/2014 | Ku |
| 2014/0082875 A1 | 3/2014 | Peers et al. |
| 2014/0115811 A1 | 5/2014 | Kim et al. |
| 2014/0130287 A1 | 5/2014 | Bex et al. |
| 2014/0150198 A1 | 6/2014 | Kim et al. |
| 2014/0182075 A1 | 7/2014 | Polocoser et al. |
| 2014/0196241 A1 | 7/2014 | Kim et al. |
| 2014/0259504 A1 | 9/2014 | Piotrowski et al. |
| 2014/0259505 A1 | 9/2014 | Fournier et al. |
| 2014/0317875 A1 | 10/2014 | Tolentino et al. |
| 2014/0338144 A1 | 11/2014 | An et al. |
| 2014/0359963 A1 | 12/2014 | An et al. |
| 2014/0373301 A1 | 12/2014 | Kim et al. |
| 2015/0026908 A1 | 1/2015 | Izabel et al. |
| 2015/0047141 A1 | 2/2015 | Houssat et al. |
| 2015/0059116 A1 | 3/2015 | An et al. |
| 2015/0074935 A1 | 3/2015 | An et al. |
| 2015/0089764 A1 | 4/2015 | Wu |
| 2015/0135468 A1 | 5/2015 | Kim |
| 2015/0158463 A1 | 6/2015 | Yi |
| 2015/0166016 A1 | 6/2015 | Wang |
| 2015/0246659 A1 | 9/2015 | Park |
| 2015/0251636 A1 | 9/2015 | Kim et al. |
| 2015/0251637 A1 | 9/2015 | Tolentino et al. |
| 2015/0258965 A1 | 9/2015 | An |
| 2015/0274130 A1 | 10/2015 | Tolentinto et al. |
| 2015/0274131 A1 | 10/2015 | Tolentino et al. |
| 2015/0353054 A1 | 12/2015 | Tolentino et al. |
| 2016/0046263 A1 | 2/2016 | Tolentino et al. |
| 2016/0059828 A1 | 3/2016 | Tolentino et al. |
| 2016/0159323 A1 | 6/2016 | Tolentinto et al. |
| 2016/0280186 A1 | 9/2016 | Peers et al. |
| 2016/0375867 A1 | 12/2016 | Tolentino et al. |
| 2017/0057464 A1 | 3/2017 | Tolentinto et al. |
| 2017/0072912 A1 | 3/2017 | Tolentino et al. |
| 2017/0113656 A1 | 4/2017 | Tolentino |

FOREIGN PATENT DOCUMENTS

| | | |
|---|---|---|
| AU | 410701 | 2/1971 |
| AU | 649730 | 6/1994 |
| AU | 729371 | 7/2001 |
| AU | 741730 | 12/2001 |
| AU | 762557 | 6/2003 |
| AU | 770944 | 3/2004 |
| AU | 2003257828 | 3/2004 |
| AU | 780818 | 4/2005 |
| AU | 2006100618 | 8/2006 |
| AU | 2006241297 | 6/2007 |
| AU | 2006203445 | 10/2007 |
| AU | 2008100641 | 8/2008 |
| AU | 2009238193 | 10/2009 |
| AU | 2009324257 | 8/2010 |
| AU | 2010294766 A1 | 2/2012 |
| BR | 8304484 | 4/1984 |
| BR | 8604381 | 5/1987 |
| BR | 8707390 | 11/1988 |
| BR | 8903473 | 3/1990 |
| BR | 8907154 | 2/1991 |
| BR | 9005080 | 8/1991 |
| BR | 9105809 | 8/1992 |
| BR | 9200129 | 10/1992 |
| BR | 0006164 | 4/2001 |
| BR | 0007263 | 10/2001 |
| BR | 0106665 | 4/2002 |
| BR | 0106667 | 4/2002 |
| BR | 0306135 | 10/2004 |
| BR | PI0411532 | 8/2006 |
| BR | PI0506158 | 10/2006 |
| BR | PI0007263 | 1/2009 |
| BR | PI0519259 | 1/2009 |
| BR | 0006917 | 8/2009 |
| BR | PI0606903 | 8/2009 |
| BR | PI0901324 | 4/2010 |
| BR | PI0006963 | 9/2010 |
| BR | PI0706762 | 4/2011 |
| BR | PI1000961 | 6/2011 |
| BR | PI0621265 | 12/2011 |
| CA | 954258 | 9/1974 |
| CA | 966609 | 4/1975 |
| CA | 1038117 | 9/1978 |
| CA | 1075414 | 4/1980 |
| CA | 1124462 | 6/1982 |
| CA | 1184712 | 4/1985 |
| CA | 1257059 | 7/1989 |
| CA | 1263803 | 12/1989 |
| CA | 2027227 | 4/1991 |
| CA | 1289308 | 9/1991 |
| CA | 2037400 | 2/1992 |
| CA | 2093956 | 4/1992 |
| CA | 2079846 | 7/1993 |
| CA | 2118874 | 9/1994 |
| CA | 2156345 | 2/1996 |
| CA | 2174030 | 5/1997 |
| CA | 2260175 | 1/1998 |
| CA | 2220462 | 7/1998 |
| CA | 2243143 | 1/1999 |
| CA | 2344888 | 4/2000 |
| CA | 2414099 | 1/2002 |
| CA | 2472914 | 8/2003 |
| CA | 2487799 | 12/2003 |
| CA | 2515071 | 8/2004 |
| CA | 2242776 | 7/2005 |
| CA | 2553977 | 9/2005 |
| CA | 2554048 A1 | 9/2005 |
| CA | 2514372 | 1/2006 |
| CA | 2574330 | 2/2006 |
| CA | 2523315 | 4/2006 |
| CA | 2541641 | 4/2006 |
| CA | 2522729 | 6/2006 |
| CA | 2598104 | 9/2006 |
| CA | 2550409 | 11/2006 |
| CA | 2568561 | 5/2007 |
| CA | 2569175 | 5/2007 |
| CA | 2569176 | 5/2007 |
| CA | 2569977 | 6/2007 |
| CA | 2560155 | 9/2007 |
| CA | 2645821 | 10/2007 |
| CA | 2649474 | 11/2007 |
| CA | 2649760 | 11/2007 |
| CA | 2651069 | 11/2007 |
| CA | 2590443 | 4/2008 |
| CA | 2631513 | 5/2008 |
| CA | 2574242 | 7/2008 |
| CA | 2617013 | 11/2008 |
| CA | 2628517 | 4/2009 |
| CA | 2671767 | 1/2010 |
| CA | 2500891 | 5/2011 |
| CA | 2789431 | 8/2011 |
| CA | 2809243 | 3/2012 |
| CA | 2809292 | 3/2012 |
| CA | 2809947 | 3/2012 |
| CA | 2831801 A1 | 10/2012 |
| CA | 2835703 | 11/2012 |
| CA | 2835703 A1 | 11/2012 |
| CA | 2843527 | 1/2013 |
| CA | 2843527 A1 | 1/2013 |
| CA | 2843637 | 2/2013 |
| CA | 2843637 A1 | 2/2013 |
| CA | 2843644 | 2/2013 |
| CA | 2843644 A1 | 2/2013 |
| CA | 2797693 | 5/2013 |
| CA | 147027 S | 6/2013 |
| CA | 147028 S | 6/2013 |
| CA | 2799267 | 6/2013 |
| CA | 2740384 | 7/2013 |

(56) References Cited

FOREIGN PATENT DOCUMENTS

| | | |
|---|---|---|
| CA | 2740384 C | 7/2013 |
| CA | 2865292 A1 | 8/2013 |
| CA | 2906863 A1 | 9/2014 |
| CA | 2898928 A1 | 1/2017 |
| CA | 2865295 C | 3/2017 |
| CL | 2014002239 A1 | 5/2015 |
| CL | 2014002241 A1 | 5/2015 |
| CL | 2015002693 A1 | 4/2016 |
| CN | 101983148 | 3/2011 |
| CN | 202593459 | 12/2012 |
| CN | 102963337 | 3/2013 |
| CN | 102991462 | 3/2013 |
| CN | 102991466 | 3/2013 |
| CN | 103101514 | 5/2013 |
| CN | 103101516 | 5/2013 |
| CN | 103108782 | 5/2013 |
| CN | 103183008 | 7/2013 |
| CN | 103183009 | 7/2013 |
| CN | 103183009 A | 7/2013 |
| CN | 103223923 | 7/2013 |
| CN | 103223923 A | 7/2013 |
| CN | 103228498 | 7/2013 |
| CN | 103228498 A | 7/2013 |
| CO | 7141449 A2 | 12/2014 |
| CO | 7141460 A2 | 12/2014 |
| DE | 2309063 | 8/1974 |
| DE | 2311293 | 9/1974 |
| DE | 2353368 | 5/1975 |
| DE | 3222864 | 12/1983 |
| DE | 3919050 A1 | 12/1990 |
| DE | 4439275 A1 | 5/1995 |
| DE | 19650929 | 6/1998 |
| DE | 19734843 | 2/1999 |
| DE | 19745460 | 4/1999 |
| DE | 19814609 | 10/1999 |
| DE | 10054287 | 5/2002 |
| DE | 10228494 A1 | 1/2004 |
| DE | 10320930 | 11/2004 |
| DE | 10343571 A1 | 4/2005 |
| DE | 102004019157 | 11/2005 |
| DE | 102004061088 | 6/2006 |
| DE | 102005019389 | 11/2006 |
| DE | 102005062462 A1 | 6/2007 |
| DE | 102006057024 | 6/2008 |
| DE | 102007030169 | 1/2009 |
| DE | 102007051549 | 4/2009 |
| DE | 102008042516 | 5/2009 |
| DE | 102008001045 | 10/2009 |
| DE | 102008021457 | 11/2009 |
| DE | 102008002447 | 12/2009 |
| DE | 102008049269 | 4/2010 |
| DE | 102008049270 | 4/2010 |
| DE | 102009000483 | 4/2010 |
| DE | 102009001025 | 8/2010 |
| DE | 102010012983 | 2/2011 |
| DE | 102009029469 | 3/2011 |
| DE | 102009029470 | 3/2011 |
| DE | 102009048212 | 4/2011 |
| DE | 102010016348 | 4/2011 |
| DE | 102010041152 A1 | 5/2011 |
| DE | 102010003269 | 9/2011 |
| DE | 202011005213 | 9/2011 |
| DE | 202011100429 | 9/2011 |
| DE | 102010003645 | 10/2011 |
| DE | 102010028102 | 10/2011 |
| DE | 102010029107 | 11/2011 |
| DE | 102010030880 | 1/2012 |
| DE | 102010039526 | 2/2012 |
| EP | 0594451 | 4/1994 |
| EP | 0633170 | 1/1995 |
| EP | 0665143 A1 | 8/1995 |
| EP | 0683703 | 11/1995 |
| EP | 0695246 | 2/1996 |
| EP | 0749378 | 12/1996 |
| EP | 0757636 | 2/1997 |
| EP | 0760761 | 3/1997 |
| EP | 0777594 | 6/1997 |
| EP | 0792704 | 9/1997 |
| EP | 0810936 | 12/1997 |
| EP | 0828638 | 3/1998 |
| EP | 0841229 | 5/1998 |
| EP | 0847346 | 6/1998 |
| EP | 0847347 | 6/1998 |
| EP | 0853561 | 7/1998 |
| EP | 0853563 | 7/1998 |
| EP | 0853565 | 7/1998 |
| EP | 0885791 A1 | 12/1998 |
| EP | 0914269 | 5/1999 |
| EP | 0926028 | 6/1999 |
| EP | 0930991 | 7/1999 |
| EP | 0935546 | 8/1999 |
| EP | 0943511 | 9/1999 |
| EP | 1022202 | 7/2000 |
| EP | 1037778 | 9/2000 |
| EP | 0783998 | 10/2000 |
| EP | 1056628 | 12/2000 |
| EP | 1098795 | 5/2001 |
| EP | 1098796 | 5/2001 |
| EP | 1109706 | 6/2001 |
| EP | 1119475 | 8/2001 |
| EP | 1119476 | 8/2001 |
| EP | 1178907 | 2/2002 |
| EP | 1197406 | 4/2002 |
| EP | 1243489 | 9/2002 |
| EP | 1247707 | 10/2002 |
| EP | 1257445 | 11/2002 |
| EP | 1289804 | 3/2003 |
| EP | 1289806 | 3/2003 |
| EP | 1294596 | 3/2003 |
| EP | 1337420 | 8/2003 |
| EP | 1412235 | 4/2004 |
| EP | 1017514 | 6/2004 |
| EP | 1425204 | 6/2004 |
| EP | 1436179 A1 | 7/2004 |
| EP | 1448414 | 8/2004 |
| EP | 1462327 | 9/2004 |
| EP | 1485279 | 12/2004 |
| EP | 1494901 | 1/2005 |
| EP | 1494902 | 1/2005 |
| EP | 1501710 | 2/2005 |
| EP | 1519862 | 4/2005 |
| EP | 1547883 | 6/2005 |
| EP | 1612113 | 1/2006 |
| EP | 1312522 | 4/2006 |
| EP | 1666319 | 6/2006 |
| EP | 1708911 A1 | 10/2006 |
| EP | 1719673 | 11/2006 |
| EP | 1733939 | 12/2006 |
| EP | 1740424 | 1/2007 |
| EP | 1744940 | 1/2007 |
| EP | 1753646 | 2/2007 |
| EP | 1758772 | 3/2007 |
| EP | 1769987 | 4/2007 |
| EP | 1792794 | 6/2007 |
| EP | 1799518 | 6/2007 |
| EP | 1800977 | 6/2007 |
| EP | 1800978 | 6/2007 |
| EP | 1833708 A1 | 9/2007 |
| EP | 1846274 | 10/2007 |
| EP | 1849666 A1 | 10/2007 |
| EP | 1937524 A1 | 7/2008 |
| EP | 2015971 | 1/2009 |
| EP | 2050638 | 4/2009 |
| EP | 2079617 | 7/2009 |
| EP | 2109557 | 10/2009 |
| EP | 2113432 | 11/2009 |
| EP | 2127969 | 12/2009 |
| EP | 2134576 | 12/2009 |
| EP | 2138363 A1 | 12/2009 |
| EP | 2143603 | 1/2010 |
| EP | 2146877 | 1/2010 |
| EP | 2177406 A2 | 4/2010 |
| EP | 2230140 | 9/2010 |
| EP | 2236364 A1 | 10/2010 |

(56) References Cited

FOREIGN PATENT DOCUMENTS

| | | |
|---|---|---|
| EP | 2236366 | 10/2010 |
| EP | 2253520 | 11/2010 |
| EP | 2258592 | 12/2010 |
| EP | 1559623 | 1/2011 |
| EP | 2300283 A1 | 3/2011 |
| EP | 2321160 | 5/2011 |
| EP | 2338747 | 6/2011 |
| EP | 2426017 | 3/2012 |
| EP | 002088146-0001 A1 | 8/2012 |
| EP | 002088146-0002 A1 | 8/2012 |
| EP | 2532558 A2 | 12/2012 |
| EP | 2551157 A1 | 1/2013 |
| EP | 2560847 A1 | 2/2013 |
| EP | 2571733 A1 | 3/2013 |
| EP | 2578458 A1 | 4/2013 |
| EP | 2421729 B1 | 3/2014 |
| EP | 2817183 A1 | 12/2014 |
| EP | 2817184 A1 | 12/2014 |
| EP | 002674887-0001 A1 | 2/2015 |
| EP | 2969671 A1 | 1/2016 |
| FR | 2437959 A1 | 4/1980 |
| FR | 2736025 A1 | 1/1997 |
| FR | 2738201 A1 | 3/1997 |
| FR | 2747976 | 10/1997 |
| FR | 2804392 A1 | 8/2001 |
| FR | 2879987 | 6/2006 |
| FR | 2957877 | 9/2011 |
| GB | 1395918 | 5/1975 |
| GB | 1405579 | 9/1975 |
| GB | 2188672 | 10/1987 |
| GB | 2220844 A | 1/1990 |
| GB | 2324237 | 10/1998 |
| GB | 2348118 A | 9/2000 |
| HK | 1110560 | 5/2010 |
| HK | 1105928 | 8/2010 |
| HK | 1108573 | 10/2011 |
| HK | 1110561 | 7/2012 |
| JP | 60092136 A | 5/1985 |
| JP | 0374242 A | 3/1991 |
| JP | 3572527 B2 | 10/2004 |
| JP | 2008037388 A | 2/2008 |
| KR | 10-089115 | 2/2009 |
| KR | 10-0891195 B1 | 4/2009 |
| KR | 20120029616 A * | 3/2012 ............ B60S 1/4006 |
| MX | 169141 | 6/1993 |
| MX | 9708272 | 8/1998 |
| MX | 9708273 | 8/1998 |
| MX | PA03010189 | 3/2004 |
| MX | PA03010190 | 3/2004 |
| MX | PA05002760 | 6/2005 |
| MX | PA05002988 | 6/2005 |
| MX | PA05008266 | 9/2005 |
| MX | PA05005581 | 11/2005 |
| MX | PA06008594 | 8/2006 |
| MX | 2007007828 | 7/2007 |
| MX | 2007007829 | 7/2007 |
| MX | 2008012325 | 10/2008 |
| MX | 2008013480 | 10/2008 |
| MX | 2008013814 | 12/2008 |
| MX | 2008014163 | 2/2009 |
| MX | 2009013050 | 1/2010 |
| MX | 2009013051 | 1/2010 |
| MX | 2010009333 | 10/2010 |
| MX | 2011000597 | 3/2011 |
| MX | 2011000598 | 3/2011 |
| MX | 2011003242 | 4/2011 |
| MX | 2011003243 | 4/2011 |
| MX | 2011003911 | 9/2011 |
| MX | 2012002314 | 6/2012 |
| MX | 2013002710 | 5/2013 |
| MX | 2013006881 | 7/2013 |
| MX | 2013006881 A | 7/2013 |
| MX | 2014001106 A | 3/2014 |
| MX | 2013011449 A | 6/2014 |
| MX | 2013006260 A | 7/2014 |
| MX | 2014001162 A | 7/2014 |
| MX | 2014001161 A | 11/2014 |
| MX | 2014010123 A | 11/2014 |
| MX | 2014010122 A | 5/2015 |
| MX | 2015013210 A | 12/2015 |
| MY | 122308 | 4/2006 |
| MY | 122563 | 4/2006 |
| MY | 128028 | 1/2007 |
| MY | 128970 | 3/2007 |
| PT | 1800978 | 5/2011 |
| PT | 1800977 | 1/2012 |
| RU | 2238198 | 10/2004 |
| RU | 2251500 | 5/2005 |
| RU | 2260527 | 9/2005 |
| RU | 2260528 | 9/2005 |
| RU | 2268176 | 1/2006 |
| RU | 2271287 | 3/2006 |
| RU | 2293034 | 2/2007 |
| RU | 2294291 | 2/2007 |
| RU | 2007127898 | 1/2009 |
| RU | 80415 | 2/2009 |
| RU | 2346834 | 2/2009 |
| RU | 2369500 | 10/2009 |
| RU | 2381120 | 2/2010 |
| RU | 2394706 | 7/2010 |
| RU | 2416536 C1 | 4/2011 |
| RU | 105237 | 6/2011 |
| RU | 108350 | 9/2011 |
| RU | 108741 | 9/2011 |
| RU | 2456180 C2 | 7/2012 |
| RU | 2493033 C2 | 9/2013 |
| RU | 2526773 C2 | 8/2014 |
| RU | 2543448 C2 | 2/2015 |
| RU | 2560217 C2 | 8/2015 |
| RU | 2560954 C2 | 8/2015 |
| RU | 2561173 C2 | 8/2015 |
| RU | 2577830 C1 | 3/2016 |
| RU | 2577981 C1 | 3/2016 |
| RU | 2578001 C2 | 3/2016 |
| RU | 2015144362 A | 4/2017 |
| TW | M404153 U1 | 5/2011 |
| TW | 201325952 | 7/2013 |
| TW | 201325953 | 7/2013 |
| WO | WO 81/03308 | 11/1981 |
| WO | WO 91/06451 | 5/1991 |
| WO | WO 92/06869 | 4/1992 |
| WO | WO 97/12787 | 4/1997 |
| WO | WO 98/01328 | 1/1998 |
| WO | WO 98/01329 | 1/1998 |
| WO | WO 98/50261 | 11/1998 |
| WO | WO 98/51203 | 11/1998 |
| WO | WO 98/51550 | 11/1998 |
| WO | WO 99/08818 | 2/1999 |
| WO | WO 99/15382 | 4/1999 |
| WO | WO 99/56992 | 11/1999 |
| WO | WO 00/05111 | 2/2000 |
| WO | WO 00/06431 | 2/2000 |
| WO | WO 00/21808 | 4/2000 |
| WO | WO 00/21809 | 4/2000 |
| WO | WO 00/21811 | 4/2000 |
| WO | WO 00/38963 | 7/2000 |
| WO | WO 00/38964 | 7/2000 |
| WO | WO 00/53470 | 9/2000 |
| WO | WO 0061409 | 10/2000 |
| WO | WO 01/26942 | 4/2001 |
| WO | WO 01/30618 | 5/2001 |
| WO | WO 01/40034 | 6/2001 |
| WO | WO 01/49537 | 7/2001 |
| WO | WO 01/58732 | 8/2001 |
| WO | WO 01/62559 | 8/2001 |
| WO | WO 01/89890 | 11/2001 |
| WO | WO 01/89891 | 11/2001 |
| WO | WO 01/89892 | 11/2001 |
| WO | WO 01/94166 | 12/2001 |
| WO | WO 02/04168 | 1/2002 |
| WO | WO 02/04266 | 1/2002 |
| WO | WO 02/04267 | 1/2002 |
| WO | WO 02/04268 | 1/2002 |
| WO | WO 02/34590 | 5/2002 |

(56) References Cited

FOREIGN PATENT DOCUMENTS

| | | |
|---|---|---|
| WO | WO 02/34596 | 5/2002 |
| WO | WO 02/34597 | 5/2002 |
| WO | WO 02/40328 | 5/2002 |
| WO | WO 02/40329 | 5/2002 |
| WO | WO 02/051677 | 7/2002 |
| WO | WO 02/052917 | 7/2002 |
| WO | WO 02/066301 | 8/2002 |
| WO | WO 02/090155 | 11/2002 |
| WO | WO 02/090156 | 11/2002 |
| WO | WO 03/026938 | 4/2003 |
| WO | WO 03/033316 | 4/2003 |
| WO | WO 03/042017 | 5/2003 |
| WO | WO 03/045746 | 6/2003 |
| WO | WO 03/091078 | 11/2003 |
| WO | WO 03/101794 | 12/2003 |
| WO | WO 03/106233 | 12/2003 |
| WO | WO 2004/002792 | 1/2004 |
| WO | WO 2004/045927 | 6/2004 |
| WO | WO 2004/045928 | 6/2004 |
| WO | WO 2004/048163 | 6/2004 |
| WO | WO 2004/056625 | 7/2004 |
| WO | WO 2004/069617 | 8/2004 |
| WO | WO 2004/076251 | 9/2004 |
| WO | WO 2004/098962 | 11/2004 |
| WO | WO 2004/098963 | 11/2004 |
| WO | WO 2004/110833 | 12/2004 |
| WO | WO 2005/025956 | 3/2005 |
| WO | WO 2005/039944 | 5/2005 |
| WO | WO 2008/051483 | 5/2005 |
| WO | WO 2005/054017 | 6/2005 |
| WO | WO 2005/080160 | 9/2005 |
| WO | WO 2005/082691 | 9/2005 |
| WO | WO 2005/087560 | 9/2005 |
| WO | WO 2005/092680 | 10/2005 |
| WO | WO 2005/102801 | 11/2005 |
| WO | WO 2005/115813 | 12/2005 |
| WO | WO 2005/123471 | 12/2005 |
| WO | WO 2006/000393 | 1/2006 |
| WO | WO 2006/013152 | 2/2006 |
| WO | WO 2006/040259 | 4/2006 |
| WO | WO 2006/048355 | 5/2006 |
| WO | WO 2006/061284 | 6/2006 |
| WO | WO 2006/069648 | 7/2006 |
| WO | WO 2006/074995 | 7/2006 |
| WO | WO 2006/079591 | 8/2006 |
| WO | WO 2006/081893 | 8/2006 |
| WO | WO 2006/106006 | 10/2006 |
| WO | WO 2006/106109 | 10/2006 |
| WO | 2006119679 A1 | 11/2006 |
| WO | WO 2006/114355 | 11/2006 |
| WO | WO 2006/117081 | 11/2006 |
| WO | WO 2006/117085 | 11/2006 |
| WO | WO 2006/117308 | 11/2006 |
| WO | WO 2007/009885 | 1/2007 |
| WO | WO 2007/014389 | 2/2007 |
| WO | WO 2007/014395 | 2/2007 |
| WO | WO 2007/035288 | 3/2007 |
| WO | WO 2007/042377 | 4/2007 |
| WO | WO 2007/045549 | 4/2007 |
| WO | WO 2007/071487 | 6/2007 |
| WO | WO 2007/073974 | 7/2007 |
| WO | WO 2007/102404 | 9/2007 |
| WO | WO 2007/122095 | 11/2007 |
| WO | WO 2007/128677 | 11/2007 |
| WO | WO 2008/003633 | 1/2008 |
| WO | WO 2008/043622 | 4/2008 |
| WO | WO 2008/076402 | 6/2008 |
| WO | WO 2008/122453 | 10/2008 |
| WO | WO 2008/124113 | 10/2008 |
| WO | WO 2008/135308 | 11/2008 |
| WO | WO 2009/000498 | 12/2008 |
| WO | WO 2009/115494 | 9/2009 |
| WO | WO 2009/121849 | 10/2009 |
| WO | WO 2009/124792 | 10/2009 |
| WO | WO 2009/132982 | 11/2009 |
| WO | WO 2009/153097 | 12/2009 |
| WO | WO 2009/155230 | 12/2009 |
| WO | WO 2010/016000 | 2/2010 |
| WO | WO 2010/028866 | 3/2010 |
| WO | WO 2010/028918 | 3/2010 |
| WO | WO 2010033646 | 3/2010 |
| WO | WO 2010/034445 | 4/2010 |
| WO | WO 2010/034447 | 4/2010 |
| WO | WO 2010/035794 | 4/2010 |
| WO | WO 2010/091757 | 8/2010 |
| WO | WO 2010/098877 | 9/2010 |
| WO | WO 2010/112579 | 10/2010 |
| WO | WO 2010/121665 | 10/2010 |
| WO | 2010127888 A1 | 11/2010 |
| WO | WO 2011/032753 | 3/2011 |
| WO | WO 2011/032760 | 3/2011 |
| WO | WO 2011/040743 | 4/2011 |
| WO | WO 2011/060979 | 5/2011 |
| WO | WO 2011/116995 | 9/2011 |
| WO | WO 2011/120723 | 10/2011 |
| WO | WO 2011/124404 | 10/2011 |
| WO | WO 2011/131395 | 10/2011 |
| WO | WO 2011/144400 | 11/2011 |
| WO | WO 2011/157465 | 12/2011 |
| WO | WO 2012/001175 | 1/2012 |
| WO | WO 2012/014054 | 2/2012 |
| WO | WO 2012/033363 | 3/2012 |
| WO | 2013/016493 A1 | 1/2013 |
| WO | 2013/019645 A1 | 2/2013 |
| WO | 2013/019723 A1 | 2/2013 |
| WO | 2013089312 A1 | 6/2013 |
| WO | 2013/126907 A1 | 8/2013 |
| WO | 2013/126910 A1 | 8/2013 |
| WO | 2013176352 A1 | 11/2013 |
| WO | 2014/145538 A1 | 9/2014 |
| WO | 2016/160687 A1 | 10/2016 |
| WO | 2017/075066 A1 | 5/2017 |
| ZA | 200006220 B | 7/2001 |

OTHER PUBLICATIONS

International Search Report dated Sep. 19, 2012 for PCT/US2012/048617 filed Jul. 27, 2012.

International Search Report dated Sep. 19, 2012 for PCT/US2012/048262 filed Jul. 26, 2012.

Non-Final Rejection towards U.S. Appl. No. 13/453,601 dated Jul. 9, 2013.

Non-Final Rejection towards U.S. Appl. No. 13/453,601 dated Jan. 10, 2014.

Final Rejection towards U.S. Appl. No. 13/453,601 dated Aug. 1, 2014.

Non-Final Rejection towards U.S. Appl. No. 13/453,601 dated Feb. 4, 2015.

Final Rejection towards U.S. Appl. No. 13/453,601 dated Jun. 3, 2015.

Non-Final Rejection towards U.S. Appl. No. 13/453,601 dated Jan. 8, 2016.

Notice of Allowance towards U.S. Appl. No. 13/453,601 dated May 20, 2016.

Non-Final Rejection towards U.S. Appl. No. 13/558,624 dated May 16, 2014.

Final Rejection towards U.S. Appl. No. 13/558,624 dated Sep. 29, 2014.

Non-Final Rejection towards U.S. Appl. No. 13/558,624 dated Mar. 6, 2015.

Notice of Allowance towards U.S. Appl. No. 13/558,624 dated Jun. 29, 2015.

Non-Final Rejection towards U.S. Appl. No. 13/560,585 dated Jul. 29, 2014.

Final Rejection towards U.S. Appl. No. 13/560,585 dated Jan. 28, 2015.

Non-Final Rejection towards U.S. Appl. No. 13/560,585 dated Jun. 24, 2015.

Notice of Allowance towards U.S. Appl. No. 13/560,585 dated Mar. 22, 2016.

(56) References Cited

OTHER PUBLICATIONS

Non-Final Rejection towards U.S. Appl. No. 13/679,646 dated Feb. 2, 2015.
Final Rejection towards U.S. Appl. No. 13/679,646 dated Sep. 2, 2015.
Non-Final Rejection towards U.S. Appl. No. 13/679,646 dated Jun. 13, 2016.
Non-Final Rejection towards U.S. Appl. No. 13/679,646 dated Jan. 4, 2017.
Non-Final Rejection towards U.S. Appl. No. 13/572,100 dated Jun. 3, 2014.
Non-Final Rejection towards U.S. Appl. No. 13/587,389 dated Oct. 31, 2014.
Final Rejection towards U.S. Appl. No. 13/587,389 dated Feb. 25, 2015.
Notice of Allowance towards U.S. Appl. No. 13/587,389 dated Jun. 19, 2015.
Non-Final Rejection towards U.S. Appl. No. 14/928,467 dated Apr. 28, 2016.
Final Rejection towards U.S. Appl. No. 14/928,467 dated Sep. 14, 2016.
Non-Final Rejection towards U.S. Appl. No. 13/194,070 dated Apr. 8, 2013.
Final Rejection towards U.S. Appl. No. 13/194,070 dated Aug. 27, 2013.
Non-Final Rejection towards U.S. Appl. No. 13/194,070 dated Dec. 26, 2013.
Notice of Allowance towards U.S. Appl. No. 13/194,070 dated Apr. 18, 2014.
Non-Final Rejection towards U.S. Appl. No. 14/329,423 dated Sep. 10, 2014.
Notice of Allowance towards U.S. Appl. No. 14/329,423 dated Apr. 15, 2015.
Non-Final Rejection towards U.S. Appl. No. 29/413,428 dated Nov. 7, 2012.
Notice of Allowance towards U.S. Appl. No. 29/413,428 dated Jun. 14, 2013.
Notice of Allowance towards U.S. Appl. No. 29/413,430 dated Nov. 26, 2012.
Non-Final Rejection towards U.S. Appl. No. 29/375,477 dated Sep. 7, 2012.
Notice of Allowance towards U.S. Appl. No. 29/375,477 dated Jan. 15, 2014.
Notice of Allowance towards U.S. Appl. No. 29/429,262 dated Jun. 27, 2013.
Non-Final Rejection towards U.S. Appl. No. 14/035,610 dated Apr. 22, 2016.
Final Rejection towards U.S. Appl. No. 14/035,610 dated Aug. 5, 2016.
Non-Final Rejection towards U.S. Appl. No. 14/035,610 dated Dec. 30, 2016.
Non-Final Rejection towards U.S. Appl. No. 13/776,376 dated Nov. 18, 2014.
Non-Final Rejection towards U.S. Appl. No. 13/840,256 dated Nov. 26, 2014.
Non-Final Rejection towards U.S. Appl. No. 14/715,180 dated Jan. 7, 2016.
Final Rejection towards U.S. Appl. No. 14/715,180 dated Aug. 16, 2016.
Definition of rectangular in Oxford Dictionary 2017.
Non-Final Rejection towards U.S. Appl. No. 14/715,180 dated May 22, 2017.
Non-Final Rejection towards U.S. Appl. No. 14/721,476 dated May 16, 2017.
International Search Report and Written Opinion issued in PCT Application No. PCT/US2013/027684 dated Apr. 29, 2013.
International Search Report and Written Opinion issued in PCT Application No. PCT/US2014/030329 dated Jun. 3, 2014.
First Office Action issued in connection with CA Application No. 2865292 dated Aug. 25, 2015.
Second Office Action issued in connection with CA Application No. 2865292 dated Aug. 15, 2016.
Non-Final Rejection towards U.S. Appl. No. 13/776,383 dated Mar. 10, 2015.
Final Rejection towards U.S. Appl. No. 13/776,383 dated Aug. 14, 2015.
International Search Report and Written Opinion issued in PCT Application No. PCT/US2013/027688 dated Apr. 25, 2013.
First Office Action issued in connection with CA Application No. 2865295 dated Aug. 25, 2015.
Non-Final Rejection towards U.S. Appl. No. 14/200,792 dated Oct. 23, 2015.
Final Rejection towards U.S. Appl. No. 14/200,792 dated Feb. 23, 2016.
Notice of Allowance issued towards U.S. Appl. No. 14/200,792 dated Jul. 22, 2016.
Non-Final Rejection towards U.S. Appl. No. 15/359,271 dated May 11, 2017.
Notice of Allowance issued towards U.S. Appl. No. 29/504,287 dated Sep. 12, 2016.
Non-Final Rejection towards U.S. Appl. No. 29/504,292 dated Jun. 19, 2015.
Final Rejection towards U.S. Appl. No. 29/504,292 dated Jan. 20, 2016.
Advisory Action towards U.S. Appl. No. 29/504,292 dated May 19, 2016.
Notice of Allowance issued towards U.S. Appl. No. 29/504,292 dated Aug. 16, 2016.
International Search Report and Written Opinion issued in PCT Application No. PCT/US2016/024490 dated Jun. 21, 2016.
Notice of Allowance issued towards U.S. Appl. No. 29/525,746 dated Apr. 7, 2016.
Notice of Allowance issued towards U.S. Appl. No. 29/571,419 dated Jan. 31, 2017.
Notice of Allowance issued towards U.S. Appl. No. 29/571,424 dated Feb. 1, 2017.
International Search Report and Written Opinion issued in PCT Application No. PCT/US2016/058887 dated Jan. 3, 2017.

\* cited by examiner

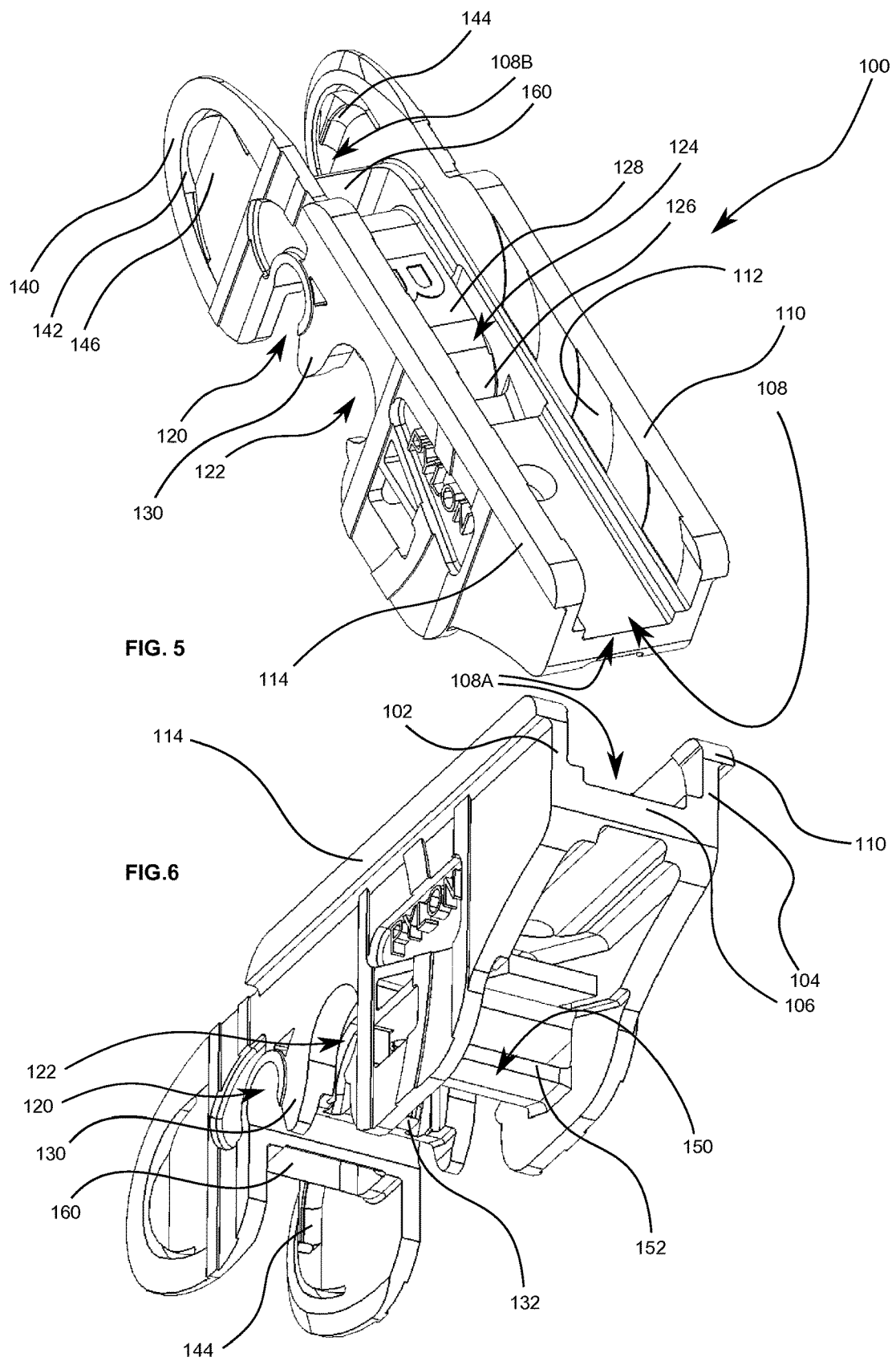

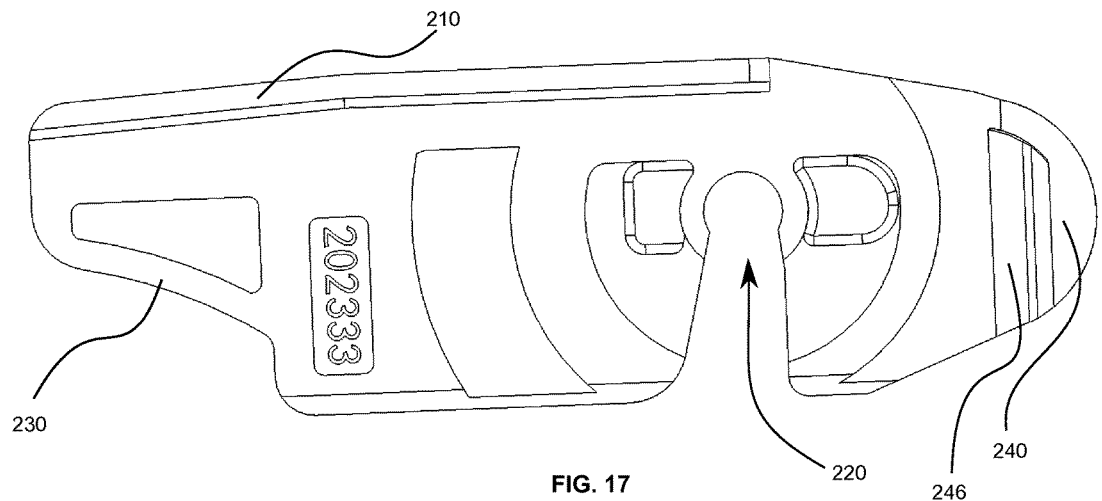
FIG. 17
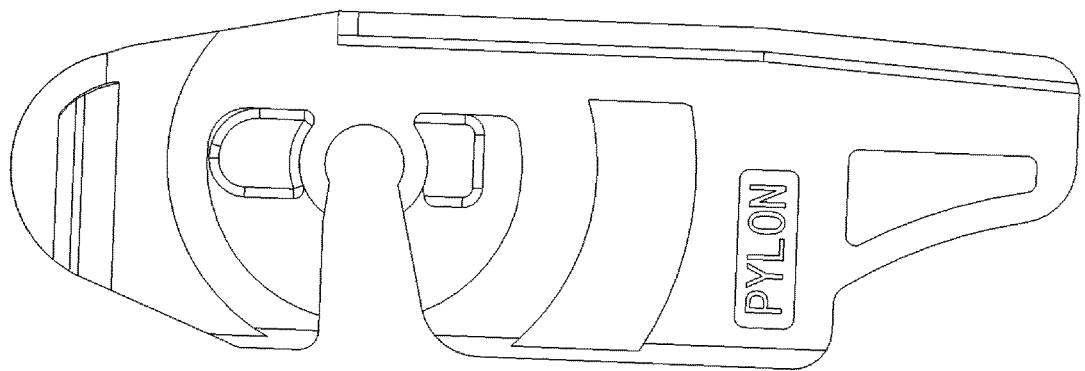
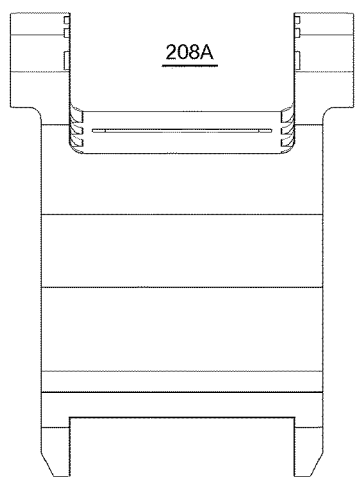
FIG. 19
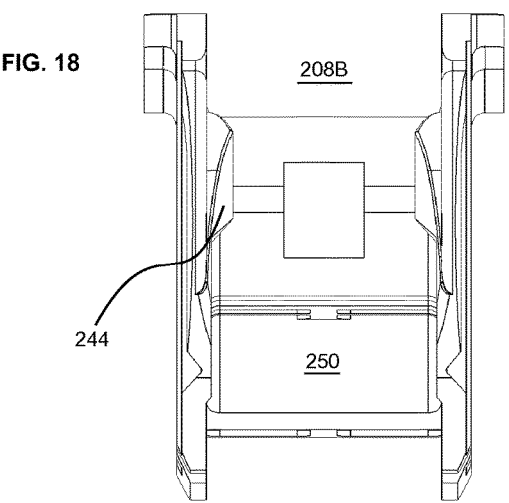
FIG. 18
FIG. 20

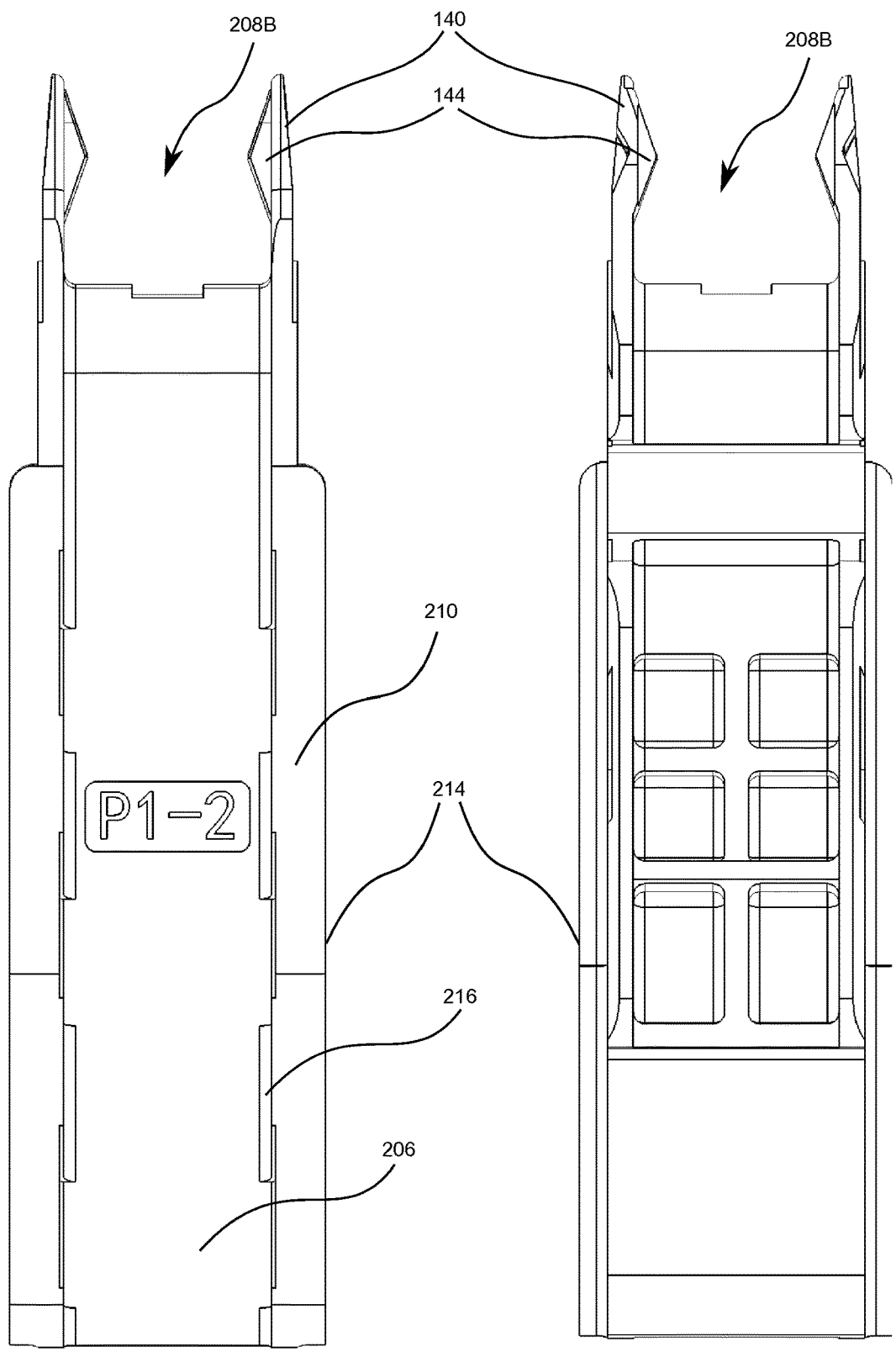
FIG. 21  FIG. 22

FIG. 27
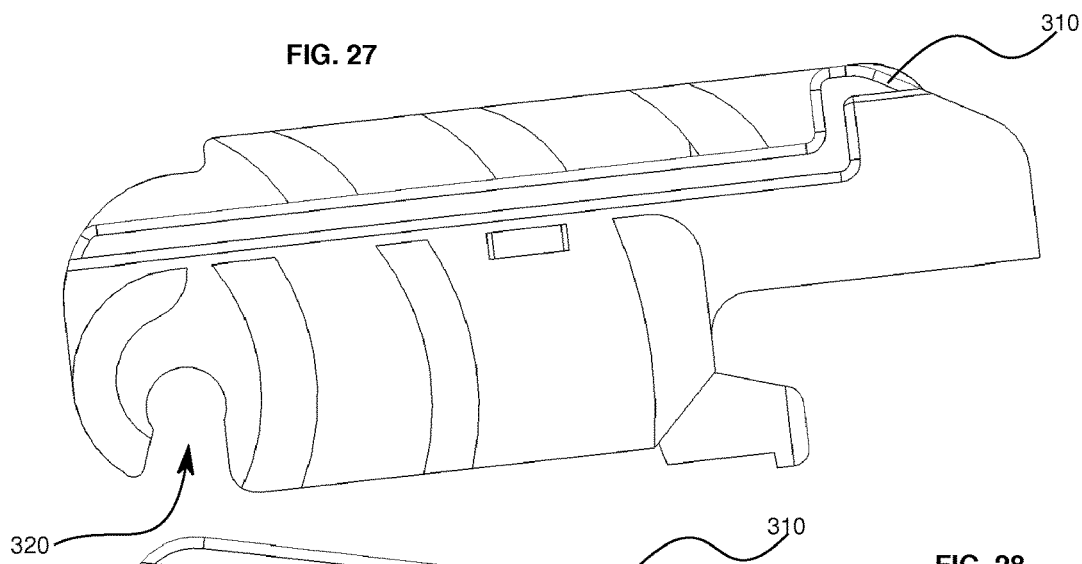
FIG. 28
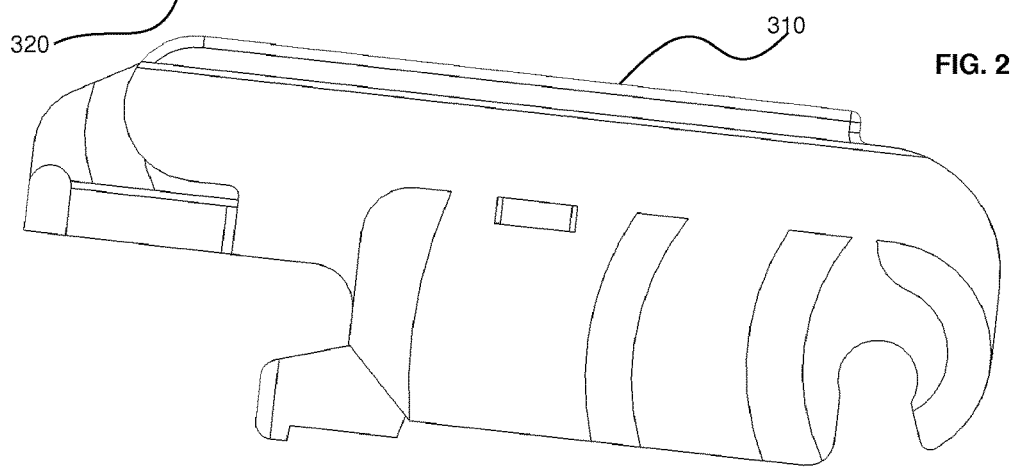
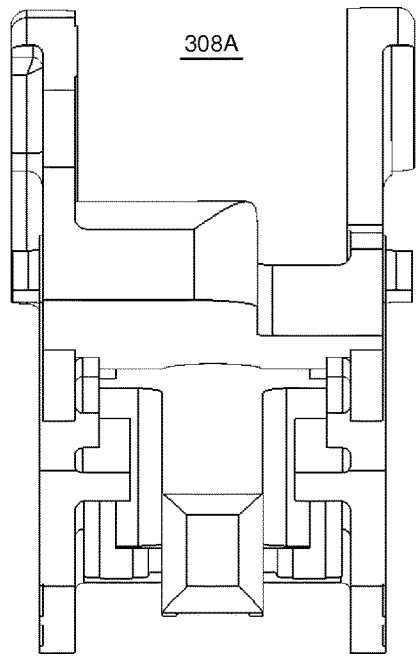
FIG. 29
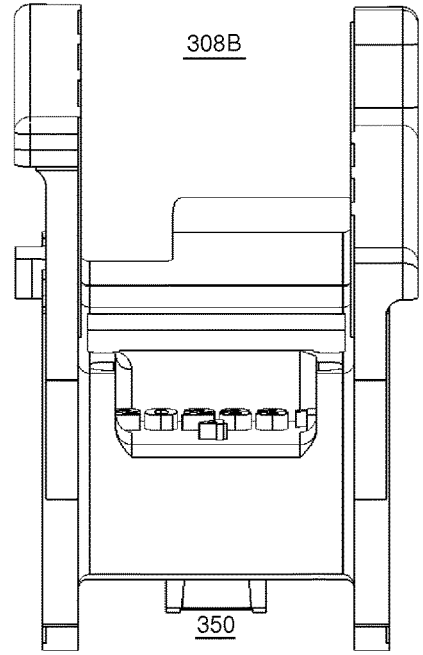
FIG. 30

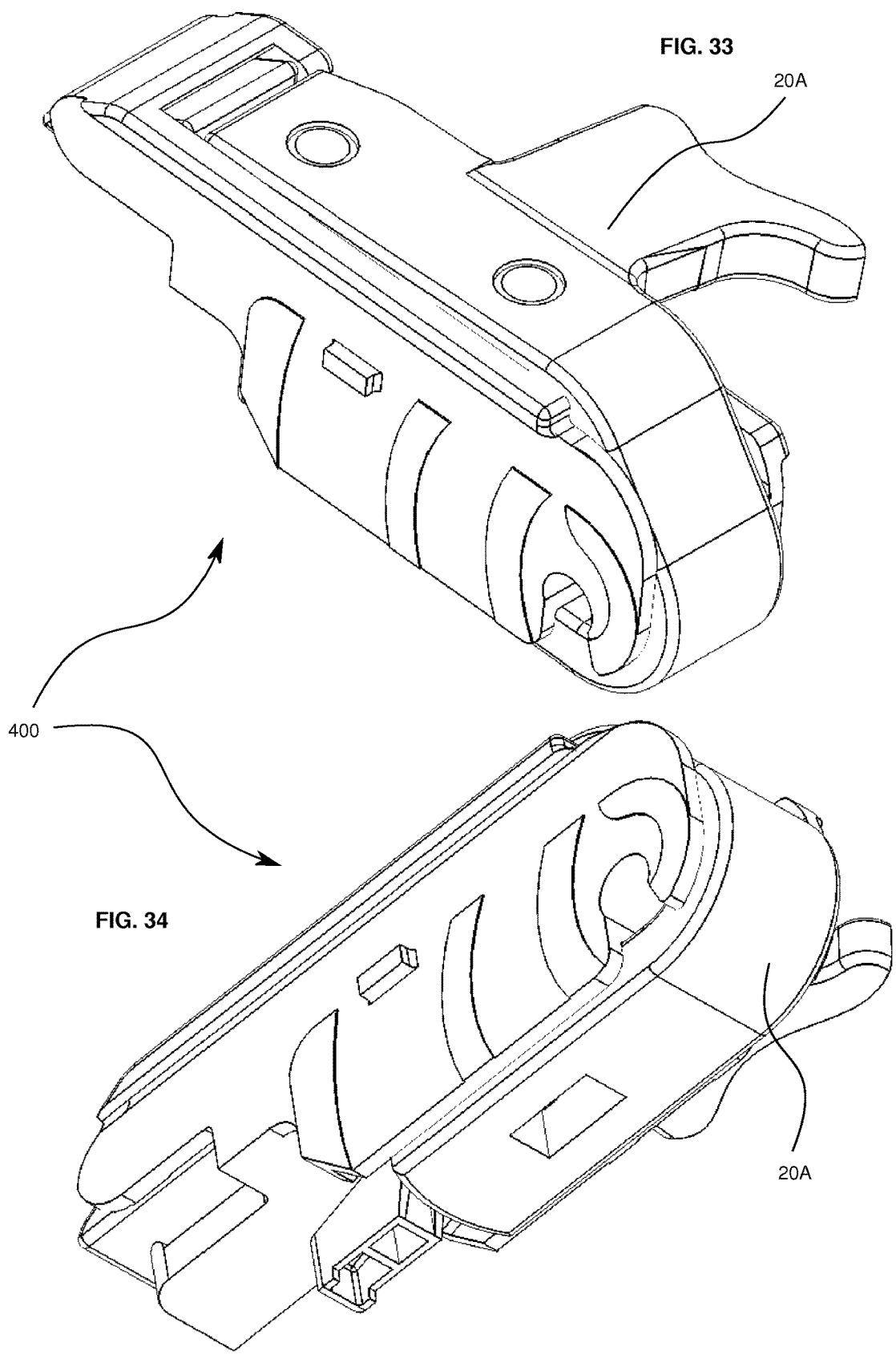

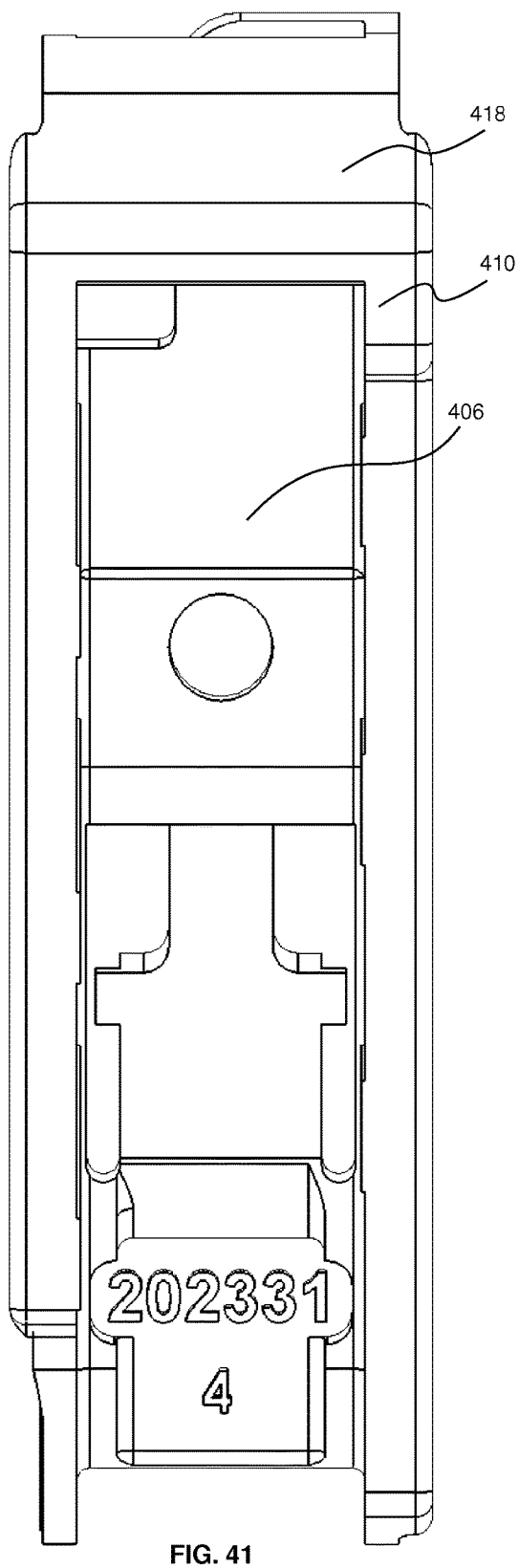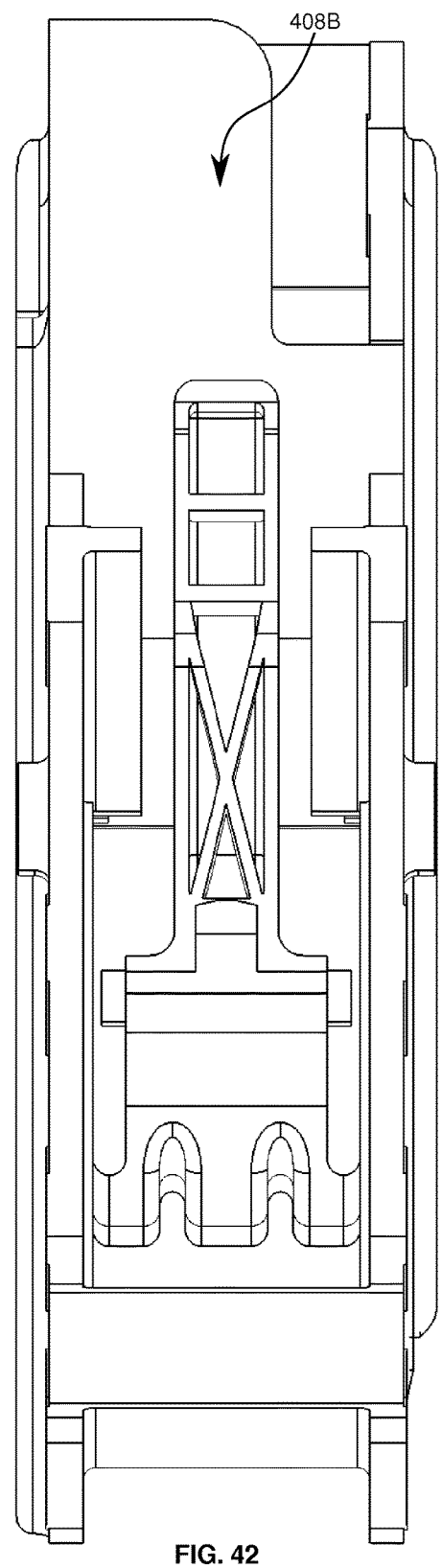
FIG. 41
FIG. 42

WINDSHIELD WIPER CONNECTOR

CROSS-REFERENCE TO RELATED APPLICATIONS

This application claims the benefit of U.S. Provisional Application Ser. No. 61/794,687, filed Mar. 15, 2013, the disclosure of which is hereby incorporated herein by reference in its entirety.

FIELD OF THE INVENTION

This invention relates in general to windshield wipers, and more particularly, to an improved connector for a windshield wiper that allows the windshield wiper to be coupled with multiple types of windshield wiper arm configurations. The invention is also directed to windshield wipers incorporating these novel connectors.

BACKGROUND

There are a variety of wiper arms on which wiper blades are provided as original equipment. These various wiper arms have hooks, pins, or other configurations which may connect to the wiper blade with or without connectors. These various configurations have created a problem in the replacement market because wiper blade providers are required to have multiple wiper blade configurations to accommodate all of the existing wiper arms. It is therefore advantageous to have attachment structures that can accommodate a host of arms to reduce the complexity and cost associated with plurality of wiper blade arm configuration.

The need to a couple replacement windshield wiper blades with various styles of arms has been addressed to some degree. For example, windshield wiper blades have been designed to work with various hook-type wiper arms having different sizes. Connectors may also be configured to receive either a pin-type arm, a hook-type arm and a variety of other arms, such as described in U.S. Pat. No. 6,640,380, which is incorporated herein by reference in its entirety. Side-saddled or offset connectors have also been developed for connecting wiper blades with alternative types of wiper arms, as described for instance in U.S. patent application Ser. No. 13/558,624, filed Jul. 26, 2012, which is incorporated herein by reference in its entirety. An adapter may also be used to connect the arm to a windshield wiper. As that term is used herein, an adapter is a separate structure that works together with the connector to allow the windshield wiper to connect to a type of wiper arm. An example adapter is described in U.S. Pat. No. 2002/0192017, which is incorporated herein by reference in its entirety, wherein an adapter is used to allow a large hook to connect to a wiper blade having a connector that accommodates only small hook arms.

BRIEF SUMMARY

A connector for coupling a wiper blade with a wiper arm may include first and second side walls spaced at a distance from each other and connected by a bridge, with the first and second side walls and the bridge defining an upper channel, a rivet passage formed into the first and second sidewalls, with the rivet passage dimensioned to accept and hold a rivet of a wiper blade in order to connect the wiper blade with the connector, and a reinforcement element provided on at least one of the first or second side walls proximate to the upper channel. The connector may also include a rail interconnecting said first and second side walls and vertically spaced from said bridge to define a tail space between said bridge and said rail, and the rail may have a forward most free end positioned rearward of said pin passage and said rivet passage to define a rail-free hook insertion space below said bridge, forward of said pin passage, and between said side walls.

A wiper blade may include a wiper strip, a support structure a support structure, with the support structure distributing force from a wiper arm to the wiper strip, and a connection device disposed on the support structure, and a connector for coupling the connection device of the wiper blade with a wiper arm. The connector may be any embodiment of a connector in accordance with the disclosure.

BRIEF DESCRIPTION OF THE FIGURES

The following description and the annexed drawings set forth certain illustrative aspects of the invention. These aspects are indicative of but a few of the various ways in which the principles of the invention may be employed and the present invention is intended to include all such aspects and their equivalents. Other advantages and novel features of the invention will become apparent from the following detailed description of the invention when considered in conjunction with the drawings.

FIG. 5 is a top perspective view of the connector of FIG. 1.

FIG. 6 is a bottom perspective view of the connector of FIG. 1.

FIG. 17 is a first side view of the connector of FIG. 13.
FIG. 18 is a second side view of the connector of FIG. 13.
FIG. 19 is a front view of the connector of FIG. 13.
FIG. 20 is a rear view of the connector of FIG. 13.
FIG. 21 is a top view of the connector of FIG. 13.
FIG. 22 is a bottom view of the connector of FIG. 13.

FIG. 27 is a first side view of the connector of FIG. 23.

FIG. 28 is a second side view of the connector of FIG. 23.

FIG. 29 is a front view of the connector of FIG. 23.

FIG. 30 is a rear view of the connector of FIG. 23.

FIG. 33 is a top perspective view of an additional embodiment of a connector attached to an alternative wiper arm, in accordance with the disclosure.

FIG. 34 is a bottom perspective view of the connector of FIG. 33 attached to the alternative wiper arm.

FIG. 41 is a top view of the connector of FIG. 33.

FIG. 42 is a bottom view of the connector of FIG. 33.

DETAILED DESCRIPTION

Figure 1:
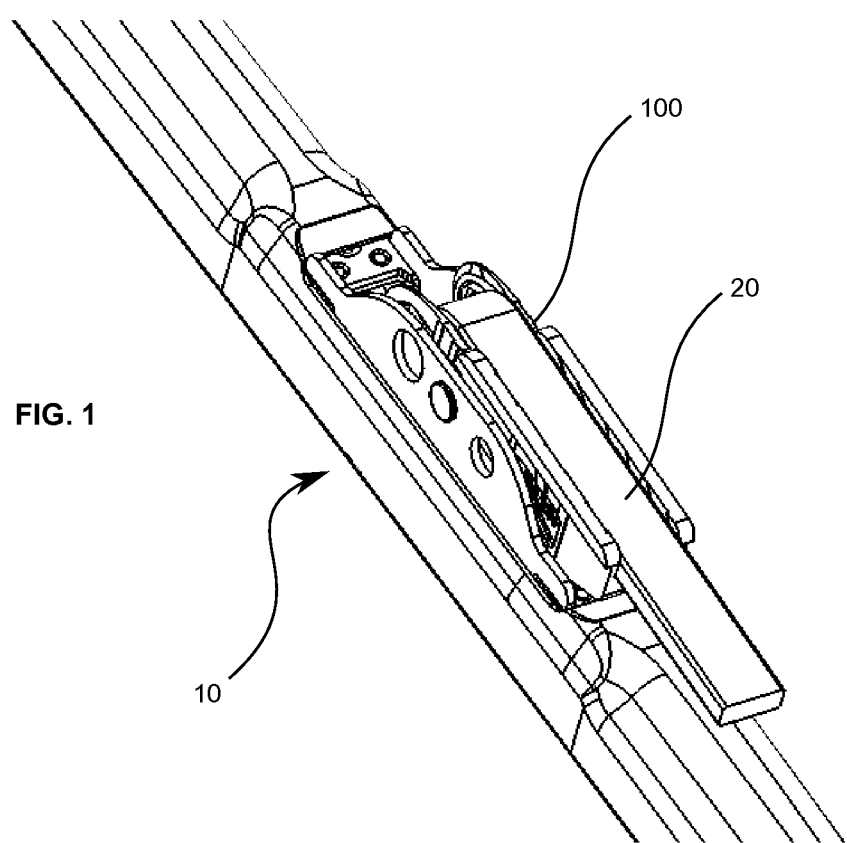
FIG. 1 is a top perspective view of a wiper blade coupled with a wiper arm with a connector, in accordance with the disclosure.

The following detailed description and the appended drawings describe and illustrate exemplary embodiments of the disclosure solely for the purpose of enabling one of ordinary skill in the relevant art to make and use the invention. As such, the detailed description and illustration of these embodiments are purely exemplary in nature and are in no way intended to limit the scope of the invention, or its protection, in any manner. It should also be understood that the drawings may not be to scale and in certain instances details may have been omitted, which are not necessary for an understanding of the present invention, such as conventional details of fabrication and assembly. These embodiments, which are also referred to herein as "examples," are described in sufficient detail to enable those skilled in the art to practice the subject matter disclosed herein. It is to be understood that the embodiments may be combined or that other embodiments may be utilized, and that structural, logical, and electrical variations may be made without departing from the scope of the subject matter disclosed herein. The following detailed description is, therefore, not to be taken in a limiting sense, and the scope of the subject matter disclosed herein is defined by the appended claims and their equivalents.

Throughout the disclosure, the terms "a" or "an" may refer to one or more than one. In this document, the term "or" is used to refer to a nonexclusive or, unless otherwise indicated. Furthermore, references to "one embodiment" are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

A connector for coupling a wiper blade with a wiper arm is provided in accordance with the disclosure, the connector including first and second side walls spaced at a distance from each other and connected by a bridge, the first and second side walls and the bridge defining an upper channel; a rivet passage formed into the first and second sidewalls, the rivet passage dimensioned to accept and hold a rivet of a wiper blade in order to connect the wiper blade with the connector; and a reinforcement element provided on at least one of the first or second side walls proximate to the upper channel. The reinforcement element may include an upward extension of at least one of the first and second walls thereby increasing the height of the upper channel. At least a portion of the reinforcement element may bend into the upper channel. The reinforcement element may include an outward extension which projects in a direction away from the upper channel. The reinforcement element may include an overhang portion which extends over the upper channel thereby covering at least a portion of the upper channel. The reinforcement element may be provided on both first and second side walls. The reinforcement element includes at least one resilient tab provided on the inner side of the reinforcement element within the upper channel.

In some embodiments, the connector further includes a support element extending from each of the first and second walls in order to support an extension of the bridge and upper channel. Furthermore, the support element may be an integral extension of the first and second side walls, or the support element may be a truss member. The connector may further include a lateral brace between the first and second side walls. The connector may further include a pin passage formed into the first and second side walls adjacent to the rivet passage, the pin passage dimensioned to accept and hold a pin of the wiper arm in order to connect the wiper arm with the connector. The connector may further include a clip including a resilient clip end extending into the pin passage in order to define at least a portion of the pin passage. If a clip is included, the clip may include an upper channel portion which at least partially defines the upper channel as substantially co-planar with the bridge. The connector may further include a lower channel formed between the first and second side walls below the upper channel, the lower channel dimensioned to receive the end of a hook of the wiper arm, the upper channel and lower channel thereby mutually dimensioned to accept and hold the hook of the wiper arm in order to connect the wiper arm with the connector.

An additional embodiment of a connector for connecting a wiper blade to a wiper arm is provided in accordance with the disclosure, said connector including first and second side walls spaced from one another; a bridge interconnecting said first and second side walls, said bridge and first and second side walls defining a pin passage and a rivet passage on an underside of the connector and further defining an upper channel on the upper side of the connector; a reinforcement element provided on at least one of the first or second side walls proximate to the upper channel; and a rail interconnecting said first and second side walls and vertically spaced from said bridge to define a tail space between said bridge and said rail, said rail having a forward most free end positioned rearward of said pin passage and said rivet passage to define a rail-free hook insertion space below bridge, forward of said pin passage, and between said side walls. The reinforcement element may include an upward extension of at least one of the first and second walls increasing the height of the upper channel. The reinforcement element may include an outward extension which projects in a direction away from the upper channel. The reinforcement element may include an overhang portion which extends over the upper channel thereby covering at least a portion of the upper channel.

Figure 2:
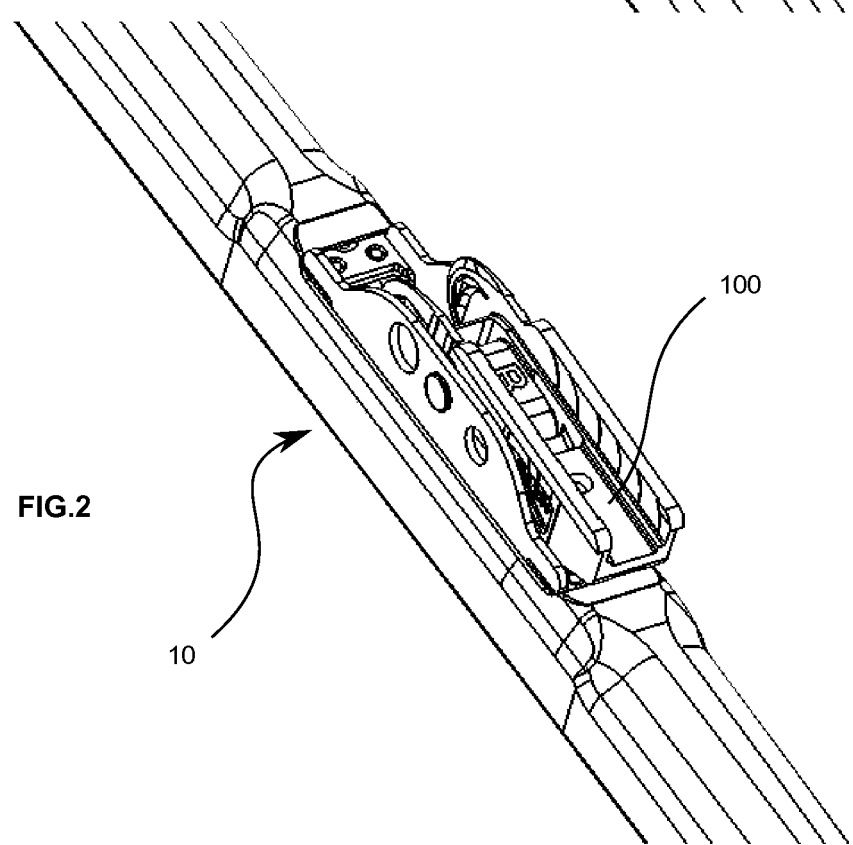
FIG. 2 is a top perspective view of the connector of FIG. 1 attached to the wiper blade with the wiper arm removed or not shown.
Figure 3:
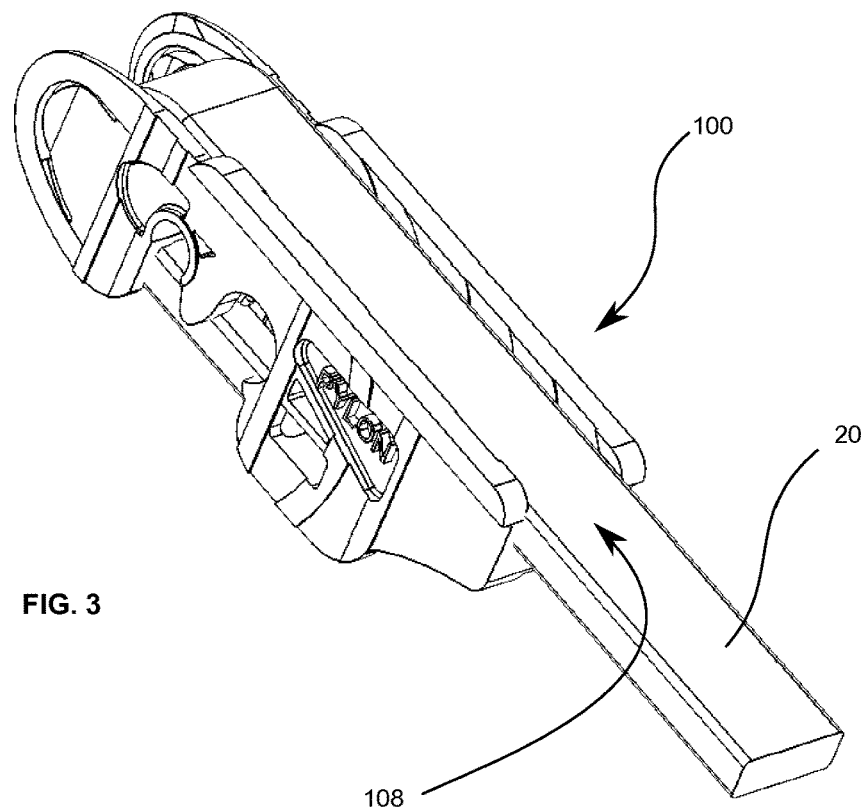
FIG. 3 is a top perspective view of the connector of FIG. 1 attached to the wiper arm.
Figure 4:
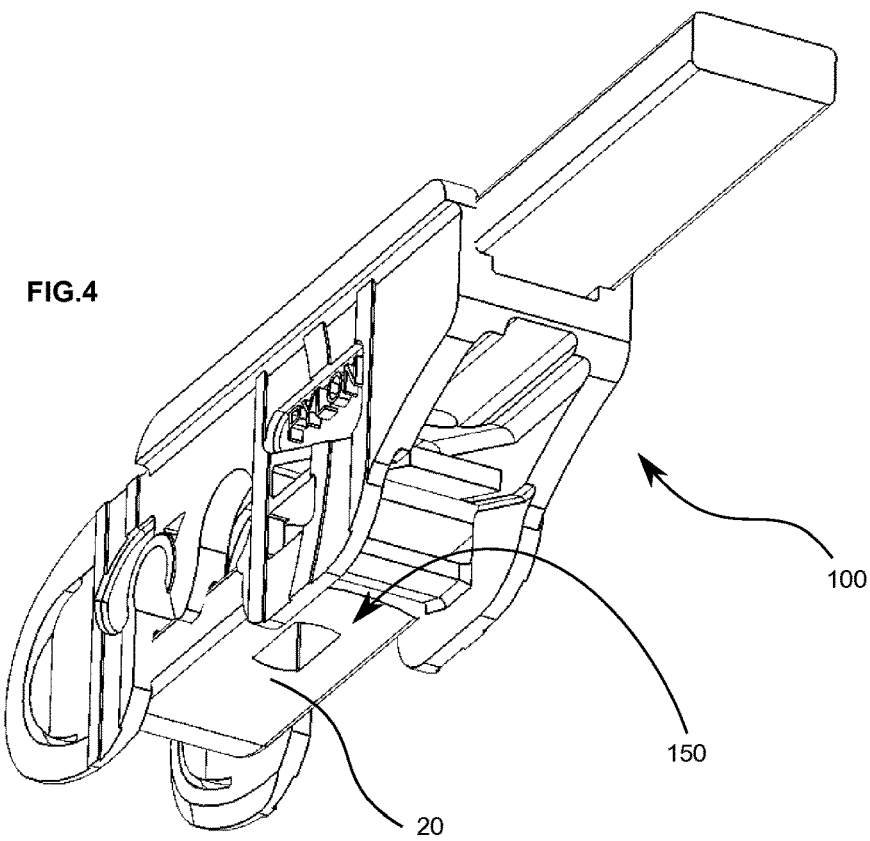
FIG. 4 is a bottom perspective view of the connector of FIG. 1 attached to the wiper arm.
Figure 7:
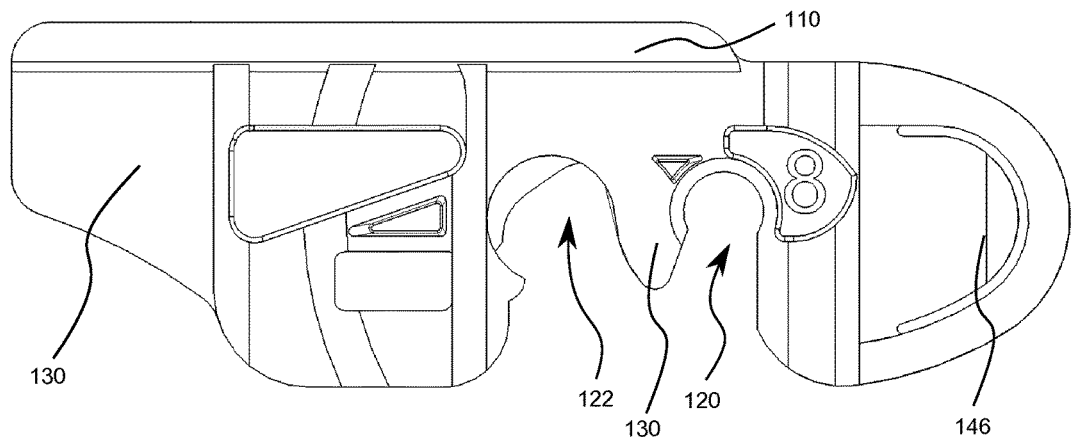
FIG. 7 is a first side view of the connector of FIG. 1.
Figure 8:
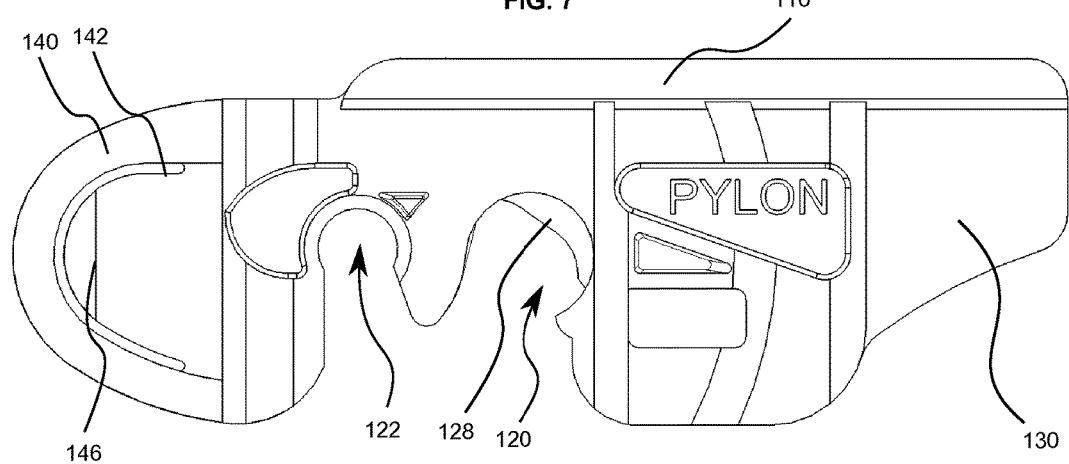
FIG. 8 is a second side view of the connector of FIG. 1.
Figure 9:
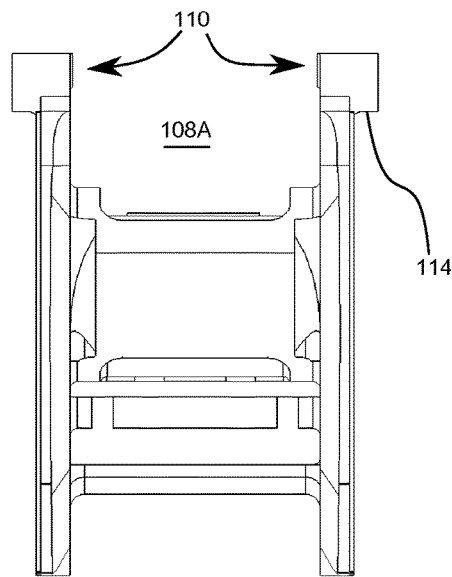
FIG. 9 is a front view of the connector of FIG. 1.
Figure 10:
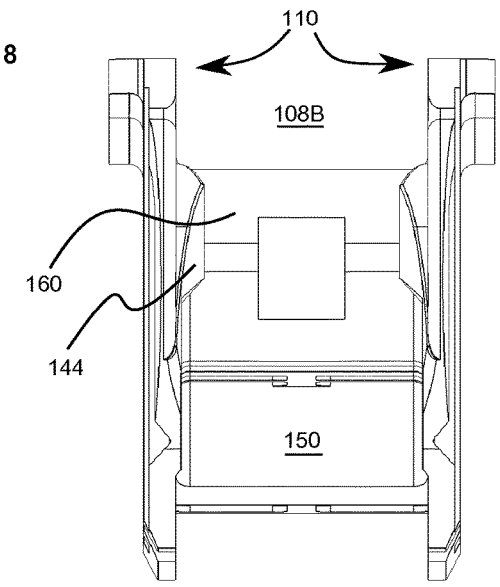
FIG. 10 is a rear view of the connector of FIG. 1.
Figures 11, 12:
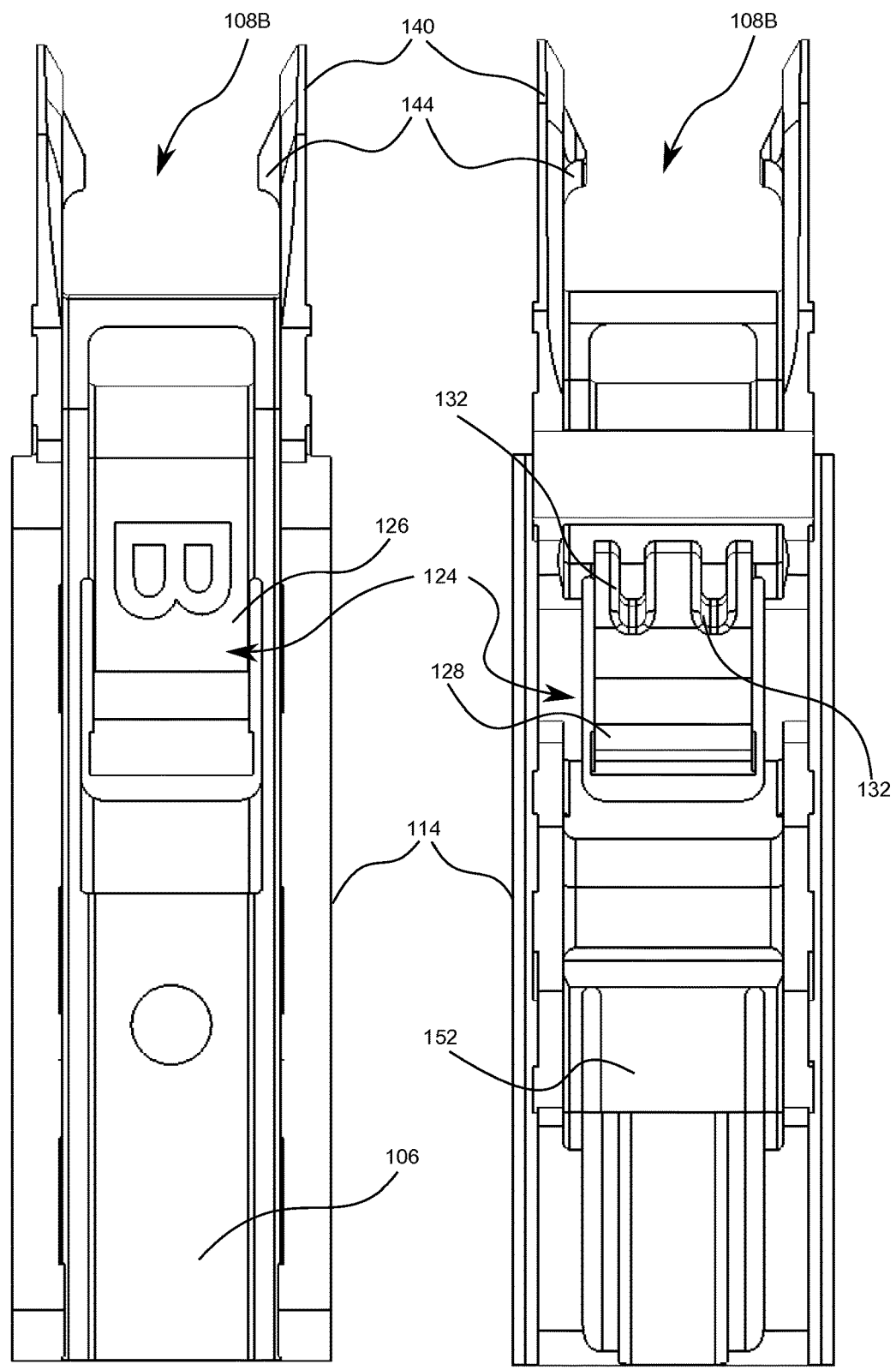
FIG. 11 is a top view of the connector of FIG. 1.
FIG. 12 is a bottom view of the connector of FIG. 1.

With reference now to FIGS. 1-4, a connector 100 is illustrated for coupling a wiper blade 10 with a hook-type wiper arm 20. The wiper blade includes a base, a rivet or rod extending laterally across base, a cover for wiper blade 10, and a wiper strip for contacting the windshield of a vehicle. Adjacent from rivet is a first set of apertures and a second set of apertures having a different diameter size than the first set. Each set, is aligned to mutually receive a pin there through from a pin-type connector arm (not illustrated). By having different diameter sizes, the wiper blade may be advantageously coupled with one of two different kinds of pin-type wiper arms. A person skilled in the art should understand and recognize that only the hook-shaped end portion of wiper arm 20 is illustrated in the drawings, and that the opposing end of wiper arm 20 is connectable to the windshield of a vehicle and is operable to move wiper blade 10 across the windshield when the wiper blade 10 and wiper arm 20 are coupled. FIG. 2 shows wiper arm 20 removed, while FIGS. 3-4 illustrate wiper blade 10 removed.

Figure 13:
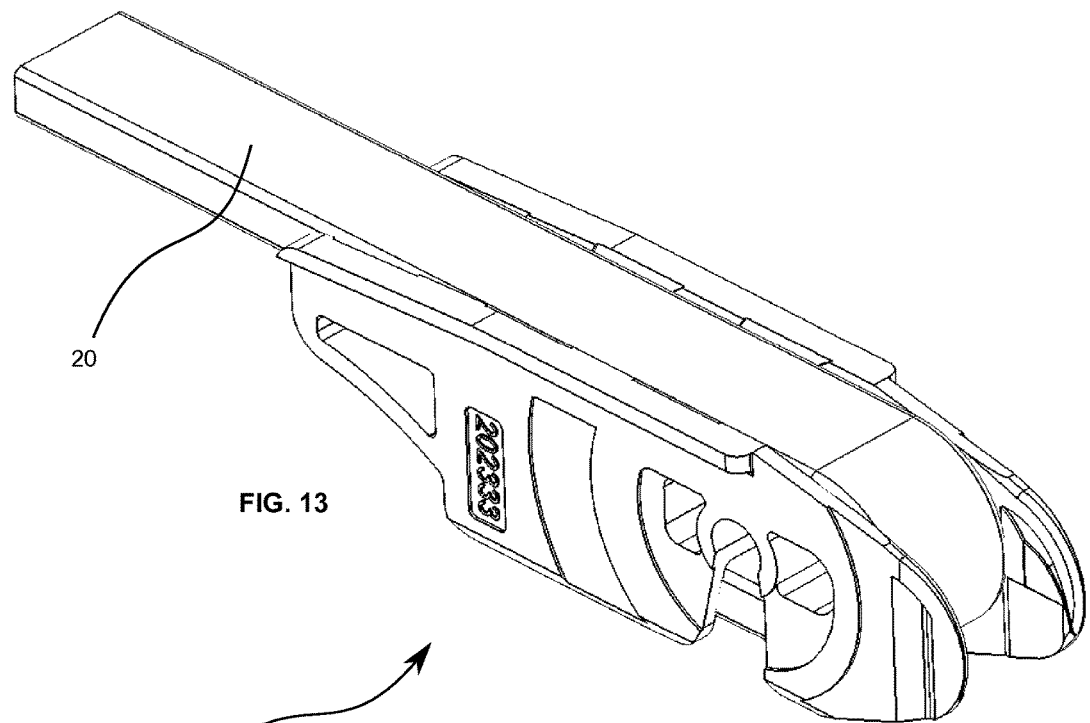
FIG. 13 is a top perspective view of an additional embodiment of a connector attached to the wiper arm, in accordance with the disclosure.
Figure 14:
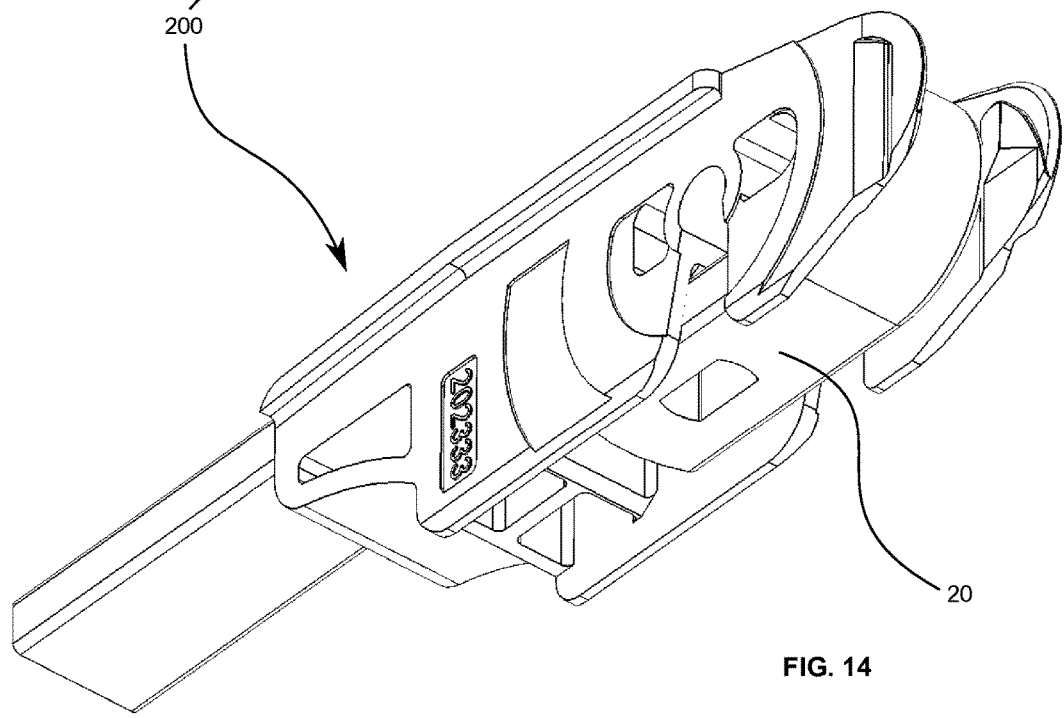
FIG. 14 is a bottom perspective view of the connector of FIG. 13 attached to the wiper arm.
Figure 15:
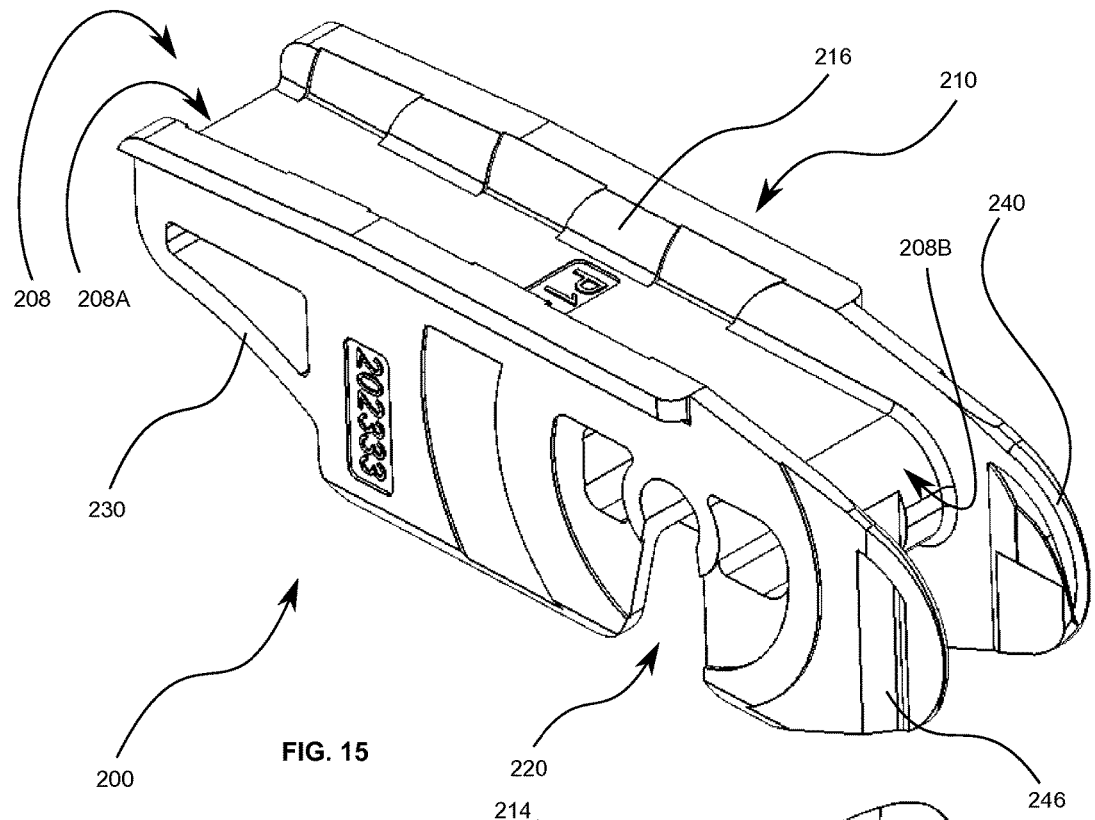
FIG. 15 is a top perspective view of the connector of FIG. 13.
Figure 16:
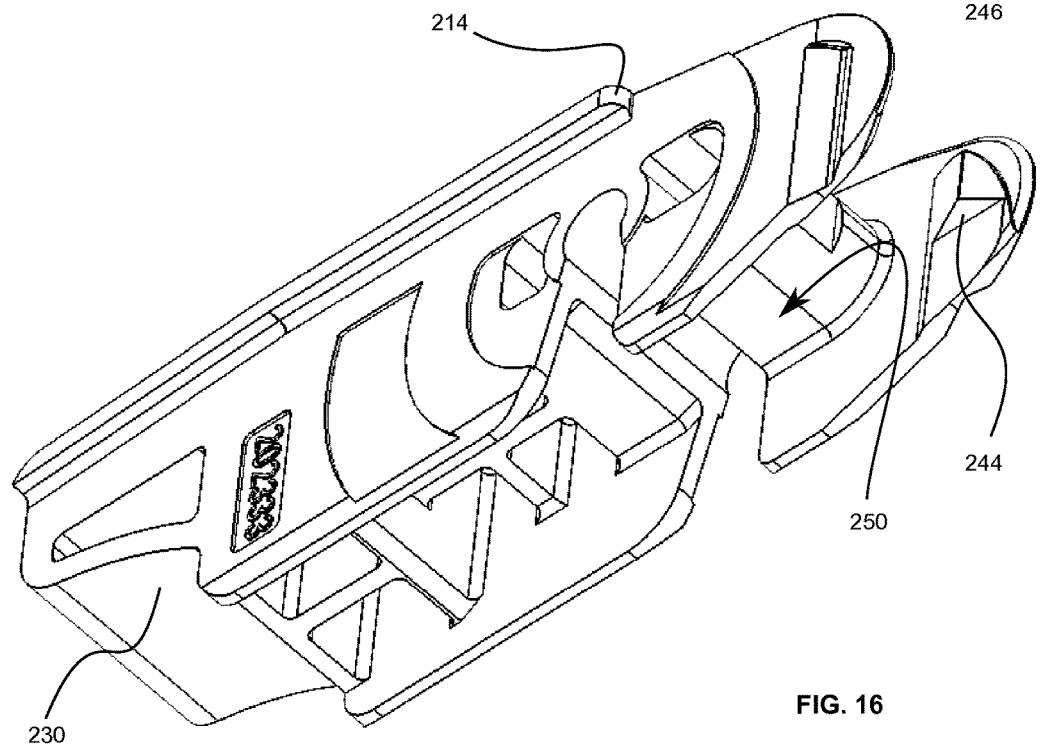
FIG. 16 is a bottom perspective view of the connector of FIG. 13.
Figure 23:
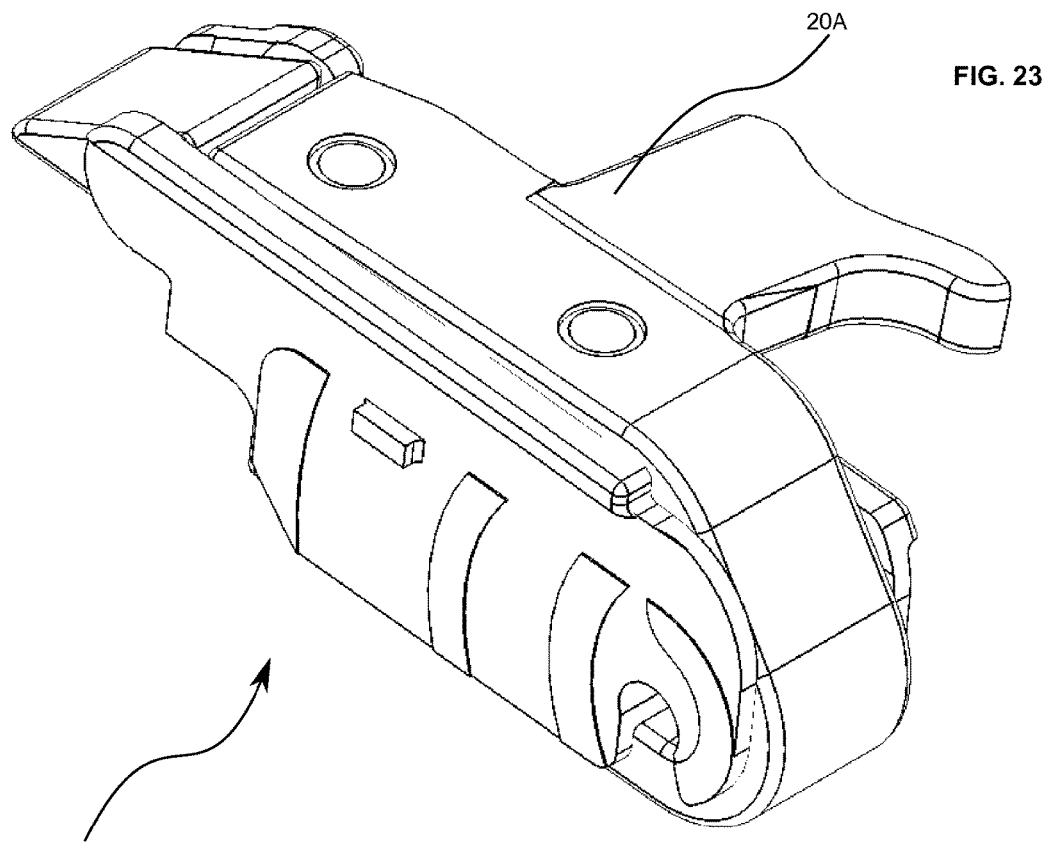
FIG. 23 is a top perspective view of an additional embodiment of a connector attached to an alternative wiper arm, in accordance with the disclosure.
Figure 24:
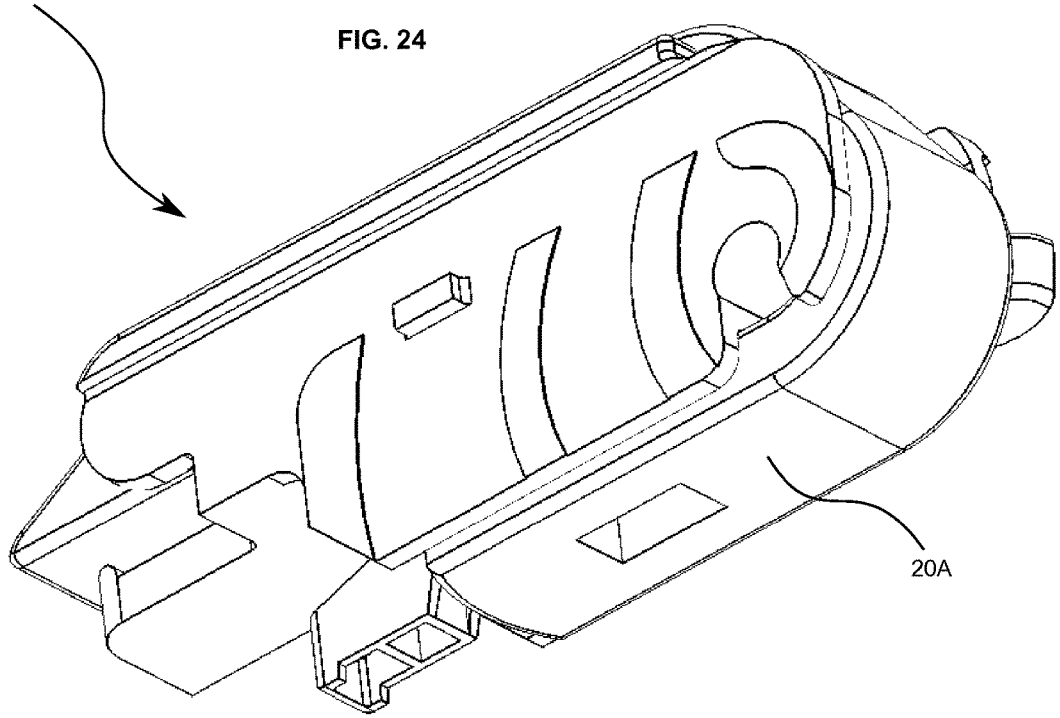
FIG. 24 is a bottom perspective view of the connector of FIG. 23 attached to the alternative wiper arm.
Figure 25:
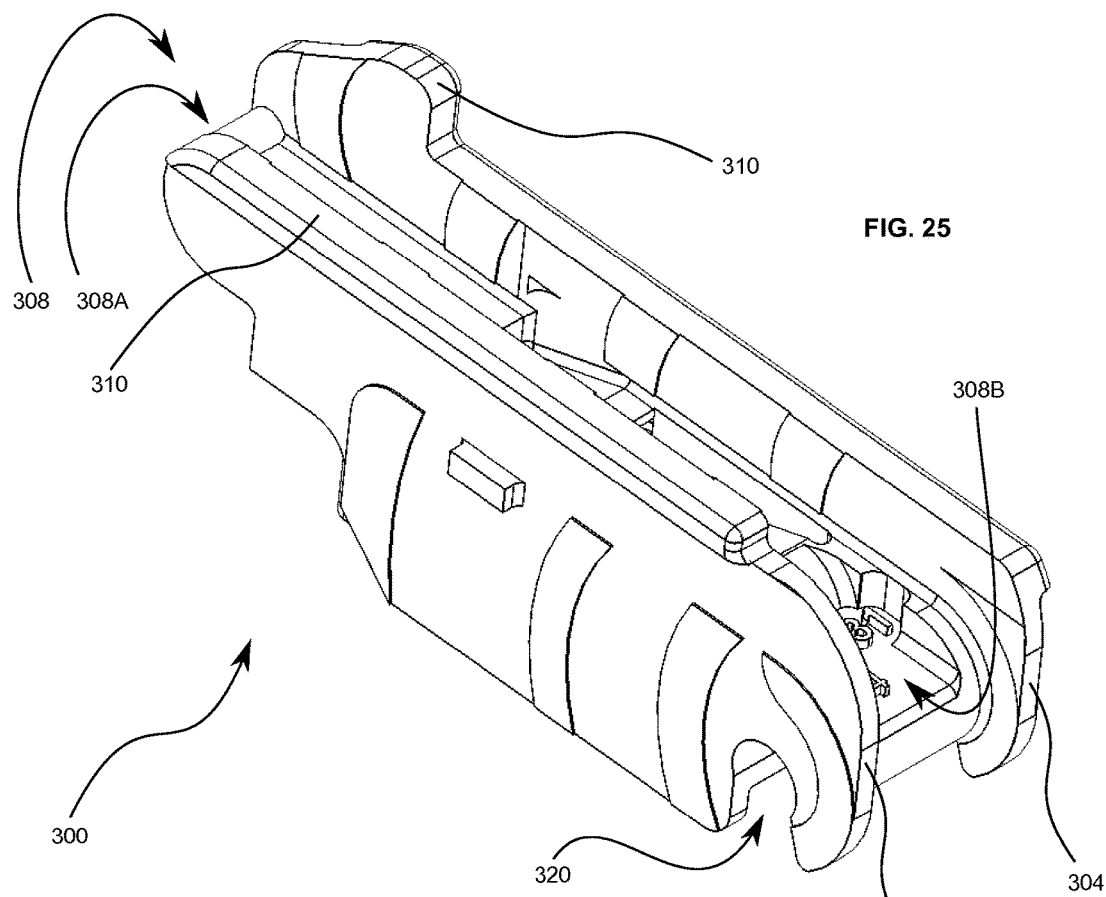
FIG. 25 is a top perspective view of the connector of FIG. 23.
Figure 26:
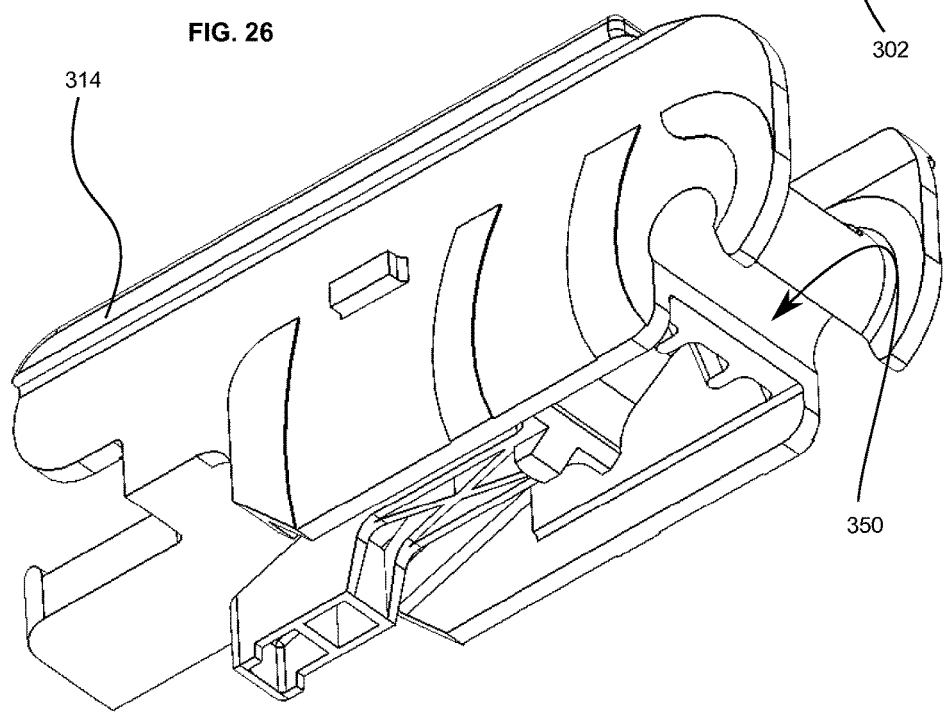
FIG. 26 is a bottom perspective view of the connector of FIG. 23.
Figure 31:
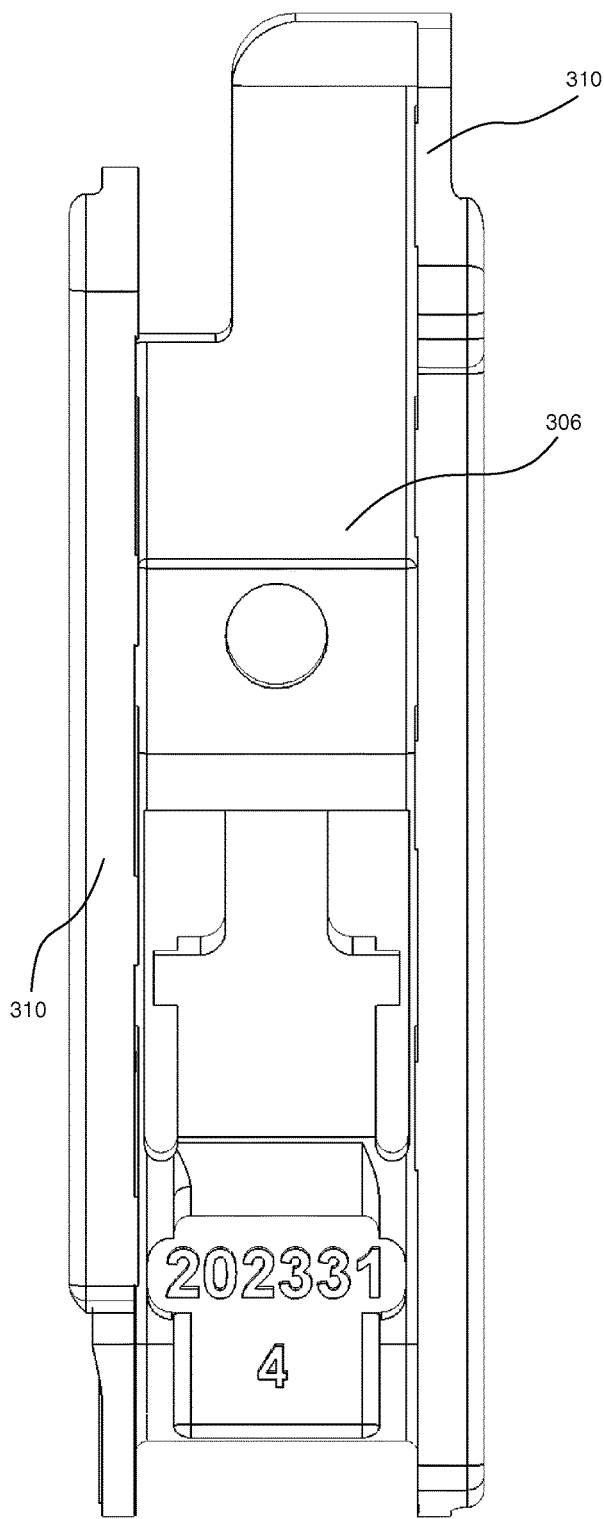
FIG. 31 is a top view of the connector of FIG. 23.
Figure 32:
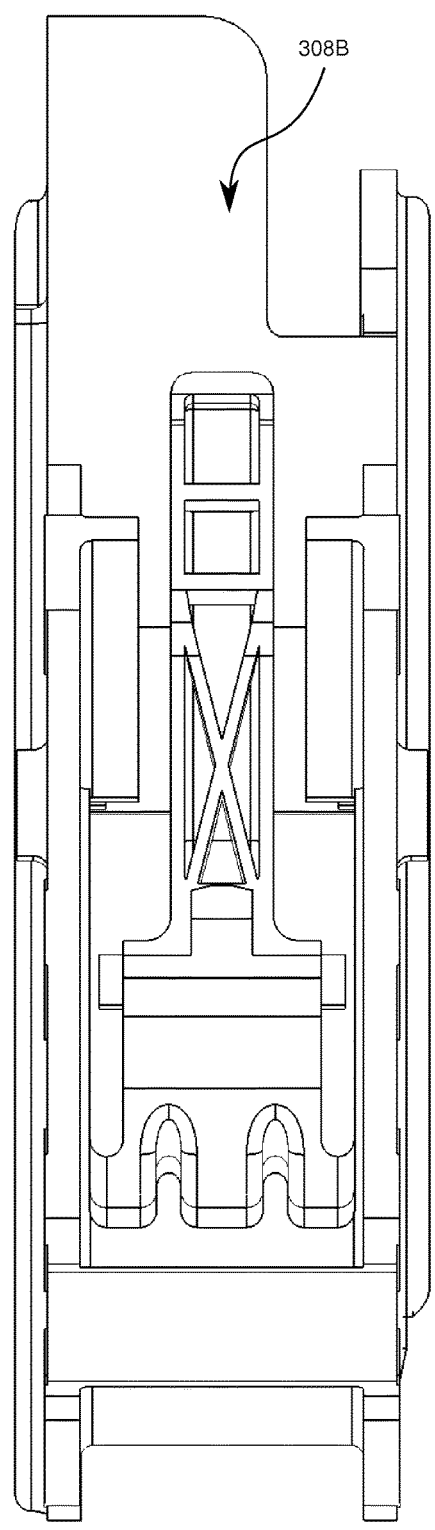
FIG. 32 is a bottom view of the connector of FIG. 23.
Figure 35:
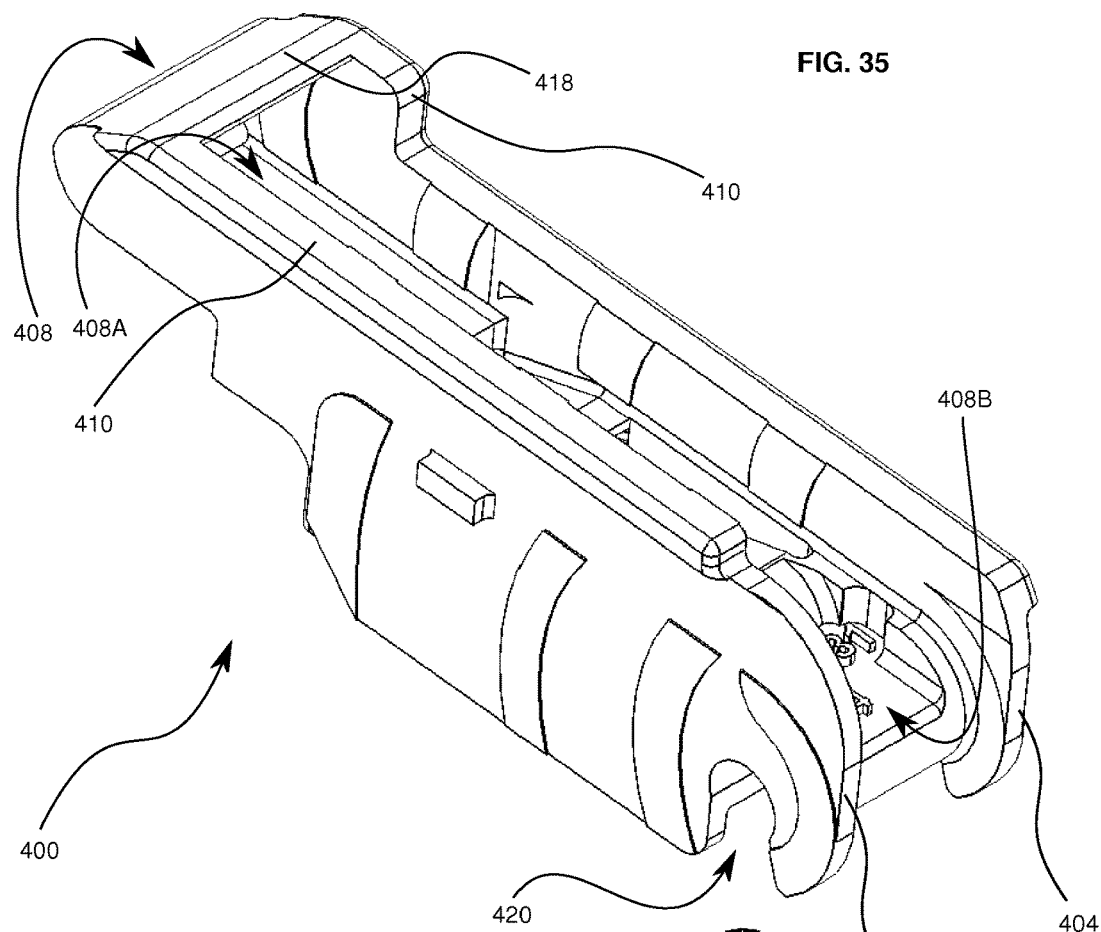
FIG. 35 is a top perspective view of the connector of FIG. 33.
Figure 36:
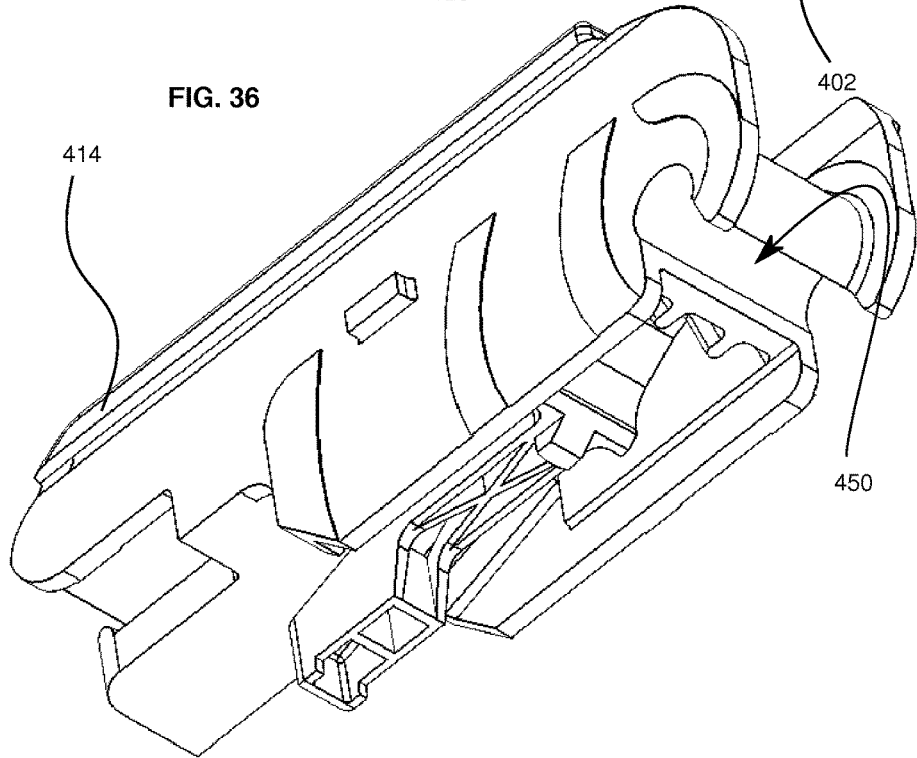
FIG. 36 is a bottom perspective view of the connector of FIG. 33.
Figure 37:
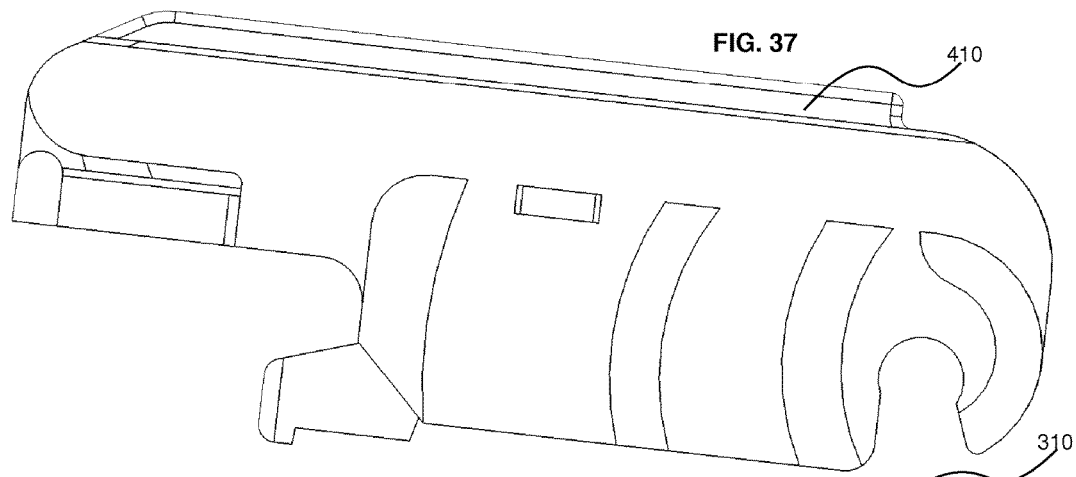
FIG. 37 is a first side view of the connector of FIG. 33.
Figure 38:
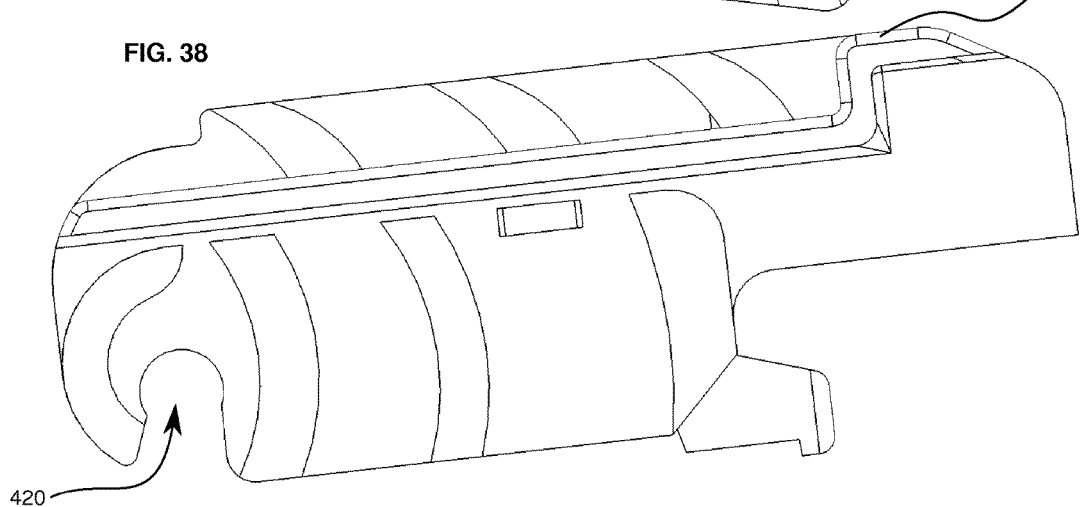
FIG. 38 is a second side view of the connector of FIG. 33.
Figure 39:
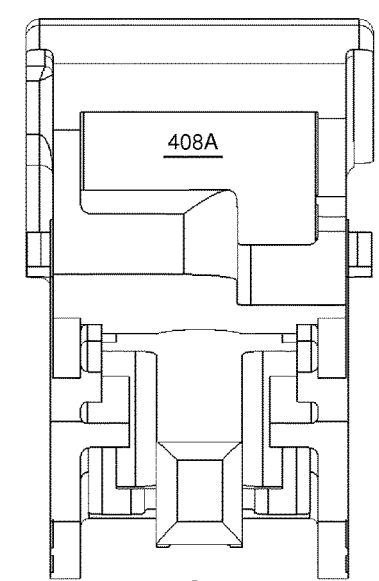
FIG. 39 is a front view of the connector of FIG. 33.
Figure 40:
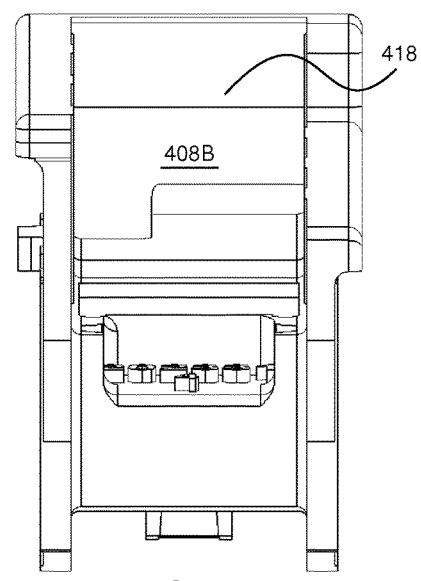
FIG. 40 is a rear view of the connector of FIG. 33.
Figure 43:
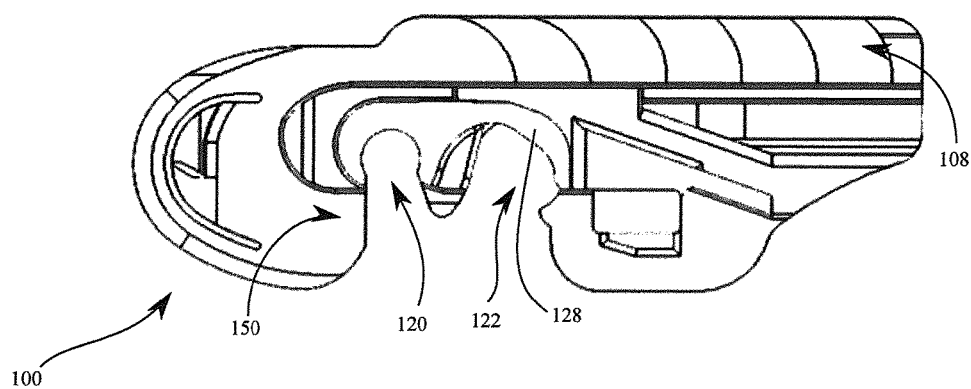
FIG. 43 is a cross-sectional side view of the connector of FIG. 1.
Figure 44:
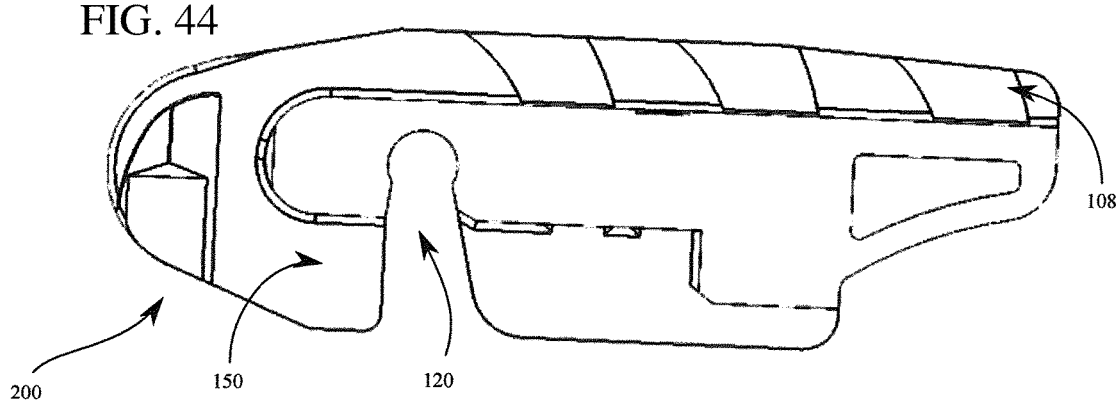
FIG. 44 is a cross-sectional side view of the connector of FIG. 13.
Figure 45:
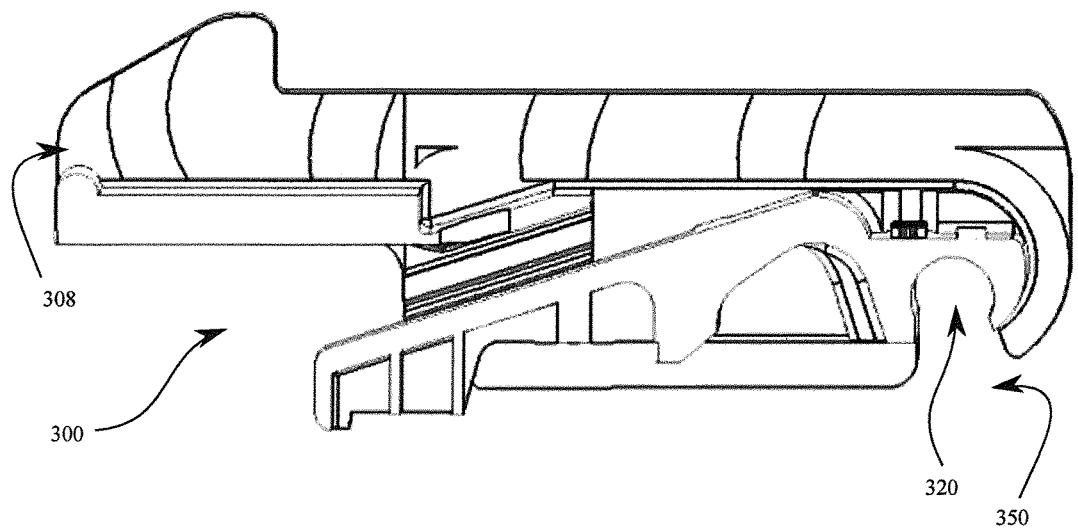
FIG. 45 is a cross-sectional side view of the connector of FIG. 23.
Figure 46:
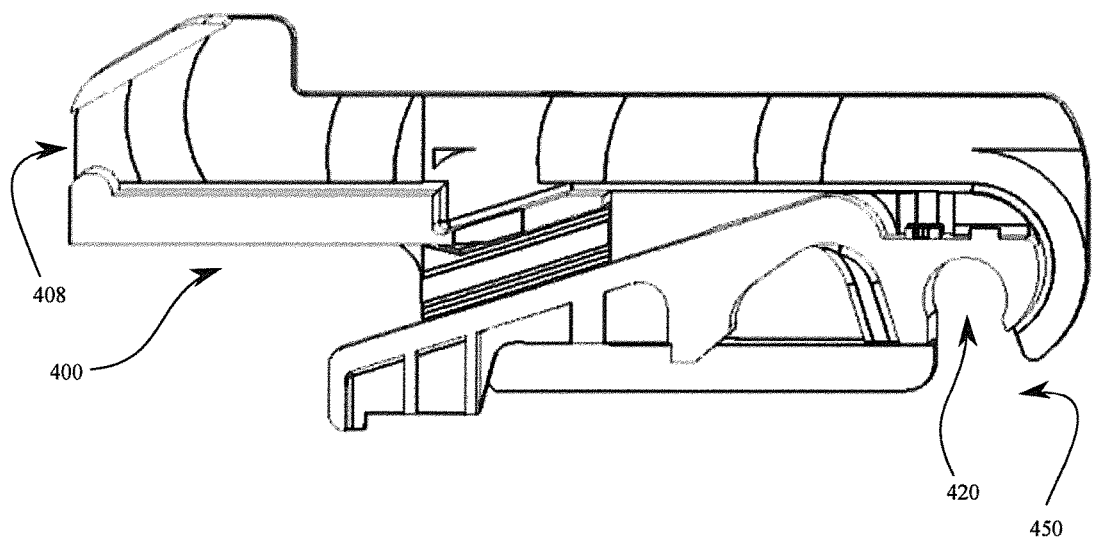
FIG. 46 is a cross-sectional side view of the connector of FIG. 33.

Various styles of wiper arms 20 of varying dimensions and features are described, for example, in the '380 Patent, whose contents are incorporated by reference. The wiper arms 20 illustrated in FIGS. 1-4, as well as FIGS. 13-14 may be described as hook-type arms. Hook-type arms may have varying sizes and dimensions including, for example, 7 mm wide or 9 mm wide, and may include features such a slotted or un-slotted tail. The tail may also be referred to, herein, as an end portion. In addition to hook-type arms, the connector 100 may be utilized for coupling pin-type arms of at least two different diameter sized pins. Thus, connector 100 may be provided for coupling a variety of styles of wiper arms 20 with blades 10.

FIGS. 5-12 and 43 illustrate views of an embodiment of connector 100 in accordance with the present disclosure. Connector 100 includes substantially parallel first and second side walls 102, 104 spaced at a distance from each other, with a bridge or base 106 between. The sidewalls 102, 104 together with base 106 thereby define a channel 108 for receiving a portion of a hook-type arm 20. Channel 108 may be manufactured with varying sizes and dimensions in order to accommodate the size and dimension, particularly the width, of known or to-be developed hooks 20 used in wiper arms. An entry end 108A may be defined at one end of the elongate channel 108, and a curved end 108B may be defined at the opposing end of channel 108. Upper channel 108 is thus dimensioned to connect with a hook-type arm 20, with the curve in the hook conforming around the curved end 108B of channel 108.

A strong coupling between wiper blade 10 and wiper arm 20 is critical in order for the wiper blade 10 to function properly during use as a windshield wiper for a vehicle. As vehicle designs have changed over the years, so too have the windshield dimensions. Windshields having a greater surface area are increasingly common in modern vehicles. Accordingly, wiper blades 10 are becoming increasingly longer in order to accommodate these larger windshields being developed in the marketplace. For example, while a 28 inch or 32 inch long wiper blade is presently quite common, such a lengthy wiper blade would be exceptionally uncommon just a few years ago. Long wiper blades experience increased lateral forces, or torque, as the blade 10 runs across the windshield than a shorter counterpart blade would experience. Thus, the need to have a stronger coupling between the wiper blade 10 and the arm 20 is increasingly vital in order to resist the greater torque forces experienced by longer wiper blades 10. If the coupling between the wiper blade 10 and arm 20 is weak, such that lateral movement occurs in the direction of the torque forces experienced by the wiper 10, the resulting shaking may result in the wiper strip 60 leaving streaks across the windshield. This phenomena may be referred to as dithering or fishtailing.

In order to reduce the likelihood of streaking during use, and so as to better resist torque or lateral forces exerted against wiper blade 10 at the point of coupling between blade 10 and arm 20, connector 100 may feature sidewalls 102, 104 each having a reinforcement element 110, an inner side 112 of the raised portion 110 thereby defining a more deeply set channel 108 than with sidewalls 102, 104 alone. Reinforcement element 110 may be integrally formed with side walls 102, 104 or may be separately attached. Reinforcement element 110 may include raising at least portions of sidewalls 102, 104 In some embodiments, each side of the raised side wall portion 110 may be parallel or substantially parallel to the other side, while in other embodiments, such as the illustrate embodiment, the inner side 112 of the raised portion 110 bends or curves slightly inward towards channel 108 in order to snap-fittingly engage the wiper arm 20. The upper portions 110 may be resilient to accommodate a snap-fit of wiper arm 20. In addition to extending inwardly, some embodiments may feature an overhang or outward extrusion 114 of raised portion 110, which extends over or beyond the outermost surface of sidewalls 102, 104. Such an outwardly extending portion may reduce the space or gap between connector 100 and base 30. By reducing space between connector 100 and base 30, less of the base 30 is exposed to weather elements such as snow, sleet, mud, dirt, or other foreign debris which may corrode, wear, or otherwise damage connector 100, base 30, or any other portion of wiper blade 10 below connector 100. It is within the disclosure that the outward extrusion 114 may touch or nearly touch the base 30.

In order to further improve resistance to lateral or torque forces, and in order to provide for a stronger or sturdier coupling of arm 10 and blade 20, side walls 102, 104 may further include a support element 130. In the illustrated embodiment, support element 130 is an integral extension of the underside of side walls 102, 104, opposite the raised portion 110, however it is contemplated within the disclosure that support element 130 may be a separate attachment provided to support a more elongate channel 108. Attached support element 130 may be a truss member, for example, diagonally supporting the extension of channel 108, thereby providing more surface area along arm 20 connected with connector 100 in channel 108.

On an underside of connector 100, opposite of the upper side having channel 108, is a first passage or rivet channel 120 and a second passage or pin channel 122. Passages 120, 122 extend through first and second walls 102, 104 and are defined for fittably receiving and holding a rod, pin, or other elongate cylindrical member in a snap-fit. For instance, a rod or rivet provided on a connecting base of wiper blade 10 may be received within passage 120, while a pin from a pin-type wiper arm may be receivable within passage 122. Either first or second passage 120, 122 may include one or more clips 124 which further define the associated passage and may communicate with a rod or pin received in the passage in order to securely hold the rod or pin within the passage. In the illustrated embodiment, clip 124 includes an upper channel portion 126, a resilient clip end 128 defining one side of first passage 122, and passage divider 130 mutually defining the second side of the first passage 122, as well as a first side of the second passage 124. Upper channel portion 128 may be substantially aligned or co-planar with bridge 108, thereby at least partially defining upper channel 108. Clip end 128 extrudes downward from upper channel portion 128 and curves into passage 120 thereby defining one side of the passage. The other side of the passage may be defined by divider 130, which may also be defined as the portion of the side walls 102, 104 between passages 120, 122. Divider 130 functions as a fixed end to the upper channel portion 126 and clip end 128 of clip 124. Upon insertion of a rod into passage 120, clip end 128 may resiliently engage the inserted rod in order to first accept and then hold the rod in passage 120. One or more tabs 132 may also be provided within either first or second passage 120, 122 in order to increase the frictional hold on a received rod.

As discussed above, the upper channel 108 has an entry end 108A and a curved end 108B opposite the entry end. Side walls 102, 104 may be formed into a pair of wings 140 proximate the curved end 108B of channel 108. An arcing cutout 142 may be further provided on one or both wings 140, and a locking tab 144 may be formed onto the inner side of each wing 140 between the cutouts 142. Locking tabs 144 may be at least partially formed by the protrusion of the cutout portion 142 of the sidewalls, or alternatively may be attached or fixed to the side wall. Cutouts 142 may be cantilevered and may also move resiliently in and out of the channel 108 in order to accommodate displacement when larger sized hook-type arms 20 are received in channel 108. Cavities 146 may be further provided on the outer side of wings 140 adjacent to cutouts 142 in order to further accommodate displacement and deflection of wings 140. The resulting tabs 144 and cutouts 142 facilitate channel 108 accommodating a conformingly tight fit for a variety of hook arm 20 sizes.

A lower or tail channel 150 may be defined on the underside of connector 100 for receiving the hook-end portion of the hook-type wiper arm 20. Tail channel 150 may be defined as running through passages 120, 122, and may include a tail slot 152 dimensioned for receiving the end portion a of hook-type arms 20. In FIGS. 3 and 4, for example, a hook-type wiper arm 20 is illustrated with the end portion dimensioned to terminate prior to reaching tail slot 152. Alternatively, wiper arm 20 may have an end portion dimensioned to fit below slot 152 rather through slot 152. A lateral brace 160 may also be provided extending between side walls 102, 104 at the curved end 108B of upper channel 108. Lateral brace 160 facilitates the accommodation of larger dimensioned wiper arms 20 by extending the curved end 108B of channel 108, while simultaneously providing increased lateral support of connector 100. As discussed above, resistance to lateral forces during operation of the wiper blade 10 is critical to performance. Lateral brace 160 is optional, and may be replaced with locking tabs or any other securing structure known in the art in order for the connector 100 to accommodate smaller sized hook arms.

With reference now to FIGS. 13-22 and 44, an additional embodiment of a connector for coupling wiper arm 20 with wiper blade 10 in accordance with the disclosure, which is generally shown and described as connector 200. Connector 200 includes opposing side walls 202, 204 spaced at distance from each other, with a bridge or base 206 between. Walls 202, 204 together with base 206 define an upper channel 208 having an entry end 208A and a curved end 208B. As with upper channel 108 in the above described embodiment, upper channel 208 is dimensioned to connect with a hook-type arm 20, with the curve in the hook conforming around the curved end 208B of channel 208. Unlike the embodiment of a connector 100, connector 200 has only a single passage 220 for receiving a rivet. Connector 200 also includes wings 240, cutouts 242, tabs 244, and recesses 246. A lower or tail channel 250 is further formed between side walls 202, 204.

In order to strengthen the connection of hook arm 20 with connector 200, thereby reducing or avoiding the dithering or fishtailing phenomena described above, channel 208 may further include a reinforcement element 210 provided along at least a portion of channel 208. Reinforcement element 210 may include one or more resilient tabs 216 provided along the interior side 212 of channel 208. Upon insertion of a wiper arm 20 into channel 208, tabs 216 may be forced into their respective side walls in order to accommodate and hold the received wiper arm 20. As with element 110, reinforcement element 210 may further include overhangs or outward extrusions 214. A laterally extending support element 230 is also provided in order to improve resistant to lateral or torque forces. Unlike the illustrated embodiment of support element 130, which is an integral extension of the underside of side walls 102, 104, support element 230 is a diagonal beam or truss member for supporting the extension of channel 208.

FIGS. 23-32 and 45 illustrate an additional embodiment of a connector for coupling an alternative wiper arm 20A with wiper blade 10 in accordance with the disclosure, which is generally shown and described as connector 300. Connector 300 includes an upper channel 308 defined by side walls 302, 304 and a bridge 306 provided between side walls 302, 304. The upper channel has an entry end 308A and an opposite curved end 308B. On the underside of connector 308 is a passage 320 for receiving a rivet. A tail passage 350 is formed on the underside of connector 300 for conforming with the curved end of wiper arm 20A. A locking projection is provided on the underside of the connector on a cantilevered beam. The locking projection may engage a corresponding hole or recess in a hook wiper arm to further secure the connector to the wiper arm.

A reinforcement element or portion 310 is provided along at least portion of channel 308 in order to provide a more secure connection between arm 20A and connector 300. In this embodiment of the disclosure, reinforcement portion 310 includes extensions of side walls 302, 304, however the extensions are of different height or length with respect to each other. Accordingly, this embodiment of connector 300 is one example where the reinforcement portion of the upper channel may be non-uniform. It should be understood, however, that it is contemplated within the disclosure that other embodiments of a connector may be uniformly provided along an upper channel on both side walls.

FIGS. 33-41 and 46 illustrate an additional embodiment of the disclosure, generally shown and described as connector 400. Connector 400, which shares some similarities with connector 300, includes an upper channel 408 defined by side walls 402, 404 and a bridge 406 provided between side walls 402, 404. The upper channel has an entry end 408A and an opposite curved end 408B. On the underside of connector 408 is a passage 420 for receiving a rivet. A tail passage 450 is formed on the underside of connector 400 for conforming with the curved end of wiper arm 20A. Side walls 402, 404 are also formed into wings 440 at the curved end 408B. A locking projection is provided on the underside of the connector on a cantilevered beam. The locking projection may engage a corresponding hole or recess in a hook wiper arm to further secure the connector to the wiper arm.

A reinforcement element or portion 410 is also provided along at least a portion of channel 408 in order to provide a more secure connection between arm 20A and connector 400. As with reinforcement portion 410 of connector 400, this embodiment includes extensions of side walls 402, 404, and the extensions are of different height. In this embodiment, reinforcement portion 410 includes an overhang 418 extending over at least a portion of channel 408, and at least a portion of arm 20A is insertable through channel 408 between bridge 406 and overhang 418.

A wiper blade incorporating a connector as described above is also contemplated within the scope of the described concepts. Such wiper blades include a wiper strip and a connection device, such as a rivet or notches to which connectors as described above may attach. The wiper blade further includes a support structure for distributing the force from the wiper arm to the wiper strip. Such support structures may be brackets or frames, spring-elastic beams, a hybrid structure including both brackets and spring-elastic beams, or any other type of support structure known in the art.

Pylon® is a registered trademark, which is illustrated in the drawings for the purpose to show exemplary positions of marks, labels, or other identifying indicia which may be included in embodiments of the disclosure.

The descriptions set forth above are meant to be illustrative and not limiting, and persons of skill in the art will recognize that various common and known deviations from the above described structures are considered to be within the scope of the disclosed concepts described herein.

What is claimed is:

1. A connector for coupling a wiper blade with a wiper arm, the connector comprising:
   first and second side walls spaced at a distance from each other and connected by a bridge, the first and second side walls together with the bridge defining an upper channel oriented in a longitudinal direction, the upper channel having an entry end and a curved end opposite the entry end;
   a rivet passage formed into the first and second sidewalls, the rivet passage dimensioned to accept and hold a rivet of a wiper blade in order to connect the wiper blade with the connector;
   a reinforcement element provided on at least one of the first or second side walls proximate to the upper channel, the reinforcement element including at least one resilient tab provided on the inner side of the reinforcement element within the upper channel; and
   a support element extending from each of the first and second side walls in order to support an extension of the bridge and upper channel.

2. The connector of claim 1, wherein the reinforcement element includes an upward extension of at least one of the first and second walls thereby increasing the height of the upper channel.

3. The connector of claim 2, wherein at least a portion of the reinforcement element bends into the upper channel.

4. The connector of claim 1, wherein the reinforcement element includes an outward extension which projects in a lateral direction away from the upper channel.

5. The connector of claim 1, wherein the reinforcement element includes an overhang portion which extends over the upper channel thereby covering at least a portion of the upper channel.

6. The connector of claim 1, wherein the reinforcement element is provided on both first and second side walls.

7. The connector of claim 1, wherein the support element is an integral extension of the first and second side walls.

8. The connector of claim 1, wherein the support element is truss member.

9. The connector of claim 1, further comprising a lateral brace between the first and second side walls.

10. The connector of claim 1, further comprising a pin passage formed into the first and second side walls adjacent to the rivet passage, the pin passage dimensioned to accept and hold a pin of the wiper arm in order to connect the wiper arm with the connector.

11. The connector of claim 10, further comprising a clip including a resilient clip end extending into the pin passage in order to define at least a portion of the pin passage.

12. The connector of claim 11, wherein the clip further including a upper channel portion which at least partially defines the upper channel as substantially co-planar with the bridge.

13. The connector of claim 1, further comprising a lower channel formed between the first and second side walls below the upper channel, the lower channel dimensioned to receive the end of a hook of the wiper arm, the upper channel and lower channel thereby mutually dimensioned to accept and hold the hook of the wiper arm in order to connect the wiper arm with the connector.

14. The connector of claim 1, wherein the support element is provided proximate to the entry end.

15. The connector of claim 14, wherein the support element is a truss member.

16. The connector of claim 14, wherein a first portion of the bridge and upper channel defined proximate to the entry end is angled with respect to a second portion of the bridge and upper channel defined proximate to the curved end.

17. The connector of claim 14, further comprising a pair of wings, each wing projecting from one of the side walls proximate to the curved end, and each wing projecting beyond the bridge in the longitudinal direction.

18. A wiper blade comprising:
   a wiper strip;
   a support structure, the support structure distributing force from a wiper arm to the wiper strip;
   a connection device disposed on the support structure;
   a connector for coupling the connection device of the wiper blade with a wiper arm, the connector comprising:
   first and second side walls spaced at a distance from each other and connected by a bridge, the first and second side walls and the bridge defining an upper channel oriented in a longitudinal direction, the upper channel having an entry end and a curved end opposite the entry end;
   a rivet passage formed into the first and second sidewalls, the rivet passage dimensioned to accept and hold a rivet of a wiper blade in order to connect the wiper blade with the connector;
   a reinforcement element provided on at least one of the first or second side walls proximate to the upper channel, the reinforcement element including at least one resilient tab provided on the inner side of the reinforcement element within the upper channel; and
   a support element extending from each of the first and second side walls in order to support an extension of the bridge and upper channel.

19. A wiper blade comprising:
   a wiper strip;

a support structure, the support structure distributing force from a wiper arm to the wiper strip;

a connection device disposed on the support structure;

a connector for coupling the connection device to a wiper arm, the connector comprising:

first and second side walls spaced at a distance from each other and connected by a bridge, the first and second side walls together with the bridge defining an upper channel oriented in a longitudinal direction, the upper channel having an entry end and a curved end opposite the entry end;

a rivet passage formed into the first and second sidewalls, the rivet passage dimensioned to accept and hold a rivet of a wiper blade in order to connect the wiper blade with the connector;

a reinforcement element provided on at least one of the first or second side walls proximate to the upper channel; and a support element provided proximate to the entry end and extending from each of the first and second side walls in order to support an extension of the bridge and upper channel, wherein a first portion of the bridge and upper channel defined proximate to the entry end is angled with respect to a second portion of the bridge and upper channel defined proximate to the curved end, and wherein at least two resilient tabs are provided on the inner side of the reinforcement element within the upper channel, at least one tab provided on the first portion of the bridge and at least one tab provided on the second portion of the bridge.

20. A connector for coupling a wiper blade with a wiper arm, the connector comprising:

first and second side walls spaced at a distance from each other and connected by a bridge, the first and second side walls together with the bridge defining an upper channel oriented in a longitudinal direction, the upper channel having an entry end and a curved end opposite the entry end;

a rivet passage formed into the first and second sidewalls, the rivet passage dimensioned to accept and hold a rivet of a wiper blade in order to connect the wiper blade with the connector;

a reinforcement element provided on at least one of the first or second side walls proximate to the upper channel; and a support element provided proximate to the entry end and extending from each of the first and second side walls in order to support an extension of the bridge and upper channel, wherein a first portion of the bridge and upper channel defined proximate to the entry end is angled with respect to a second portion of the bridge and upper channel defined proximate to the curved end, and wherein at least two resilient tabs are provided on the inner side of the reinforcement element within the upper channel, at least one tab provided on the first portion of the bridge and at least one tab provided on the second portion of the bridge.

* * * * *